(12) United States Patent
Siebel et al.

(10) Patent No.: US 12,111,859 B2
(45) Date of Patent: Oct. 8, 2024

(54) ENTERPRISE GENERATIVE ARTIFICIAL INTELLIGENCE ARCHITECTURE

(71) Applicant: C3.ai, Inc., Redwood City, CA (US)

(72) Inventors: Thomas M. Siebel, Woodside, CA (US); Nikhil Krishnan, Los Altos, CA (US); Louis Poirier, Paris (FR); Romain Juban, San Francisco, CA (US); Michael Haines, San Francisco, CA (US); Yushi Homma, Santa Clara, CA (US); Riyad Muradov, Foster City, CA (US)

(73) Assignee: C3.ai, Inc., Redwood City, CA (US)

(*) Notice: Subject to any disclaimer, the term of this patent is extended or adjusted under 35 U.S.C. 154(b) by 0 days.

(21) Appl. No.: 18/542,536

(22) Filed: Dec. 15, 2023

(65) Prior Publication Data
US 2024/0202225 A1 Jun. 20, 2024

Related U.S. Application Data

(60) Provisional application No. 63/433,124, filed on Dec. 16, 2022, provisional application No. 63/446,792, (Continued)

(51) Int. Cl.
*G06F 16/00* (2019.01)
*G06F 16/33* (2019.01)
(Continued)

(52) U.S. Cl.
CPC ........ *G06F 16/345* (2019.01); *G06F 16/3326* (2019.01); *G06F 16/334* (2019.01);
(Continued)

(58) Field of Classification Search
CPC ..... G06F 16/345; G06F 16/3347; G06F 40/20
(Continued)

(56) References Cited

U.S. PATENT DOCUMENTS

| 8,666,928 B2 | 3/2014 | Tunstall-Pedoe |
| 10,621,282 B1 | 4/2020 | Selfridge |

(Continued)

OTHER PUBLICATIONS

Christidis, Angelos et al., "Serving Machine Workloads in Resource Constrained Environments: A Serverless Deployment Example," 2019 IEEE 12th Conference on Service-Oriented Computing and Applications (SOCA), pp. 55-63, Nov. 2019.
(Continued)

*Primary Examiner* — Vincent F Boccio
(74) *Attorney, Agent, or Firm* — Ahmann Kloke LLP; Benjamin E. Berman

(57) ABSTRACT

Systems and methods managing, by an orchestrator, a plurality of agents to generate a response to an input. The orchestrator employs one or more multimodal models such as a large language models to process or deconstruct the prompt into a series of instructions for different agents. Each agent employs one or more machine-learning models to process disparate inputs or different portions of an input associated with the prompt. The system generates, by the orchestrator, a natural language summary of the structured and unstructured data records. The system formulates output and transmits the natural language summary of the data records.

20 Claims, 17 Drawing Sheets

Related U.S. Application Data filed on Feb. 17, 2023, provisional application No. 63/492,133, filed on Mar. 24, 2023.

(51) Int. Cl.
| | |
|---|---|
| *G06F 16/332* | (2019.01) |
| *G06F 16/335* | (2019.01) |
| *G06F 16/338* | (2019.01) |
| *G06F 16/34* | (2019.01) |
| *G06F 40/20* | (2020.01) |
| *G06F 40/40* | (2020.01) |
| *G06N 3/092* | (2023.01) |
| *G06N 5/04* | (2023.01) |
| *G06N 20/00* | (2019.01) |

(52) U.S. Cl.
CPC ........ *G06F 16/3347* (2019.01); *G06F 16/335* (2019.01); *G06F 16/338* (2019.01); *G06F 40/20* (2020.01); *G06F 40/40* (2020.01); *G06N 3/092* (2023.01); *G06N 5/04* (2013.01); *G06N 20/00* (2019.01)

(58) Field of Classification Search
USPC .......................................................... 707/736
See application file for complete search history.

(56) References Cited

U.S. PATENT DOCUMENTS

| | | | | |
|---|---|---|---|---|
| 10,827,071 | B1* | 11/2020 | Adibi | H04L 67/53 |
| 10,943,072 | B1 | 3/2021 | Jaganmohan | |
| 11,138,473 | B1* | 10/2021 | Padmanabhan | G06N 5/02 |
| 11,169,798 | B1 | 11/2021 | Palmer | |
| 11,516,158 | B1 | 11/2022 | Luzhnica | |
| 11,900,289 | B1* | 2/2024 | Kumar | G06V 30/41 |
| 11,908,476 | B1* | 2/2024 | Lyu | G10L 15/22 |
| 2001/0053968 | A1 | 12/2001 | Galitsky | |
| 2007/0055656 | A1 | 3/2007 | Tunstall-Pedoe | |
| 2009/0292687 | A1 | 11/2009 | Fan | |
| 2010/0332585 | A1* | 12/2010 | Driesen | G06Q 10/00 706/47 |
| 2011/0307435 | A1 | 12/2011 | Overell et al. | |
| 2017/0293666 | A1 | 10/2017 | Ragavan | |
| 2018/0081934 | A1 | 3/2018 | Byron | |
| 2018/0330258 | A1 | 11/2018 | Harris | |
| 2019/0034813 | A1 | 1/2019 | Das | |
| 2019/0121612 | A1 | 4/2019 | Ashoori | |
| 2019/0132203 | A1 | 5/2019 | Wince | |
| 2019/0179940 | A1 | 6/2019 | Ross | |
| 2019/0251169 | A1* | 8/2019 | Loghmani | G06F 40/295 |
| 2019/0266157 | A1 | 8/2019 | Brown | |
| 2020/0012584 | A1 | 1/2020 | Walters | |
| 2020/0210647 | A1 | 7/2020 | Panuganty | |
| 2021/0142177 | A1 | 5/2021 | Mallya | |
| 2021/0158897 | A1 | 5/2021 | Chatzou | |
| 2021/0173744 | A1 | 6/2021 | Agrawal | |
| 2022/0036153 | A1 | 2/2022 | O'Malia | |
| 2022/0066914 | A1 | 3/2022 | Drain | |
| 2022/0164109 | A1 | 5/2022 | Hankins | |
| 2022/0400094 | A1 | 12/2022 | Sampath | |
| 2023/0131495 | A1* | 4/2023 | Tater | G06N 5/045 706/45 |
| 2023/0177878 | A1 | 6/2023 | Sekar | |
| 2024/0112394 | A1 | 4/2024 | Neal et al. | |

OTHER PUBLICATIONS

Contextual AI, Inc., "Introducing RAG 2.0," Mar. 19, 2024 [retrieved online at contextual.ai/introducing-rag2].

Lewis, Patrick et al., "Retrieval-Augmented Generation for Knowledge-Intensive NLP Tasks," Proceedings of the 34th International Conference on Neural Information Processing Systems, Dec. 6, 2020.

International Application No. PCT/US2023/084456, Search Report and Written Opinion dated Apr. 12, 2024.

International Application No. PCT/US2023/084481, Search Report and Written Opinion dated Mar. 25, 2024.

International Application No. PCT/US2023/084465, Search Report and Written Opinion dated Apr. 11, 2024.

International Application No. PCT/US2023/084468, Search Report and Written Opinion dated Apr. 16, 2024.

International Application No. PCT/US2023/084462, Search Report and Written Opinion dated Apr. 1, 2024.

* cited by examiner

ENTERPRISE GENERATIVE ARTIFICIAL INTELLIGENCE ARCHITECTURE

CROSS-REFERENCE TO RELATED APPLICATIONS

The present application claims the benefit of U.S. Provisional Patent Application Ser. No. 63/433,124 filed Dec. 16, 2022 and entitled "Unbounded Data Model Query Handling and Dispatching Action in a Model Driven Architecture," U.S. Provisional Patent Application Ser. No. 63/446,792 filed Feb. 17, 2023 and entitled "System and Method to Apply Generative AI to Transform Information Access and Content Creation for Enterprise Information Systems," and U.S. Provisional Patent Application Ser. No. 63/492,133 filed Mar. 24, 2023 and entitled "Iterative Context-based Generative Artificial Intelligence," each of which is hereby incorporated by reference herein.

TECHNICAL FIELD

This disclosure pertains to generative artificial intelligence and machine learning. More specifically, this disclosure pertains to enterprise generative artificial intelligence architectures.

BACKGROUND

Artificial intelligence (AI) is a branch of computer science for the development of software that allows computer systems to perform tasks that imitate human cognitive intelligence, such as visual perception, speech recognition, decision-making, and language translation. Traditional approaches for storing and retrieving information typically involves databases and applications to index search and locate specific files.

DETAILED DESCRIPTION

Figure 1:
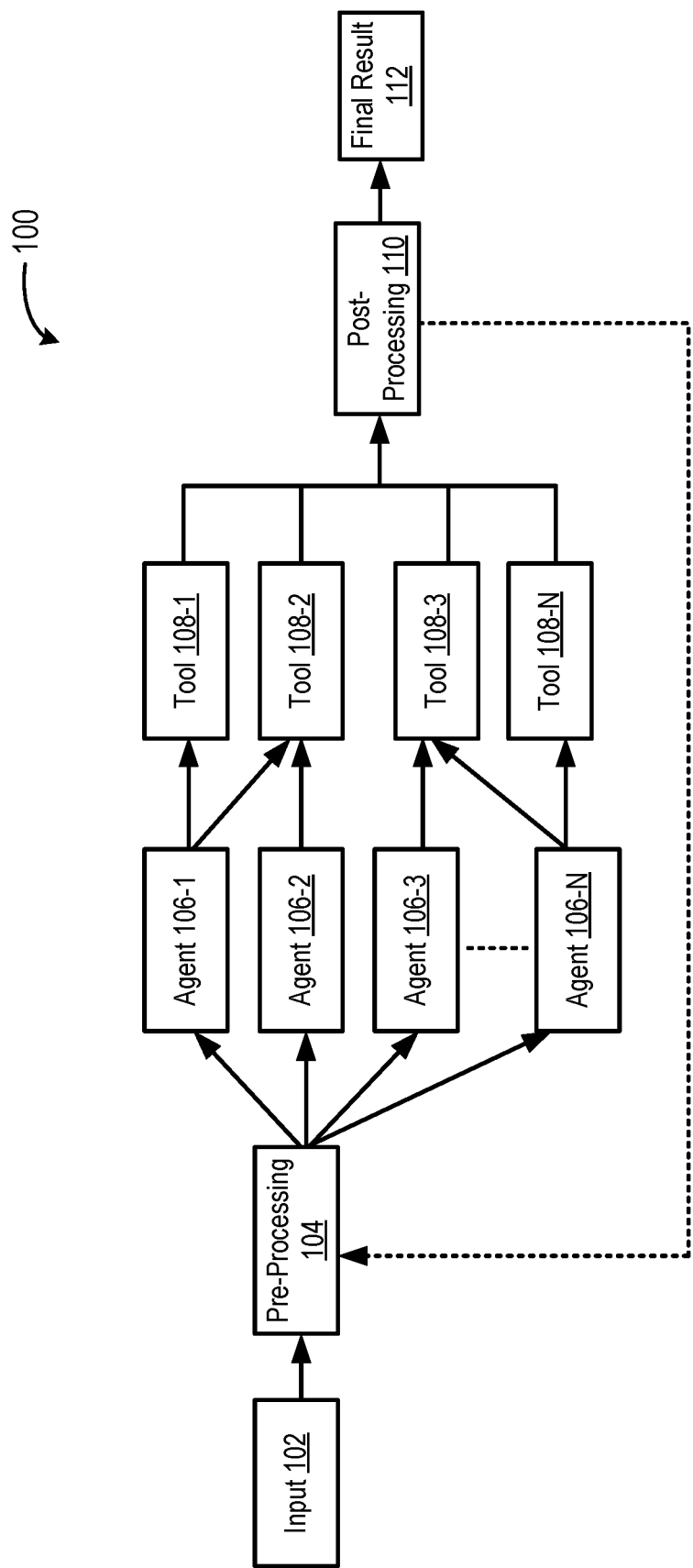
FIG. 1 depicts a diagram of an example logical flow of an enterprise generative artificial intelligence system according to some embodiments.

Generative AI is an artificial intelligence technology that uses machine learning algorithms to perform tasks that imitate human cognitive intelligence and generate content. Content can be in the form of text, audio, video, images, and more. Content in enterprise computing environments is typically spread across disparate data sources that may be incompatible, siloed, and access controlled. Supporting efficient search capabilities is further complicated in circumstance that require subject matter expertise or context specific knowledge.

An architecture for enterprise generative AI is disclosed herein to transform interactions with enterprise information that fundamentally change the human-computer interaction (HCI) model for enterprise software. Enterprises running sensitive workloads in both cloud-native, on premise, or air-gapped environments can implement enterprise generative AI architecture to generate enterprise-wide insights using tool to rapidly locate and retrieve with agents that develop and coordinate complex operations in response to simple intuitive input. The enterprise generative AI architecture enables enterprise users to ask open-ended, multi-level, context specific questions that are processed used generative AI with machine learning to understand the request, identify relevant information, and generate new context specific insights with predictive analysis. The enterprise generative AI architecture supports simplified human-computer-interactions with intuitive natural language interface as well as advanced accessibility features for adaptable forms of input including but not limited to text, audio, video, images, and more.

Conventional generative artificial intelligence processes are computationally inefficient, often present faulty or biased information, cannot effectively handle different types of inputs and outputs, fail to effectively leverage disparate data sources with different data formats, and fail to interact effectively with other machine learning systems or effectively leverage information across different domains. These problems, as well as those discussed above, are addressed by the enterprise generative artificial intelligence systems and processes discussed herein. More specifically, enterprise generative artificial intelligence systems can efficiently provide more accurate and reliable results than conventional generative artificial intelligence solutions while consuming fewer computing resources and requiring shorter processing times. Furthermore, enterprise generative artificial intelligence systems can employ various models that effectively provide cross-domain functionality. Enterprise generative artificial intelligence systems can further use a combination of agents and tools to efficiently process a wide variety of inputs received from disparate data sources (e.g., having different data formats) and return results in a common data format (e.g., natural language).

The enterprise generative artificial intelligence architecture includes an orchestrator agent (or, simply, orchestrator) that supervises, controls, and/or otherwise administrates many different agents and tools. Orchestrators can include one or more machine learning models and can execute supervisory functions, such as routing inputs (e.g., queries, instruction sets, natural language inputs or other human-readable inputs, machine-readable inputs) to specific agents to accomplish a set of prescribed tasks (e.g., retrieval requests prescribed by the orchestrator to answer a query). Machine learning models can include some or all of the different types or modalities of models described herein (e.g., multimodal machine learning models, large language models, data models, statistical models, audio models, visual models, audiovisual models, etc.). Agents can include one or more multimodal models (e.g., large language models) to accomplish the prescribed tasks using a variety of different tools. Different agents can use various tools to execute and process unstructured data retrieval requests, structured data retrieval requests, API calls (e.g., for accessing artificial intelligence application insights), and the like. Tools can include one or more specific functions and/or machine learning models to accomplish a given task (or set of tasks).

Agents can adapt to perform differently based on contexts. A context may relate to a particular domain (e.g., industry) and an agent may employ a particular model (e.g., large language model, other machine learning model, and/or data model) that has been trained on industry-specific datasets, such as healthcare datasets. The particular agent can use a healthcare model when receiving inputs associated with a healthcare environment and can also easily and efficiently adapt to use a different model based on different inputs or context. Indeed, some or all of the models described herein may be trained for specific domains in addition to, or instead of, more general purposes. The enterprise generative artificial intelligence architecture leverages domain specific models to produce accurate context specific retrieval and insights.

The orchestrator manages the agents to efficiently process disparate inputs or different portions of an input. For example, an input may require the system to access and retrieve data records from disparate data sources (e.g., unstructured datastores, structured datastores, timeseries datastores, and the like), database tables from different types of databases, and machine learning insights from different machine learning applications. The different agents can each separately, and in parallel, handle each of these requests, greatly increasing computational efficiency.

Agents can process the disparate data returned by the different agents and/or tools. For example, large language models typically receive inputs in natural language format. The agents may receive information in a non-natural language format (e.g., database table, image, audio) from a tool and transform it into natural language describing the tool output in a format understood by large language models. A large language model can then process that input to "answer," or otherwise satisfy the initial input.

FIG. 1 depicts a diagram 100 of an example logical flow of an enterprise generative artificial intelligence system according to some embodiments. As shown, an initial input 102 is received by the system from either a user (e.g., a natural language input) or another system (e.g., a machine-readable input).

An orchestrator agent (or, simply, orchestrator) can pre-process the input in step 104. Pre-processing can include, for example, acronym handling, translation handling, punctuation handling, input identification (e.g., identifying different portions of the input 102 for processing by different agents). The orchestrator can use a multimodal model (e.g., large language model) to further process the input 102 to create a plan for determining a result (step 112) for the input. The plan may include a prescribed set of tasks, such as structured data retrieval tasks, unstructured data retrieval tasks, time-series processing tasks, visualization tasks, and the like. In some embodiments, the plan can designate which tools 108 should be used to execute the tasks, and the orchestrator can select the agents based on the designated tools. In some embodiments, the plan can designate which agents should be used to execute the tasks, and the agents can independently designate which tools 108 should be used to execute the tasks.

Continuing the example of FIG. 1, the orchestrator routes the pre-processed input to agents 106 for further processing. More specifically, the orchestrator may use one or more multimodal models (e.g., language, video, audio, statistical models, etc.), and/or other machine learning models, to interpret the input 102 to select appropriate agents 106 and appropriate tools 108. For example, the orchestrator may determine that a first portion of the input requires a database query, while another portion of the input requires an API call. The orchestrator can appropriately route the first portion of the input to the appropriate agent 106-1 (e.g., a structured data retrieval agent) and route the second portion of the input to another agent 106-2 (e.g., API agent). There could be any number of such agents 106 accessing any number of different tools 108. The orchestrator may also instruct the agents 106 to operate in parallel and/or serially.

The agents 106 can select the appropriate tools 108 to accomplish a set of prescribed tasks (e.g., tasks prescribed by the orchestrator). The tools 108 can make the appropriate function calls to retrieve disparate data records among other functions. As used herein, data records can include unstructured data records (e.g., documents and text data that is stored on a file system in a format such as PDF, DOCX, .MD, HTML, TXT, PPTX, image files, audio files, video files, application outputs, and the like), structured data records (e.g., database tables or other data records stored according to a data model or type system), timeseries data records (e.g., sensor data, artificial intelligence application insights), and/or other types of data records (e.g., access control lists). The agents 106 can transform the disparate data records into a common format (e.g., natural language format) that can be post-processed (step 110) by a large language model (e.g., the same or different large language model that performed the pre-processing). More specifically, post-processing can take tool outputs (and/or transformed tool outputs) and generate a final result (step 112) that satisfies the initial input. For example, the orchestrator may use one or more large language models to determine the result. If the orchestrator determines there is not enough information to satisfy the initial input, the orchestrator can iteratively repeat some or all of the above steps until a stopping condition is satisfied and/or there is enough information to generate a final result (step 112).

Figure 2:
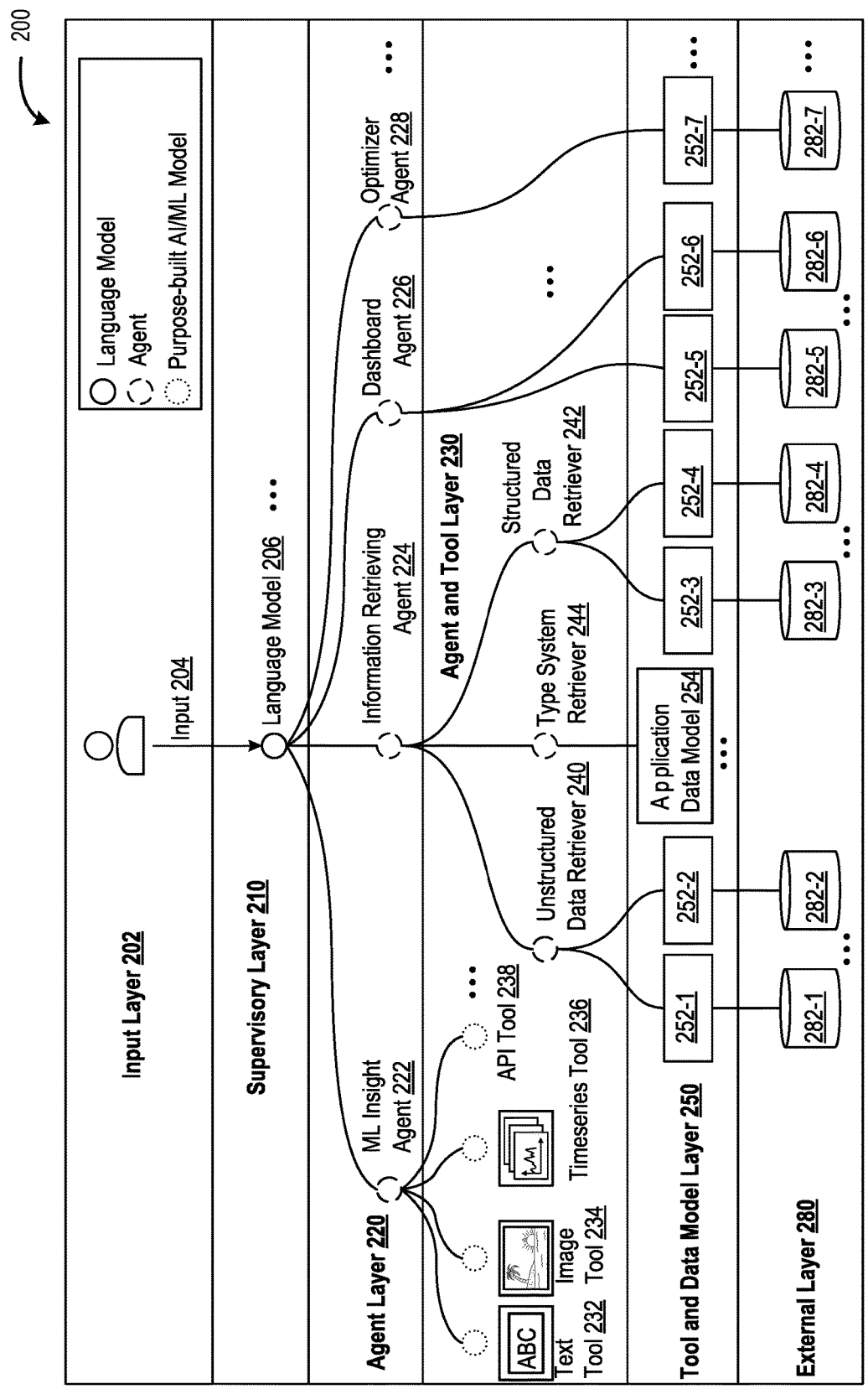
FIG. 2 depicts a diagram of an example layered architecture and environment of an enterprise generative artificial intelligence system according to some embodiments.

FIG. 2 depicts a diagram 200 of an example layered architecture and environment of an enterprise generative artificial intelligence system (e.g., enterprise generative artificial intelligence system 402) according to some embodiments. In the example of FIG. 2, the enterprise generative artificial intelligence system architecture and environment includes a hierarchy of layers. More specifically, the hierarchy of layers includes an input layer 202, a supervisory layer 210, an agent layer 220, an agent and tool layer 230, a tool and data model layer 250, and an external layer 280. It will be appreciated that these layers are shown by way of example, and other examples can include any number of such layers (e.g., any number of layers 220 and 230).

The input layer 202 represents a layer of the enterprise generative artificial intelligence system architecture that receives an input (e.g., a query, complex input, instruction set, and/or the like) from a user or system. For example, an interface module of the enterprise generative artificial intelligence system may receive the input.

The supervisory layer 210 represents a layer of the enterprise generative artificial intelligence system architecture that includes one or more large language models (e.g., of an orchestrator module) that can develop a plan for responding to the input received in the input layer 202. A plan can include a set of prescribed tasks (e.g., retrieval tasks, API call tasks, and the like). In one example, the supervisory layer 210 can provide pre-processing and post-processing functionality described herein as well as the functionality of the orchestrators and comprehension modules described herein. The supervisory layer 210 can coordinate with one or more of the subsequent layers 220-280 to execute the prescribed set of tasks.

The agent layer 220 represents a layer of the enterprise generative artificial intelligence system architecture that includes agents that can execute the prescribed set of tasks. In the example of FIG. 2, the agent layer 220 includes a machine learning insight agent 222, an information retrieving agent 224, a dashboard agent 226, and an optimizer agent 228. Each of the agents 224-228 can include a large language model that provides reasoning functionality for accomplishing their assigned portion of the prescribed set of tasks. More specially, the agents 224-228 can instruct the agents and tools of subsequent layers (e.g., layer 230), of which there could be any number, to execute the tasks. For example, the machine learning insight agent 222 can instruct the text processing tool 232 to perform a text processing task (e.g., transform an artificial intelligence application output into natural language), an image processing tool 234 to perform an image processing task (e.g., generate a natural language summary of an image outputted from artificial intelligence application), a timeseries tool 236 to obtain summarize timeseries data (e.g., timeseries data output from an artificial intelligence application), and an API tool 238 to perform an API call task (e.g., execute an API call to trigger or access an artificial intelligence application).

The information retrieving agent 224 may cooperate with, and/or coordinate, several different agents to perform retrieval tasks. For example, the information retrieving agent 224 may instruct an unstructured data retriever agent 240 to receive unstructured data records, a structured data retriever agent 242 to retrieve structured data records, and a type system retriever agent 244 to obtain one or more data models (or subsets of data models) and/or types from a type system. The type system provides compatibility across different data formats, protocols, operating languages, disparate systems, etc. Types can encapsulate data formats for some or all of the different types or modalities described herein (e.g., multimodal, text, coded, language, statistical, audio, visual, audiovisual, etc.). For example, a data model may include a variety of different types (e.g., in a tree or graph structure), and each of the types may describe data fields, operations, functions, and the like. Each type can represent a different object (e.g., a real-world object, such as a machine or sensor in a factory) or system (e.g., computing cluster, enterprise datastores, file systems), and each type can include a large language model context that provides context for the large language model to design or update a plan. For example, the context may include a natural language summary or description of the type (e.g., a description of the represented object, relationships with other types or objects, associated methods and functions, and the like). Types can be defined in a natural language format for efficient processing by large language models. The type system retriever agent 244 may traverse the data model 254 to retrieve a subset of the data model 254 and/or types of the data model 254. The structured data retriever agent 242 can then use that retrieved information to efficiently retrieve structured data from a structured data source (e.g., a structured data source that is structured or modeled according to the data model 254).

The dashboard agent 226 may be configured to generate one or more visualizations and/or graphical user interfaces, such as dashboards. For example, the dashboard agent 226 may execute tools 252-5 and 252-6 to generate dashboards based on information retrieved by the other agents and/or information output by the other agents (e.g., natural language summaries of associated tool outputs).

The optimizer agent 228 may be configured to execute a variety of different prescriptive analytics functions and mathematical optimizations 252-7 to assist in the calculation of answers for various problems. For example, the large language model 206 may use the optimizer agent 228 to generate plans, determine a set of prescribed tasks, determine whether more information is needed to generate a final result, and the like.

The tool and data model layer 250 is intended to represent a layer of the enterprise generative artificial intelligence system architecture that includes tools 252 and the data model 254. The agents 240-242 can execute the tools 252 to retrieve information from various applications and datastores 282 in the external layer 280 (e.g., external relative to the enterprise generative artificial intelligence system). The tools 252 may include connectors that can connect to systems and datastore that are external to the enterprise generative artificial intelligence system.

Figure 3:
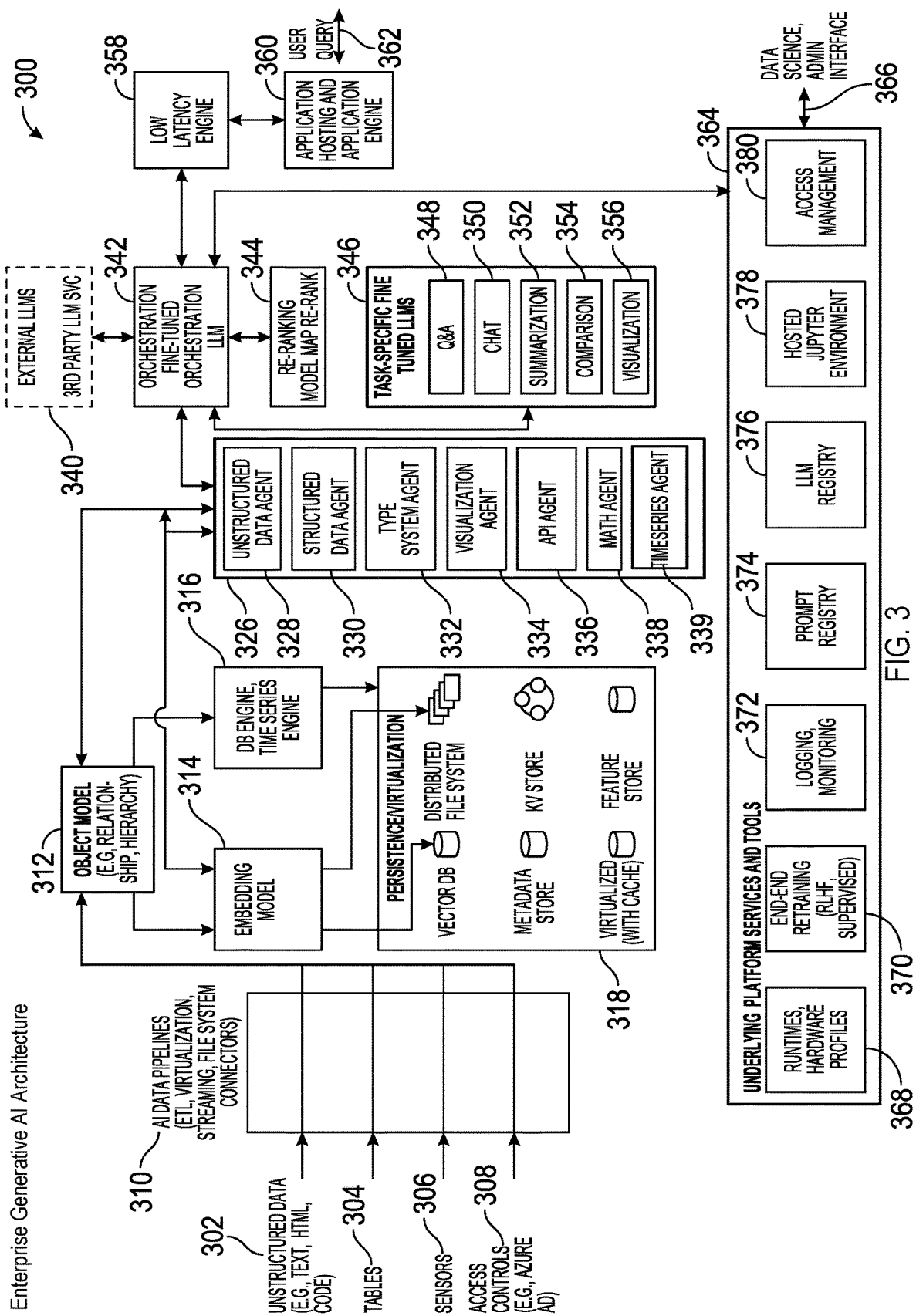
FIG. 3 depicts a diagram of an example architecture of an enterprise generative artificial intelligence system according to some embodiments.

FIG. 3 depicts a diagram 300 of an example architecture of an enterprise generative artificial intelligence system (e.g., enterprise generative artificial intelligence system 402) according to some embodiments. In the example of FIG. 3, the enterprise generative artificial intelligence system can ingest disparate data, such as unstructured data 302, structured data (e.g., tables) 304, sensor data 306, and access control information 308. The data may be received via one or more artificial intelligence data pipelines 310. Data may be ingested according an object model (or, data model) 312, and an embedding model 314 (e.g., a ColBERT implementation) may be used to generate embeddings from the ingested data and persisted and/or virtualized in various datastores 318. The datastores 318 can include vector datastores (e.g., FAISS implementation), metadata datastores, virtualized datastores, distributed file systems, key value datastores, and features stores (e.g., that stores embeddings as features for various models described herein). Database engines and timeseries engines 316 can also be used to persist and/or virtualize data within the datastores 318.

In the example of FIG. 3, the enterprise generative artificial intelligence system includes a variety of different agents 326-339. These are shown by way of example, and various embodiments may include different agents instead of, or in addition to, the agents 326-339. Further details regarding the agents and other features of enterprise generative artificial intelligence systems can be found with reference to FIG. 5 and the other figures presented herein.

In the example of FIG. 3, the enterprise generative artificial intelligence system includes an orchestrator 342 with a fine-tuned large language model. The orchestrator 342 and/or agents 326-339 may include and/or access task-specific large language models 348-356, as well as external or third-party large language models 340 in some embodiments. The orchestrator 342 can utilize various underlying platform services tools, such as run-time hardware profiles 368, end-end retraining 370, logging and monitoring 372, prompt registry 374, model registry 376, hosted JUPYTER environment 378, access management controls 380, and/or the like.

In some embodiments, a user query 362 and/or other inputs may be received by an application hosting an application engine 360 which can communicate with a low latency engine 358 to provide the input, or a transformed input, to the orchestrator 342. The orchestrator 342 may utilize the various agents, large language models, and other features to generate an accurate and reliable (e.g., without hallucination) answer to the user query 362.

In some embodiments, only a portion of the architecture depicted in FIG. 3 may be deployed in an external environment (e.g., a customer hosted environment or a customer cloud environment). For example, a portion of the architecture may be deployed in an external environment while some or all of the other portions remain in an internal environment (e.g., the internal hosted environment and/or associated cloud environment of the entity providing the enterprise generative artificial intelligence system).

Figure 4:
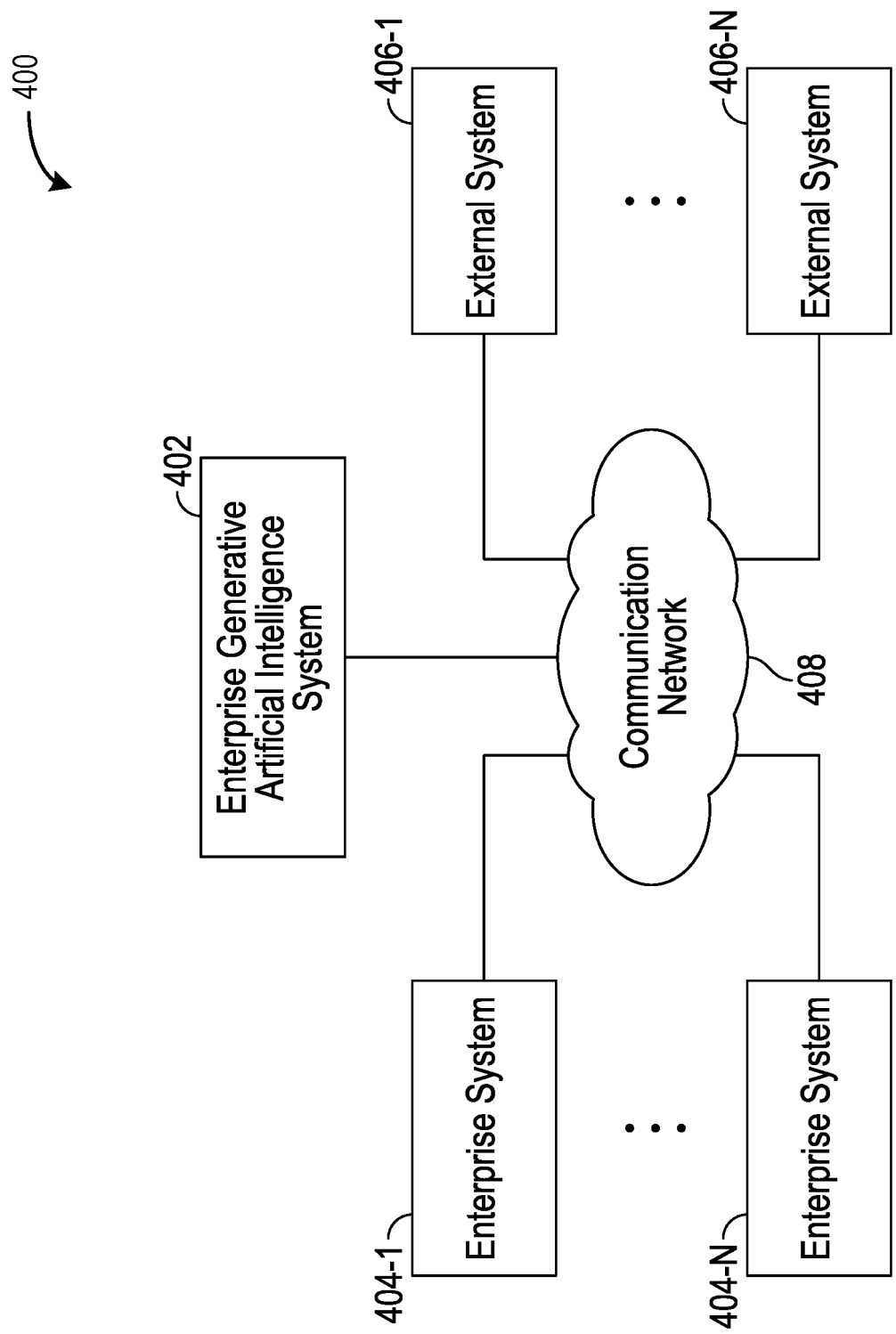
FIG. 4 depicts a diagram of an example network system for enterprise generative artificial intelligence according to some embodiments.

FIG. 4 depicts a diagram 400 of an example network system for enterprise generative artificial intelligence according to some embodiments. In the example of FIG. 4, the network system includes an enterprise generative artificial intelligence system 402, enterprise systems 404-1 to 404-N (individually, the enterprise system 404, collectively, the enterprise systems 404), external systems 406-1 to 406-N (individually, the external system 406, collectively, the external systems 406), and a communication network 408.

The enterprise generative artificial intelligence system 402 may function to iteratively and non-iteratively generate machine learning model inputs and outputs to determine a final output (e.g., "answer" or "result") in response to an initial input (e.g., provided by a user or another system). In some embodiments, functionality of the enterprise generative artificial intelligence system 402 may be performed by one or more servers (e.g., a cloud-based server) and/or other computing devices. The enterprise generative artificial intelligence system 402 may be implemented using a type system and/or model-driven architecture.

In various implementations, the enterprise generative artificial intelligence system 402 can provide a variety of different technical features, such as effectively handling and generating complex natural language inputs and outputs, generating synthetic data (e.g., supplementing customer data obtained during an onboarding process, or otherwise filling data gaps), generating source code (e.g., application development), generating applications (e.g., artificial intelligence applications), providing cross-domain functionality, as well as a myriad of other technical features that are not provided by traditional systems. As used herein, synthetic data can refer to content generated on-the-fly (e.g., by large language models) as part of the processes described herein. Synthetic data can also include non-retrieved ephemeral content (e.g., temporary data that does not subsist in a database), as well as combinations of retrieved information, queried information, model outputs, and/or the like.

In some embodiments, the enterprise generative artificial intelligence system 402 can provide and/or enable an intuitive non-complex interface to rapidly execute complex user requests with improved access, privacy, and security enforcement. The enterprise generative artificial intelligence system 402 can include a human computer interface for receiving natural language queries and presenting relevant information with predictive analysis from the enterprise information environment in response to the queries. For example, the enterprise generative artificial intelligence system 402 can understand the language, intent, and/or context of a user natural language query. The enterprise generative artificial intelligence system 402 can execute the user natural language query to discern relevant information from an enterprise information environment to present to the human computer interface (e.g., in the form of an "answer").

In some embodiments, generative artificial intelligence models (e.g., large language models of an orchestrator) of the enterprise generative artificial intelligence system 402 can interact with agents (e.g., retrieval agents, retriever agents) to retrieve and process information from various data sources. For example, data sources can store data records and/or segments of data records which may be identified by the enterprise generative artificial intelligence system 402 based on embedding values (e.g., vector values associated with data records and/or segments). Data records can include tables, text, images, audio, video, code, application outputs (e.g., predictive analysis and/or other insights generated by artificial intelligence applications), and/or the like.

In some embodiments, the enterprise generative artificial intelligence system 402 can generate context-based synthetic output based on retrieved information from one or more retriever models. For example, retriever models (e.g., retriever models or a retrieval agent) can provide additional retrieved information to the large language models to generate additional context-based synthetic output until context validation criteria is satisfied. Once the validation criteria are satisfied, the enterprise generative artificial intelligence system 402 can output the additional context-based synthetic output as a result or instruction set (collectively, "answers").

In various embodiments, the enterprise generative artificial intelligence system 402 provides transformative context-based intelligent generative results. For example, the enterprise generative artificial intelligence system 402 can process inputs from enterprise users using a natural language interface to rapidly locate, retrieve, and present relevant data across the entire corpus of an enterprise's information systems.

As discussed elsewhere herein, the enterprise generative artificial intelligence system 402 can handle both machine-readable inputs (e.g., compiled code, structured data, and/or other types of formats that can be processed by a computer) and human-readable inputs. Inputs can also include complex inputs, such as inputs including "and," "or", inputs that include different types of information to satisfy the input (e.g., data records, text documents, database tables, and artificial intelligence insights), and/or the like. In one example, a complex input may be "How many different engineers has John Doe worked with within his engineering department?" This may require the enterprise generative artificial intelligence system 402 to identify John Doe in a first iteration, identify John Doe's department in a second iteration, determine the engineers in that department in a third iteration, then determine in a fourth iteration which of those engineers John Doe has interacted with, and then finally combine those results, or portions thereof, to generate the final answer to the query. More specifically, the enterprise generative artificial intelligence system 402 can use portions of the results of each iteration to generate contextual information (or, simply, context) which can then inform the subsequent iterations.

The enterprise systems 404 can include enterprise applications (e.g., artificial intelligence applications), enterprise datastores, client systems, and/or other systems of an enterprise information environment. As used herein, an enterprise information environment can include one or more networks (e.g., cloud, on premise, air-gapped or otherwise) of enterprise systems (e.g., enterprise applications, enterprise datastores), client systems (e.g., computing systems for access enterprise systems). The enterprise systems 404 can include disparate computing systems, applications, and/or datastores, along with enterprise-specific requirements and/or features. For example, enterprise systems 404 can include access and privacy controls. For example, a private network of an organization may comprise an enterprise information environment that includes various enterprise systems 404. Enterprise systems 404 can include, for example, CRM systems, EAM systems, ERP systems, FP&A systems, HRM systems, and SCADA systems. Enterprise systems 404 can include or leverage artificial intelligence applications and artificial intelligence applications may leverage enterprise systems and data. Enterprise systems 404 can include data flow and management of different processes (e.g., of one or more organizations) and can provide access to systems and users of the enterprise while preventing access from other systems and/or users. It will be appreciated that, in some embodiments, references to enterprise information environments can also include enterprise systems, and references to enterprise systems can also include enterprise information environments. In various embodiments, functionality of the enterprise systems 404 may be performed by one or more servers (e.g., a cloud-based server) and/or other computing devices.

The external systems 406 can include applications, datastores, and systems that are external to the enterprise information environment. In one example, the enterprise systems 404 may be a part of an enterprise information environment of an organization that cannot be accessed by users or systems outside that enterprise information environment and/or organization. Accordingly, the example external systems 406 may include Internet-based systems, such as news media systems, social media systems, and/or the like, that are outside the enterprise information environment. In various embodiments, functionality of the external systems 406 may be performed by one or more servers (e.g., a cloud-based server) and/or other computing devices.

The communications network 408 may represent one or more computer networks (e.g., LAN, WAN, air-gapped network, cloud-based network, and/or the like) or other transmission mediums. In some embodiments, the communication network 408 may provide communication between the systems, modules, engines, generators, layers, agents, tools, orchestrators, datastores, and/or other components described herein. In some embodiments, the communication network 408 includes one or more computing devices, routers, cables, buses, and/or other network topologies (e.g., mesh, and the like). In some embodiments, the communication network 408 may be wired and/or wireless. In various embodiments, the communication network 408 may include local area networks (LANs), wide area networks (WANs), the Internet, and/or one or more networks that may be public, private, IP-based, non-IP based, air-gapped, and so forth.

Figure 5:
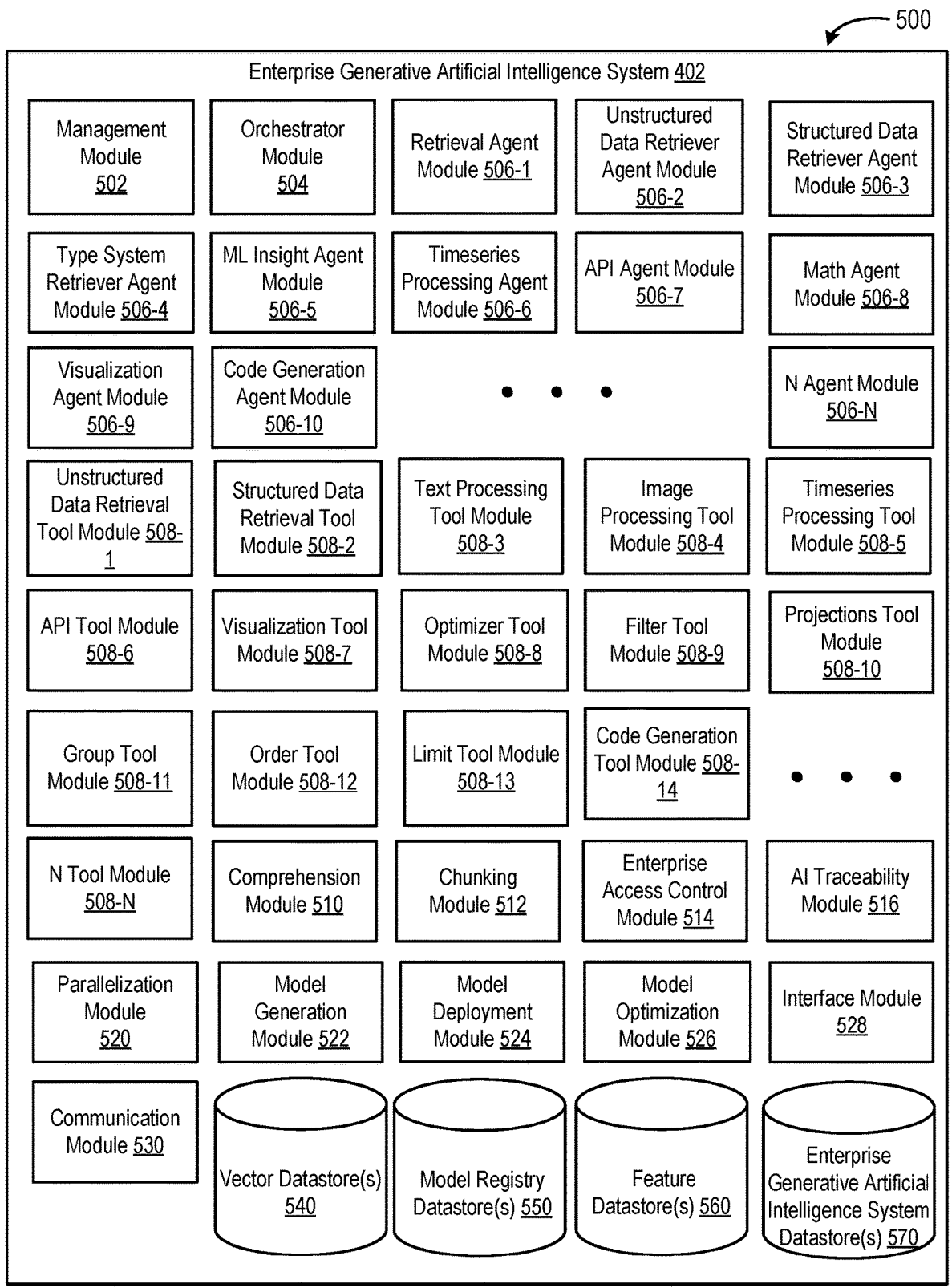
FIG. 5 depicts a diagram of an example enterprise generative artificial intelligence system according to some embodiments.

FIG. 5 depicts a diagram of an example enterprise generative artificial intelligence system 402 according to some embodiments. In the example of FIG. 5, the enterprise generative artificial intelligence system 402 includes a management module 502, an orchestrator module 504, a retrieval agent module 506-1, an unstructured data retriever agent module, 506-2, a structured data retriever agent module 506-3, a type system retriever agent module 506-4, a machine learning insight module 506-5, a timeseries processing agent 506-6, an API agent module 506-7, a math agent module 506-8, a visualization agent module 506-9, a code generation agent module 506-10, an unstructured data retrieval tool 508-1, an structured data retrieval tool 508-2, a text processing tool module 508-3, an image processing tool module 508-4, a timeseries processing tool module 508-5, an API tool module 508-6, a visualization tool module 508-7, an optimizer tool module 508-8, a filter tool module 508-9, a projections tool module 508-10, a group tool module 508-11, an order tool module 508-12, a limit tool module 508-13, code generation tool module 508-14, a comprehension module 510, a chunking module 512, an enterprise access control module 514, an artificial intelligence traceability module 516, a parallelization module 520, model generation module 522, a model deployment module 524, a model optimization module 526, an interface module 528, a communication module 530, vector datastore(s) 540, model registry datastore(s) 550, feature datastore(s) 560, and enterprise generative artificial intelligence system datastore(s) 570.

The management module 502 can function to (e.g., create, read, update, delete, or otherwise access) data associated with the enterprise generative artificial intelligence system 402. The management module 502 can store or otherwise manage or store in any of the datastores 540-570, and/or in one or more other local and/or remote datastores. It will be appreciated that that datastores can be a single datastore local to the enterprise generative artificial intelligence system 402 and/or multiple datastores remote to the enterprise generative artificial intelligence system 402. In some embodiments, the datastores described herein comprise one or more local and/or remote datastores. The management module 502 can perform operations manually (e.g., by a user interacting with a GUI) and/or automatically (e.g., triggered by one or more of the modules 504-530). Like other modules described herein, some or all the functionality of the management module 502 can be included in and/or cooperate with one or more other modules, systems, and/or datastores.

The orchestrator module 504 can function to generate and/or execute one or more orchestrator agents (or, simply, orchestrators). An orchestrator can orchestrate, supervise, and/or otherwise control agents 506. In some implementations, the orchestrator includes one or more large language models. The orchestrator can interpret inputs, select appropriate agents for handling queries and other inputs, and route the interpreted input to the selected agents. The orchestrator can also execute a variety of supervisory functions. For example, the orchestrator may implement stopping conditions to prevent the comprehension module from stalling in an endless loop during an iterative context-based generative artificial intelligence process. The orchestrator may also include one or more other types of models to process (e.g., transform) non-text input. Other models (e.g., other machine learning models, translation models) may also be included in addition to, or instead of, the large language models for some or all of the agents and/or modules described herein.

In some embodiments, an orchestrator can process data received from a variety of data sources in different formats that can be processed with natural language processing (NLP) (e.g., with tokenization, stemming, lemmatization, normalization, and the like) with vectorized data and can generate pre-trained transformers that are fine-tuned or re-trained on specific data tailored for an associated data domain or data application (e.g., SaaS applications, legacy enterprise applications, artificial intelligence application). Further processing can include data modeling feature inspection and/or machine learning model simulations to select one or more appropriate analysis channels. Example data objects can include accounts, products, employees, suppliers, opportunities, contracts, locations, digital portals, geolocation manufacturers, supervisory control and data acquisition (SCADA) information, open manufacturing system (OMS) information, inventories, supply chains, bills of materials, transportation services, maintenance logs, and service logs.

In some embodiments, the orchestrator module 504 can use a variety of components when needed to inventory or generate objects (e.g., components, functionality, data, and/or the like) using rich and descriptive metadata, to dynamically generate embeddings for developing knowledge across a wide range of data domains (e.g., documents, tabular data, insights derived from artificial intelligence applications, web content, or other data sources). In an example implementation, the orchestrator module 504 can leverage, for example, some or all of the components described herein. Accordingly, for example, the orchestrator module 504 can facilitate storage, transformation, and communication to facilitate processing and embedding data. In some implementations, the orchestrator module can create embeddings for multiple data types across multiple industry verticals and knowledge domains, and even specific enterprise knowledge. Knowledge may be modeled explicitly and/or learned by the orchestrator module 504, agents 506, and/or tools 508. In an example, the orchestrator module 504 (and/or chunking module 512, discussed below) generates embeddings that are translated or transformed for compatibility with the comprehension module 510.

In some embodiments, the orchestrator 504 can be configured to make different data domains operate or interface with the components of the enterprise generative artificial intelligence system 402. In one example, the orchestrator module 504 may embedded objects from specific data domains as well as across data domains, applications, data models, analytical by-products, artificial intelligence predictions, and knowledge repositories to provide robust search functionality without requiring specialized programming for each different data domain or data source. For example, the orchestrator module 504 can create multiple embeddings for a single object (e.g., an object may be embedded in a domain-specific or application-specific context). In some embodiments, the chunking module 512 (discussed below) along with the orchestrator module 504 can curate the data domains for embedding objects of the data domains in the enterprise information systems and/or environments. In some embodiments, the orchestrator 504 can cooperate with the chunking module 512 to provide the embedding functionality described herein.

In some embodiments, the orchestrator module 504 can cause an agent 506 to perform data modeling to translate raw source data formats into target embeddings (e.g., objects, types, and/or the like). Data formats can include some or all of the different types or modalities described herein (e.g., multimodal, text, coded, language, statistical, audio, visual, audiovisual, etc.). In an example implementation, the orchestrator module 504, and/or the enterprise generative artificial intelligence system 402 generally, employs a type system of a model-driven architecture to perform data modeling to translate raw source data formats into target types. A knowledge base of the enterprise generative artificial intelligence system 402 and generative artificial intelligence models can create the ability to integrate or combine insights from different artificial intelligence applications.

As discussed elsewhere herein, the enterprise generative artificial intelligence system 402 can handle machine-readable inputs (e.g., compiled code, structured data, and/or other types of formats that can be processed by a computer) in addition to human-readable inputs. Inputs can also include complex inputs, such as inputs including "and," "or", inputs that include different types of information to satisfy the input (e.g., text documents, database tables, and artificial intelligence insights). The orchestrator 504 may break up these complex inputs (e.g., by using a large language model) to be handled by multiple agents 506 (e.g., in parallel).

As discussed above, the orchestrator module 504 can function to execute and/or otherwise process various supervisory functions. In some implementations, the orchestrator module 504 may enforce conditions (e.g., stopping conditions, resource allocation, prioritization, and/or the like). For example, a stopping condition may indicate a maximum number of iterations (or, hops) that can be performed before the iterative process terminates. The stopping condition, and/or other features managed by the orchestrator module 504, may be included in large language model prompts and/or in the large language models of the orchestrator and/or comprehension module 510, discussed below. In some embodiments, the stopping conditions can ensure that the enterprise generative artificial intelligence system 402 will not get stuck in an endless loop. This feature can also allow the enterprise generative artificial intelligence system 402 the flexibility of having a different number of iterations for different inputs (e.g., as opposed to having a fixed number of hops). In another example, the orchestrator module 504 can perform resource allocation such as virtualization or load balancing based on computing conditions. In some implementations, the orchestrator module 504 and/or agents 506 include models that can convert (or, transform) an image, database table, and/or other non-text input, into text format (e.g., natural language).

In some embodiments, the orchestrator module 504 can function to cooperate with agents 506 (e.g., retrieval agent module 506-1, unstructured data retriever agent module 506-2, structured data retriever agent module 506-3) to iteratively and non-iteratively process inputs to determine output results or answers, determine context and rationales for informing subsequent iterations, and determine whether large language models (e.g., of the orchestrator 504 and/or comprehension module 510) require additional information to determine answers. For example, the orchestrator module 504 may receive a query and instruct agent 506-1 to retrieve associated information. The retrieval agent module 506-1 may then select unstructured data retriever agent module 506-2 and/or structured data retriever agent module 506-3 depending on whether the orchestrator module 504 wants to retrieve structured or unstructured data records. The appropriate agents 506 can the select the corresponding tools and provide the tool output to the orchestrator module 504 and/or comprehension module 510 for determining a final result.

The orchestrator 504 may also select and swap models as needed. For example, the orchestrator 504 may change out models (e.g., data models, large language models, machine learning models) of the enterprise generative artificial intelligence system 402 at or during run-time in addition to before or after run-time. For example, the orchestrator 504, agents 506, and comprehension module 510 may use particular sets of machine learning models for one domain and other models for different domains. The orchestrator 504 may select and use the appropriate models for a given domain and/or input.

In some embodiments, the orchestrator 504 may combine (e.g., stitch) outputs/results from various agents to create a unified output. For example, one or more of the agent modules 506 may obtain/output a document (or segment(s) thereof) or related information (e.g., text summary or translation), another agent module 506 may obtain/output a database table, and the like. The orchestrator 504 may then use one or more machine learning models (e.g., a large language model and/or another machine learning model) to combine the outputs/results into a unified output (e.g., having a common data format, such as natural language).

In some implementations, the orchestrator 504 pre-processes inputs (e.g., initial inputs) prior to the input being sent to one or more agents 506 for processing. For example, the orchestrator 504 may transform a first portion of an input into an SQL query and send that to an unstructured data retriever agent module 506-2 agent, transform a second portion of the input into an API call and send that to an API agent module 506-7, and the like. In another example, such transformation functionality may be performed by the agents 506 instead of, or in addition to, the orchestrator 504.

The orchestrator module 504 can function to process, extract and/or transform different types of data (e.g., text, database tables, images, video, code, and/or the like). For example, the orchestrator module 504 may take in a database table as input and transform it into natural language describing the database table which can then be provided to the comprehension module 510, which can then process that transformed input to "answer," or otherwise satisfy a query. In some embodiments, a large language model may be used to process text, while another model may be used to convert (or, transform) an image, database table, and/or other non-text input, into text format (e.g., natural language).

It will be appreciated that, in some embodiments, the orchestrator module 504 can include some or all of the functionality of the comprehension module 510. For example, the comprehension module 510 may be a component of the orchestrator module 504. Similarly, in some embodiments, the comprehension module 510 may include some or all of the functionality of the orchestrator module 504.

In the example of FIG. 5, the agent modules 506 include a variety of different example agent modules 506-1 to 506-N. It will be appreciated that these are shown by way of example, and various embodiments may include different agents instead of, or in addition to, the agents 506-1 to 506-N. In some embodiments, each of the agents 506 comprises hardware and/or software, and include one or more large language models, one or more other machine learning models, and/or functions, to provide reasoning functionality to accomplish a prescribed set of tasks. It will be appreciated that reference to an agent module may refer to the agent itself and/or the component that generates and/or executes the agent. In some embodiments, the orchestrator is a type of agent and may be referred to as an orchestrator agent. Accordingly, reference to orchestrator may refer to the orchestrator itself and/or the component that generates and/or executes the orchestrator.

In some embodiments, agents 506 use models to determine a sequence of choices. The determined decision sequence can include comparing choices, summarizing multiple choices, and/or analyzing multiple choices to generate context information about the choices. The agents 506 may also check conflicts or similarities between choices.

In various embodiments, some or all the agents 506 can process data having disparate data types and/or data formats. For example, the agent modules 506 may receive a database table or an image as input (e.g., received from a tool 508) and translate the table or image into natural language describing the table or image which can then be output for processing by other modules, models, and/or systems (e.g., the orchestrator module 504 and/or comprehension module 510). In one example, a large language model may be used to process text, while another model may be used to convert (or, transform) an image, database table, and/or other non-text input, into text format (e.g., natural language).

The retrieval agent module 506-1 can function to retrieve structured and unstructured data records. In some embodiments, the retrieval agent module 506-1 can coordinate/instruct the unstructured data retriever agent module 506-2 to retrieve unstructured data records and coordinate/instruct the structured data retriever agent module 506-3 and the type system retriever agent 506-4 to retrieve structured data records. For example, the retrieval agent module 506-1 may cooperate with other agents 506 and tools 508 to generate SQL queries to query an SQL database.

The unstructured data retriever agent module 506-2 can function to retrieve unstructured data records (e.g., from an unstructured datastore) and/or passages (or, segments) of those data records. Unstructured data records may include, for example, text data that is stored on a file system in a format such as PDF, DOCX, .MD, HTML, TXT, PPTX, and the like.

In some embodiments, the agent 506-2 can use embeddings (e.g., vectors stored in vector store 540) when retrieving information. For example, the agent 506-2 can use a similarity evaluation or search on the vector datastore 540 to find relevant data records based on k-nearest neighbor, where embeddings that are closer to each other are more likely relevant.

In some embodiments, the unstructured data retriever agent module 506-2 implements a Read-Extract-Answer (REA) data retrieval process and/or a Read-Answer (RA) data retrieval process. More specifically, REA and RA can be appropriate when the system 402 needs to process large amounts of data. For example, a query may identify many different data records and/or passages (e.g., hundreds or thousands of data records and passages). For simplicity, reference to data records may include data records and/or passages.

More specifically, the unstructured data retriever agent module 506-2 can determine whether each data record is relevant to answer the query and filter out the data records that are not relevant. For example, the agent 506-2 can calculate and assign relevance scores (e.g., using a machine learning relevance model) for each of the retrieved data records. The relevance score can be relative to the other retrieved data records. For example, the least relevant data record may be assigned a minimum value (e.g., 0) and the most relevant data record may be assigned a maximum value (e.g., 100). The unstructured data retriever agent module 506-2 may filter out documents that are relevant (or the documents that are not relevant). For example, the unstructured data retriever agent module 506-2 may filter out data records that have a relevance score below a configurable threshold value (e.g., 50). In some embodiments, the number of data records that the unstructured data retriever agent module 506-2 can retrieve for a particular input or query can be user or system defined, and also may be configurable. For example, a system may define that a maximum of 50 data records can be returned.

In some embodiments, a large language model (e.g., of the unstructured data retriever agent module 506-2) can identify key points of the relevant documents and passages, and then provide the key points to a large language model (e.g., a large language model of the orchestrator 504). The large language model can provide a summary which can be used to generate the query answer (e.g., the summary can be the query answer). This can, for example, allow the system 402 to look at a wide diversity of concepts and documents (e.g., as opposed to an iterative process). In some embodiments, if the number of documents or passages is below a threshold value, the unstructured data retriever agent module 506-2 can skip the "extract" step (e.g., summarizing key points), and provide the passages directly to the large language model. This can be referred to as the RA process.

The structured data retriever agent module 506-3 can function to retrieve structured data records, and/or passages (or, segments) thereof, from various structured datastores. For example, structured data records can include tabular data persisted in a relational database, key value store, or external database and modeled or accessed with entity types (or, simply, types). Structured data records can include data records that are structured according to one or more data models (e.g., complex data models) and/or data records that can be retrieved based on the one or more data models. Structured data records can include data records stored in a structured datastore (e.g., a datastore structured according to one or more data models).

In a specific implementations, data models may include a graph structure of objects or types, and the agents 506 and/or tools 508 can traverse the graph in different paths to identify relevant types of the data model (e.g., depending on the query and a plan to answer the query provided by the orchestrator module 504) and can combine multiple tables with complex joins (e.g., as opposed to simply passing a single data from and performing operations on that single table). The paths may be stored in a datastore (e.g., a vector datastore 540) for efficient retrieval.

In some embodiments, the structured data retriever agent module 506-3 can use a variety of different tools to retrieve structured data (e.g., structured data retrieval tool 508-2, filter tool 508-9, projections tool 508-10, group tool 508-11, order tool 508-12, limit tool 508-13, and the like). In some embodiments, once the structured data retriever agent module 506-3 has traversed the data model and retrieved the relevant type(s) and/or subsets of the data model, the structured data retriever agent module 506-3 can then use that information, along with the agent and/or tool outputs, to construct a structured query specification which it can execute against one or more structured datastores to retrieve the structured data records.

The type system retriever agent module 506-4 can function to retrieve types, data models, and/or subsets of data models. For example, a data model may include a variety of different types, and each of the types may describe data fields, operations, and functions. Each type can represent a different object (e.g., a real-word object, such as a machine or sensor in a factor), and each type can include a large language model context that provides context for a large language model. Types can be defined in a natural language format for efficient processing by large language models.

In some embodiments, a type system is designed to be used by different computing systems, application developers, data scientists, operations personnel, and/or other users, to build applications, develop and execute machine learning algorithms, and manage and monitor the state of jobs running on a type system (e.g., an enterprise generative artificial intelligence system in some embodiments). A design goal of the type system is to provide a framework that enables systems, application developers, data scientists, and other users to effectively communicate with each other using the same language. Accordingly, an application developer can interact with the enterprise generative artificial intelligence system 402 in the same way as a data scientist. For example, they can use the same types, the same methods, and the same features.

In some embodiments, a type system can abstract the complex infrastructure inside the enterprise generative artificial intelligence system 402. In one example, developers may never need to write SQL, CQL, or some other query processing language to access data. When a user reads data, the enterprise generative artificial intelligence system 402 can generate the correct query for the underlying data store, submit the query to the database, and present the results back to the user in the form of a collection of objects or result.

In some embodiments, a type can be similar to a programming language class (e.g., a JAVA class) and describes data fields, operations, and functions (e.g., static functions) that can be called on the type or by one or more applications, but the type is not tied to any particular programming language. A type can be a definition of one or more complex objects that the system 402 can understand. For example, a type can represent a wide range of objects, such as a water pump. Types can be used to model systems (e.g., computing clusters, key-value datastores, file systems, file storage, enterprise datastores, and the like) in addition to objects. In some embodiments, complex relationships, such as "when were which light bulbs in which light fixtures" can be modeled as a type.

Type definitions can be a canonical type declared in metadata using syntax similar to that used by types persisted in the relational or NoSQL data store. A canonical model in the type system is a model that is application agnostic (i.e., application independent), enabling all applications to communicate with each other in a common format. Unlike a standard type, canonical types are comprised of two parts, the canonical type definition and one or more transformation types. The canonical type definition defines the interface used for integration and the transformation type is responsible for transforming the canonical type to a corresponding type. Using the transformation types, the integration layer may transform a canonical type to the appropriate type.

The type system provides data accessibility, compatibility and operability with disparate systems and data. Specifically, the type system solves data operability across diversity of programming languages, inconsistent data structures, and incompatible software application programming interfaces. Type system provides data abstraction that defines extensible type models that enables new properties, relationships and functions to be added dynamically without requiring costly development cycles. The type system can be used as a domain-specific language (DSL) within a platform used by developers, applications, or UIs to access data. The type system provides interact ability with data to perform processing, predictions, or analytics based on one or more type or function definitions within the type system.

The machine learning insight agent module 506-5 can function to obtain and/or process outputs from artificial intelligence applications (e.g., artificial intelligence application insights). For example, the machine learning insight module 506-5 can instruct the text processing tool 508-3 to perform a text processing task (e.g., transform an artificial intelligence application into natural language), an image processing tool 508-4 to perform an image processing task (e.g., generate a natural language summary of an image outputted from artificial intelligence application), a timeseries tool 508-3 to summarize timeseries data (e.g., timeseries data output from an artificial intelligence application), and an API tool 508-6 to perform an API call task (e.g., execute an API call to trigger or access an artificial intelligence application).

The timeseries processing agent 506-6 can function to obtain and/or process timeseries data, such as timeseries data output from various applications (e.g., artificial intelligence applications), machines, sensors, and the like. The timeseries processing agent 506-6 can instruct and/or cooperate with the timeseries processing tool module 508-3 to obtain timeseries data from one or more artificial intelligence applications and/or other data sources.

The API agent module 506-7 can function coordinate and manage communication with other applications. For example, the API agent module 506-7 may instruct the API tool module 508-6 to execute various API calls and then process those tool outputs (e.g., transform into a natural language summary).

The math agent module 506-8 can function to determine whether an agent 506 or large language model needs additional information to generate an answer or result. In some embodiments, the math agent 506-8 may instruct the optimizer tool module 508-8 to execute a variety of different prescriptive analytics functions and mathematical optimizations to assist in the calculation of answers for various problems. For example, the orchestrator module 504 may use the math agent module 506-8 to generate plans, determine whether the orchestrator module 504 needs more information to generate a final result, and the like.

The visualization agent module 506-9 can function to generate one or more visualizations and/or graphical user interfaces, such as dashboards, charts, and the like. For example, the visualization agent module 506-9 may execute visualization tool module 508-7 to generate dashboards based on information retrieved by the other agents and/or information output by the other agents (e.g., natural language summaries of associated tool outputs). The visualization agent module 506-9 may also function to generate summaries (e.g., natural language summaries) of visual elements, such as charts, tables, images, and the like.

The code generation agent module 506-10 can function to instruct the code generation tool module 508-14 to generate source code, machine code, and/or other computer code. For example, the code generation agent module 506-10 may be configured to determine what code is needed (e.g., to satisfy a query, create an application, and the like) and instruct the tool 508-14 to generate that code in a particular language or format.

In some embodiments, the tools 508 are specific functions that agents (e.g., agents 506, orchestrator module 504) can access or execute while attempting to accomplish prescribed task(s) (e.g., of a set of prescribed tasks of a plan determined by the orchestrator module 504). Tools 508 can include software and/or hardware. Tools 508 may also include one or more machine learning models, but they may also include functions without any machine learning model. In some embodiments, tools 508 do not include large language models, although in other embodiments tools may include large language models. In some embodiments, some or all of the agents 506 and/or tools 508 can be manually configured (e.g., by a user). Agents 506 and tools 508 may also normalize data (e.g., to a common data format) before outputting the data.

The unstructured data retrieval tool 508-1 can function to retrieve unstructured data records from an unstructured data store. In some embodiments, the agent 506-2 can use embeddings (e.g., vectors stored in vector store 540) when retrieving information. For example, the agent 506-2 can use a similarity evaluation or search to find relevant data records based on k-nearest neighbor, where embeddings that are closer to each other are more likely relevant. The structured data retrieval tool 508-2 can function to access and retrieve structured data records from a structured datastore (e.g., structured or modeled according to a data model). The structured data retrieval tool 508-2 may be executed by the structured data retriever agent module 506-3).

The text processing tool module 508-3 can function to retrieve and/or transform text (e.g., from unstructured data records) and perform other text processing tasks (e.g., transform a text-based output of artificial intelligence application into natural language). The image processing tool module 508-4 can function to perform an image processing task (e.g., generate a natural language summary of an image). The timeseries processing tool module 508-5 can function to obtain and/or process timeseries data (e.g., output from artificial intelligence applications, sensors, and the like). For example, the timeseries processing tool module 508-3 may be executed one or more of the agents 506 to obtain and process timeseries data. The API tool module 508-6 can function to perform an API call task (e.g., execute an API call to trigger or access an artificial intelligence application). For example, different agents 506 may use the API tool module 506-8 whenever the agent needs to access or trigger another application.

The visualization tool module 508-7 can function to generate one or more visualizations and/or graphical user interfaces, such as dashboards. For example, the visualization tool module 508-7 may generate dashboards based on information retrieved by the other agents and/or information output by the other agents (e.g., natural language summaries of associated tool outputs). The filter tool module 508-9 can function to filter data records, types, and/or the like. For example, the filter tool module 508-9 may filter projections (e.g., fields) identified by the projections tool module 508-10 as part of a structured data retrieval process. In various embodiments, tools 508 can execute in parallel or otherwise.

In some embodiments, the filter tool module 508-9 can identify implicit filters based on a query or other input, and those identified implicit filters can be used as part of a structed data retrieval process. For example, a query may include "When was a premium towel out last?" The filter tool module 508-9 may identify "premium towel" as a filter (e.g., based on an associated type description). The filter tool module 508-9 may also identify contextual datetime filters. For example, a query may include "How many systems when offline yesterday?" The filter tool module 508-9 may determine yesterday's date while accounting for time zone and other relevant data to generate an accurate filter. In some embodiments, the filter tool module 508-9 can validate identified filters prior to the filters being used (e.g., as part a structured data retrieval process).

The projections tool module 508-10 can function to identify and select fields (e.g., type fields, object fields) that are relevant to determine an answer to a query or other input. The group tool module 508-11 can function to group data (e.g., types, tool outputs, and the like) which can then be used to generate structured query requests (e.g., by the structured data retriever agent module 506-3 and/or structured data retrieval tool module 508-2).

The order tool module 508-12 can function to order data (e.g., types, tool outputs, and the like) which can then be used to generate structured query requests (e.g., by the structured data retriever agent module 506-3 and/or structured data retrieval tool module 458-2). The limit tool module 508-13 can function to limit the output of a structured data retrieval process. For example, it may limit the number of retrieved data records, types, groups, filters, and or the like.

The code generation tool module 508-14 can function to generate source code, machine code, and/or other computer code. For example, the code generation tool module 508-14 may be configured to generate and/or execute SQL queries, JAVA code, and/the like. The code generation tool module 508-14 may be used to facilities query generation for agents, other tools, large language models, and the like. The code generation tool module 508-15, in some embodiments, may be configured to generate source code for an application or create an application.

The comprehension module 510 can function to process inputs to determine results (e.g., "answers"), determine rationales for results, and determine whether the comprehension module 510 needs more information to determine results. The comprehension module 510 may output information (e.g., results or additional queries) in a natural language format or machine language format. In some implementations, features of one or more models of the comprehension module define conditions or functions that determine if more information is needed to satisfy the initial input or if there is enough information to satisfy the initial input.

In some embodiments, the comprehension module 510 includes one or more large language models. The large language models may be configured to generate and process context, as well as the other information described herein. The comprehension module 510 may also include other language models that pre-process inputs (e.g., a user query) prior to inputs being provided to the agents for handling. The comprehension module 510 may also include one or more large language models that process outputs from other models and modules (e.g., models of the agents 506). The comprehension module 510 may also include another large language model for processing answers from one large language model into a format more consistent with a final answer that can be transmitted to various users and/or systems (e.g., users or systems that provided the initial query or other intended recipient of the answer).

For example, the comprehension module 510 may format answers according to various viewpoints. Viewpoints can be based on a type of user (e.g., human or machine), user roles (e.g., e.g., data scientist, engineer, director, and the like), access permissions, and the like. Accordingly, viewpoints enable the comprehension module 510 to generate and provide an answer specifically targeted for the recipient. The comprehension module 510 may also notify users and systems if it cannot find an answer (e.g., as opposed to presenting an answer that is likely faulty or biased).

In some implementations, features of one or more large language models of the comprehension module 510 define conditions or functions that determine if more information is needed to satisfy the initial input or if there is enough information to satisfy the initial input. The large language models of the comprehension module 510 may also define stopping conditions that indicate a stopping threshold condition indicating a maximum number of iterations that may be performed before the iterative process is terminated.

In some embodiments, the comprehension module 510 can generate and store rationales and contexts (e.g., in datastore 910). The rationale may be the reasoning used by the comprehension module 510 to determine an output (e.g., natural language output, an indication that it needs more information, an indication that it can satisfy the initial input). The comprehension module 510 may generate context based on the rationale. In some implementations, the context comprises a concatenation and/or annotation of one or more segments of data records, and/or embeddings associated therewith, along with a mapping of the concatenations and/or annotations. For example, the mapping may indicate relationships between different segments, a weighted or relative value associated with the different segments, and/or the like. The rational and/or context may be included in the prompts that are provided to the large language models.

In some embodiments, the comprehension module 510 includes a query and rational generator that generates queries or other inputs for models (e.g., large language models, other machine learning models) and/or generates and stores the rationales and contexts (e.g., in the datastore 560). The query and rational generator can function to process, extract and/or transform different types of data (e.g., text, database tables, images, video, code, and/or the like). For example, the query and rational generator may take in a database table as input and transform it into natural language describing the database table which can then be provided to the one or more other models (e.g., large language models) of the comprehension module 510, which can then process that transformed input to "answer," or otherwise satisfy a query. In some implementations, the query and rational generator includes models that can convert (or, transform) an image, database table, and/or other non-text input, into text format (e.g., natural language). It will be appreciated that although queries are used in various examples throughout this paper, other types of inputs (e.g., instruction sets) may be processed in the same or similar manner as described with respect to queries.

In some embodiments, the comprehension module 510 can use different models for different domains. For example, different domains may correspond to different industries (e.g., aerospace, defense), different technological environments (e.g., air-gapped, cloud-native), different enterprises or organizations, and/or the like. Accordingly, the comprehension module 510 can use particular models (e.g., data models and/or large language models) for a particular domain (e.g., a data model describing properties and relationships of aerospace objects and a large language model trained on aerospace-specific datasets) and use another data model and/or large language model for another domain (e.g., data model describing properties and relationships of defense-specific objects and a large language model trained on defense-specific datasets), and so forth.

In some embodiments, the orchestrator module 504 includes some or all of the functionality and/or structure of the comprehension module 510 and/or 906, described further below. Similarly, in some embodiments, the comprehension module 510 may include some or all of the functionality and/or structure of the orchestrator module 504.

In some embodiments, the comprehension module 510 can function to generate large language model prompts (or, simply, prompts) and prompt templates. For example, the comprehension module 510 may generate a prompt template for processing an initial input, a prompt template for processing iterative inputs (i.e., inputs received during the iteration process after the initial input is processed), and another prompt template for the output result phase (i.e., when the comprehension module 510 has determined that it has enough information and/or a stopping condition is satisfied). The comprehension module 510 may modify the appropriate prompt template depending on a phase of the iterative process. For example, prompt templates can be modified to generate prompts that include rationales and contexts, which can inform subsequent iterations.

The chunking module 512 can function to process (e.g., chunk) a corpus of data records (e.g., of one or more enterprise systems) for handling by the enterprise generative artificial intelligence system 402. Data records, as used herein, may include any type of data record that may be stored in a datastore, such as unstructured data records and structured data records. For example, data records can include documents (e.g., PDF, text, html, markdown source code), database tables, information generated by application (e.g., artificial intelligence application insights), images, audiovisual files, executables, data records structured according to a data model and/or type system, and the like. More specifically, the chunking module 512 can pre-process and chunk the data records. The chunking process can partition data records and insert or append a respective header for each chunk. The header may include, for example, one or more attributes describing the chunk (e.g., type of data records, size of chunk, etc.). Chunks may be referred to as segments herein. Segments may include, for example, the header along with a passage of a text document, a portion of database table, and so forth. For simplicity, reference to a passage may include a segment and/or the content (e.g., text) of a segment. Segments can be stored in a segment datastore (e.g., vector store 540). A data record can be chunked into a tree structure where each leaf corresponds to a segment. Chunking can be rule-based.

In some implementations, pre-processing includes generating contextual information for data records and/or segments. The contextual information may improve security, as well as accuracy and reliability of associated retrieval operations. In one example, contextual information comprises contextual metadata. The contextual information can include references between segments and/or data records. For example, the references may indicate relationships that can be used (e.g., traversed) when performing similarity evaluations or other aspects of retrieval operations (e.g., by one or more of the agents 506). Contextual information may also include information that can assist a large language model in generating a plan and/or answers. For example, the chunking module 512 may generate contextual information for structured data chunks (or passages) that include natural language descriptions of the data records, locations of related data records, and the like.

The contextual information may include access controls. In some implementations, contextual information provides user-based access controls. More specifically, the contextual information can indicate user roles that may access a corresponding segment and/or data record, and/or user roles that may not access a corresponding segment and/or data record. The contextual information may be stored in headers of the data records and/or data record segments.

In some embodiments, the chunking module 512 can generate embeddings based on both structured and unstructured data records and/or segments. The chunking module 512 may include a deep learning model that can convert and/or transform data records into a vector representation, where the vectors for semantically similar data records (e.g., the content of the data records) are close together in the vector space. This can facilitate retrieval operations by the agents 506 and tools 508.

In some embodiments, the chunking module 512 can generate embeddings using one or more embeddings models (e.g., an implementation of the ColBERT embedding model). The embeddings may include a numerical representation for unstructured and/or structured data records that captures the semantic or contextual meaning of the data records. For example, the embeddings may be represented by one or more vectors. The embeddings may be used when retrieving data records and performing similarity evaluations or other aspects of retrieval operations. The embeddings may be stored in an embeddings index (e.g., vector datastore 540). In some embodiments, the vector store 540 is a type of database that is specifically optimized for storing embeddings and retrieving embeddings using a similarity heuristic (e.g., an approximate nearest neighbor (ANN) algorithm) that can be implemented by the agents 506 and/or tools 508. In one example, the vector store 540 may comprise an implementation of a FAISS vector store.

In some implementations, the chunking module 512 generates enriched embeddings. For example, the chunking module 512 may generate enriched embeddings based on the contextual information, data records, and/or data record segments. An enriched embedding may comprise a vector value based on an embedding vector and the contextual information. In some embodiments, an enriched embedding comprises the embedding vector value along with the contextual metadata including the contextual information. Enriched embeddings may be indexed in an enriched embeddings datastore (e.g., a vector datastore 540). The agents 506 and/or tools 508 may retrieve unstructured and/or structured data records based on enriched embeddings.

In some embodiments, the chunking module 512 may perform some or all of the functionality described herein periodically (e.g., in batches), on-demand, and/or in real time. For example, the chunking module 512 may periodically trigger, on-demand trigger, manually trigger, and/or automatically trigger, the chunking described herein. In some implementations, subsequent chunking operations may only incorporate changes relative to previous chunking operations (e.g., the "delta").

In some embodiments, the chunking module 512 may generate contextual information for data records and/or segments. The contextual information may be represented by contextual metadata that provides access control (e.g., role-based access control) to associated data records and/or segments. The contextual information may maintain references between data records and/or data records segments. The chunking module 512 may insert and/or append contextual information in segment headers. The chunking module 512 may generate contextual information before, after, or at the same time as the associated embeddings are generated. For example, embeddings may be created using context information, or embeddings may be enriched with contextual information. The contextual information may be used by the chunking module 512 to map relationships between data records and/or segments of one or more enterprises or enterprise systems and store those relationships in a data model and/or datastore (e.g., datastore 570). As discussed elsewhere herein, the chunking module 512 can generate embeddings and/or enriched embeddings. In one example, the chunking module 512 implements a word2vec algorithm. In some implementations, the chunking module 512 utilizes models trained on domain-specific (or, industry-specific) datasets.

The enterprise access control module 514 can function to provide enterprise access controls (e.g., layers and/or protocols) for the enterprise generative artificial intelligence system 402, associated systems (e.g., enterprise systems), and/or environments (e.g., enterprise information environments). The enterprise access control module 514 can provide functionality for enforcement of access control policies with respect to generating results (e.g., preventing the orchestrator module 504 and/or comprehension module 510 from generating results that include sensitive information) and/or filtering results that have already been generated prior to providing a final result.

In some implementations, the enterprise access control module 514 may evaluate (e.g., using access control lists) whether a user is authorized to access all or only a portion of a result (e.g., answer). For example, a user can provide a query associated with a first department or sub-unit of an organization. Members of that department or sub-unit may be restricted from accessing certain pieces of data, types of data, data models, or other aspects of a data domain in which a search is to be performed. Where the initial results include data for which access by the user is restricted, the enterprise access control module 514 can determine how such restricted data is to be handled, such as to omit the restricted data entirely, omit the restricted data but indicate the results include data for which access by the user is restricted, or provide information related to all of the initial results. In the example where restricted data is omitted entirely, a final set of results may be returned for presentation to the user, where the final set of results does not inform the user that a portion of the initial results have been omitted. In the example where the restricted data is omitted but an indication of the presence of the restricted data is provided to the user, the final results may include only those results for which the user is authorized for access, but may include information indicating there were X number of initial results but only Y results are outputted, where Y<X. In the third example described above, all of the results may be outputted to the user, including results for which access is restricted by the user.

Additionally, or alternatively, the enterprise access control module 514 may communicate with one or more other modules to obtain information that may be used to enforce access permissions/restrictions in connection with performing retrieval operations instead of for controlling presentation of the results to the user. For example, enterprise access control module 514 may restrict the data sources to which retrieval operations are applied, such as to not apply a retrieval operation to portions of the data sources for which user access is denied and apply the retrieval operations to portions of the data sources for which user access is permitted. It is noted that the exemplary techniques described above for enforcing access restrictions have been provided for purposes of illustration, rather than by way of limitation and it should be understood that modules operating in accordance with embodiments of the present disclosure may implement other techniques to present results via an interface based on access restrictions.

In some embodiments, to facilitate the enforcement of access restrictions in connection with searches performed by the enterprise generative artificial intelligence system 402, the enterprise access control module 514 may store information associated with access restrictions or permissions for each user. To retrieve the relevant restriction data for a user, the enterprise access control module 514 may receive information identifying the user in connection with the input or upon the user logging into system on which the enterprise access control module 514 is executing. The enterprise access control module 514 may use the information identifying the user to retrieve appropriate restriction data for supporting enforcement of access restrictions in connection with an enterprise search. In some embodiments, the enterprise access control module 514 can include credential management functionality of a model driven architecture in which the enterprise generative artificial intelligence system 402 is deployed or may be a remote credential management system communicatively coupled to the enterprise generative artificial intelligence system 402 via a network.

The artificial intelligence traceability module 516 can function to provide traceability and/or explainability of answers generated by the enterprise generative artificial intelligence system 402. For example, the artificial intelligence traceability module 516 can indicate portions of data records used to generate the answers and their respect data sources. The artificial intelligence traceability module 516 can also function to corroborate large language model outputs. For example, the artificial intelligence traceability module 516 can provide sources citations automatically and/or on-demand to corroborate or validate large language model outputs. The artificial intelligence traceability module 516 may also determine a compatibility of the different sources (e.g., data records, passages) that were used to generate a large language model output. For example, the artificial intelligence traceability module 516 may identify data records that contradict each other (e.g., one of the data records indicate that John Doe is an employee at Acme corporation and another data record indicates that John Doe works at a different company) and provide a notification that the output was generated based on contradictory on conflicting information.

The parallelization module 520 can function to control the parallelization of the various systems, modules, agents, models, and processes described herein. For example, the parallelization module 520 may spawn parallel executions of different agents and/or orchestrators. The parallelization module 520 may be controlled by the orchestrator module 504.

The model generation module 522 can function to obtain, generate, and/or modify some or all of the different types of models described herein (e.g., machine learning models, large language models, data models). In some implementations, the model generation module 522 can use a variety of machine learning techniques or algorithms to generate models. As used herein, artificial intelligence and/or machine learning can include Bayesian algorithms and/or models, deep learning algorithms and/or models (e.g., artificial neural networks, convolutional neural networks), gap analysis algorithms and/or models, supervised learning techniques and/or models, unsupervised learning algorithms and/or models, semi-supervised learning techniques and/or models random forest algorithms and/or models, similarity learning and/or distance algorithms, generative artificial intelligence algorithms and models, clustering algorithms and/or models, transformer-based algorithms and/or models, neural network transformer-based machine learning algorithms and/or models, reinforcement learning algorithms and/or models, and/or the like. The algorithms may be used to generate the corresponding models. For example, the algorithms may be executed on datasets (e.g., domain-specific data sets, enterprise datasets) to generate and/or output the corresponding models.

In some embodiments, a large language model is a deep learning model (e.g., generated by a deep learning algorithm) that can recognize, summarize, translate, predict, and/or generate text and other content based on knowledge gained from massive datasets. Large language models may comprise transformer-based models. Large language models can include Google's BERT, OpenAI's GPT-3, and Microsoft's Transformer. Large language models can process vast amounts of data, leading to improved accuracy in prediction and classification tasks. The large language models can use this information to learn patterns and relationships, which can help them make improved predictions and groupings relative to other machine learning models. Large language models can include artificial neural network transformers that are pre-trained using supervised and/or semi-supervised learning techniques. In some embodiments, large language models comprise deep learning models specialized in text generation. Large language models, in some embodiments, may be characterized by a significant number of parameters (e.g., in the tens or hundreds of billions of parameters) and the large corpuses of text used to train them.

Although the systems and processes described herein use large language models, it will be appreciated that other embodiments may use different types of machine learning models instead of, or in addition to, large language models. For example, an orchestrator 504 may use deep learning models specifically designed to receive non-natural language inputs (e.g., images, video, audio) and provide natural language outputs (e.g., summaries) and/or other types of output (e.g., a video summary).

The model deployment module 524 can function to deploy some or all of the different types of models described herein. In some implementations, the model deployment module 524 can deploy models before or after a deployment of enterprise generative artificial intelligence system. For example, the model deployment module 524 may cooperate with the model optimization module 526 to swap or other change large language models of an enterprise generative artificial intelligence system.

In some implementations, a model registry 550 can store various models (e.g., machine learning models, large language models, data models) and/or model configurations. The models may be trained on generic datasets and/or domain-specific datasets. For example, the model registry may store different configurations of various large language models (e.g., which can be deployed or swapped in an enterprise generative artificial intelligence system 402). In some embodiments, each of the models may be associated with an embedding value, or enriched embedding value, to facilitate retrieval operations (e.g., in the same or similar manner as data records retrievals).

The model optimization module 526 can function to enable tuning and learning by the modules (e.g., the comprehension module 212) and/or the models (e.g., machine learning models, large language models) described herein. For example, the model optimization module 526 may tune the comprehension module 510 and/or orchestrator module 504 (and/or models thereof) based on tracking user interactions within systems, capturing explicit feedback (e.g., through a training user interface), implicit feedback, and/or the like. In some example implementations, the model optimization module 526 can use reinforcement learning to accelerate knowledge base bootstrapping. Reinforcement learning can be used for explicit bootstrapping of various systems (e.g., the enterprise generative artificial intelligence system 402) with instrumentation of time spent, results clicked on, and/or the like. Example aspects of the model optimization module 526 include an innovative learning framework that can bootstrap models for different enterprise environments. Example aspects of the model optimization module 526 can include an innovative learning framework that can bootstrap models for different enterprise environments.

In some embodiments, reinforcement learning is a machine learning training method based on rewarding desired behaviors and/or punishing undesired ones. In general, a reinforcement learning agent is able to perceive and interpret its environment, take actions and learn through trial and error. Reinforcement Learning uses algorithms and models to determine optimal behavior in an environment to obtain maximum reward. This optimal behavior is learned through interactions with the environment and observations of how it responds. In the absence of a supervisor, the learner must independently discover the sequence of actions that maximize the reward. This discovery process is akin to a trial-and-error search. The quality of actions is measured by not just the immediate reward they return, but also the delayed reward they might fetch. As it can learn the actions that result in eventual success in an unseen environment without the help of a supervisor, reinforcement learning is a very powerful algorithm. ColBERT is an example retriever model, enabling scalable BERT-based search over large text collections (e.g., in tens of milliseconds). ColBERT uses a late interaction architecture that independently encodes a query and a document using BERT and then employs a "cheap" yet powerful interaction step that models their fine-grained similarity. Beyond reducing the cost of re-ranking documents retrieved by a traditional model, ColBERT's pruning-friendly interaction mechanism enables leveraging vector-similarity indexes for end-to-end retrieval directly from a large document collection.

In some embodiments, the model optimization module 526 can retrain models (e.g., transformer-based natural language machine learning models) periodically, on-demand, and/or in real-time. In some example implementations, corresponding candidate model (e.g., candidate transformer-based natural language machine learning models) can be trained based on the user selections and the model optimization module 526 can replace some or all of the models with one or more candidate models that have been trained on the received user selections.

It is noted that the described functionality has been provided by way of non-limiting example and other techniques may be used to generate queries and commands. For example, in additional or alternative implementations using multimodal or generative pre-trained transformers, which is an autoregressive language model that uses deep learning to produce human-like text, may be used to generate a query from the search input (i.e., without use of a seed bank). To illustrate, suppose the search input was "What are the riskiest motor actuators at Tinker?". As in the technique described above, the search input may be subjected to entity extraction and mapping, which would result in an entity matched search input of "What are the riskiest WUC 11AAF at Location AFB0123?." Input is subjected to embedding and vectorization, with a large language model is used for query generation the entity matched search input may be provided to the generative multimodal or large language model algorithm to generate the query. In such an implementation, a generative multimodal algorithm may be provided with contextual information, such as a schema of metadata defining table headers, field descriptions, and joining keys, which may be used to retrieve the search results. For example, the schema may be used to translate the entity matched search input into a query (e.g., an SQL query).

The system may leverage characteristics of a model driven architecture, which represent system objects (e.g., components, functionality, data, etc.) using rich and descriptive metadata, to dynamically generate queries for conducting searches across a wide range of data domains (e.g., documents, tabular data, insights derived from AI applications, web content, or other data sources). Furthermore, the query modules of embodiments may be particularly well suited to searches involving type systems, which expose objects through metadata. Accordingly, the query modules disclosed herein represent an improvement in the field of query modules and provide a mechanism for rapidly deploying search functionality across a wide variety of data domains relative to existing query modules, which are typically limited with respect to their searchable data domains (e.g., web query modules are limited to web content, file system query modules are limited to searches of file system, and so on).

In some embodiments, the model optimization module 526 can change out models of the enterprise generative artificial intelligence system at or during run-time in addition to before or after run-time. For example, the orchestrator module 504 comprehension module 510, and/or agents 506 may use particular sets of machine learning models for one domain and other models for different domains. The model swapping module may select and use the appropriate models for a given domain. This may even occur during the iteration process. For example, as new queries are generated by the comprehension module 510, the domain may change which may trigger the model swapping module to select and deploy a different model that is appropriate for that domain.

In some embodiments, the model optimization module 526 can train generative artificial intelligence models to develop different types of responses (e.g., best results, ranked results, smart cards, chatbot, new content generation, and/or the like).

In some embodiments, the model optimization module 526 can retrain models (e.g., large language models) periodically, on-demand, and/or in real-time. In some example implementations, corresponding candidate models can be trained based on the user selections and the system can replace some or all of the models with one or more candidate models that have been trained on the received user selections.

The interface module 528 can function to receive inputs (e.g., complex inputs) from users and/or systems. The interface module 528 can also generate and/or transmit outputs. Inputs can include system inputs and user inputs. For example, inputs can include instructions sets, queries, natural language inputs or other human-readable inputs, machine-readable inputs, and/or the like. Similarly, outputs can also include system outputs and human-readable outputs. In some embodiments, an input (e.g., request, query) can be input in various natural forms for easy human interaction (e.g., basic text box interface, image processing, voice activation, and/or the like) and processed to rapidly find relevant and responsive information.

In some embodiments, the interface module 528 can function to generate graphical user interface components (e.g., server-side graphical user interface components) that can be rendered as complete graphical user interfaces on the enterprise generative artificial intelligence system 402 and/or other systems. For example, the interface module 528 can function to present an interactive graphical user interface for displaying and receiving information.

The communication module 530 can function to send requests, transmit and receive communications, and/or otherwise provide communication with one or more of the systems, modules, engines, layers, devices, datastores, and/or other components described herein. In a specific implementation, the communication module 530 may function to encrypt and decrypt communications. The communication module 530 may function to send requests to and receive data from one or more systems through a network or a portion of a network (e.g., communication network 408). In a specific implementation, the communication module 530 may send requests and receive data through a connection, all or a portion of which can be a wireless connection. The communication module 530 may request and receive messages, and/or other communications from associated systems, modules, layers, and/or the like. Communications may be stored in the enterprise generative artificial intelligence system datastore 570.

In some embodiments, the configuration, coordination, and cooperation of the orchestrator module 504, agents 506, tools 508, and/or other modules of the enterprise generative artificial intelligence system 402 (e.g., comprehension module 510) enables the enterprise generative artificial intelligence system 402 to provide a multi-hop architecture that enables complex reasoning over multiple agents 506, tools 508, and data sources (e.g., vector datastores, feature datastores, data models, enterprise datastores, unstructured data sources, structured data sources, and the like). In various embodiments, some or all of the modules of enterprise generative artificial intelligence system 402 can be configured manually (e.g., by a user) and/or automatically (e.g., without requiring user input). For example, large language model prompts can be configured, tool 508 descriptions can be configured (e.g., for more efficient utilization by agents 506 and the orchestrator module 504), and a number of maximum hops or iterations can be configured. In one example, the orchestrator module 504 receives a query from a user, and the orchestrator module 504 determines a plan for answering the query and selects the agents 506 and/or tools 508 to execute a prescribed set of tasks enacting the plan to answer the query. The agents 506 and/or tools 508 execute the prescribed set of tasks, and the orchestrator module 504 observes the result. The orchestrator module 504 determines whether to submit a final answer or whether the orchestrator module 504 needs more information. If the orchestrator module 504 has enough information, it can generate and/or provide the final answer. Otherwise, the orchestrator module 504 can create another prescribed set of tasks, and the process can continue until the orchestrator module 504 has enough information to answer or if a stopping condition is satisfied (e.g., a maximum number of hops).

Figure 6:
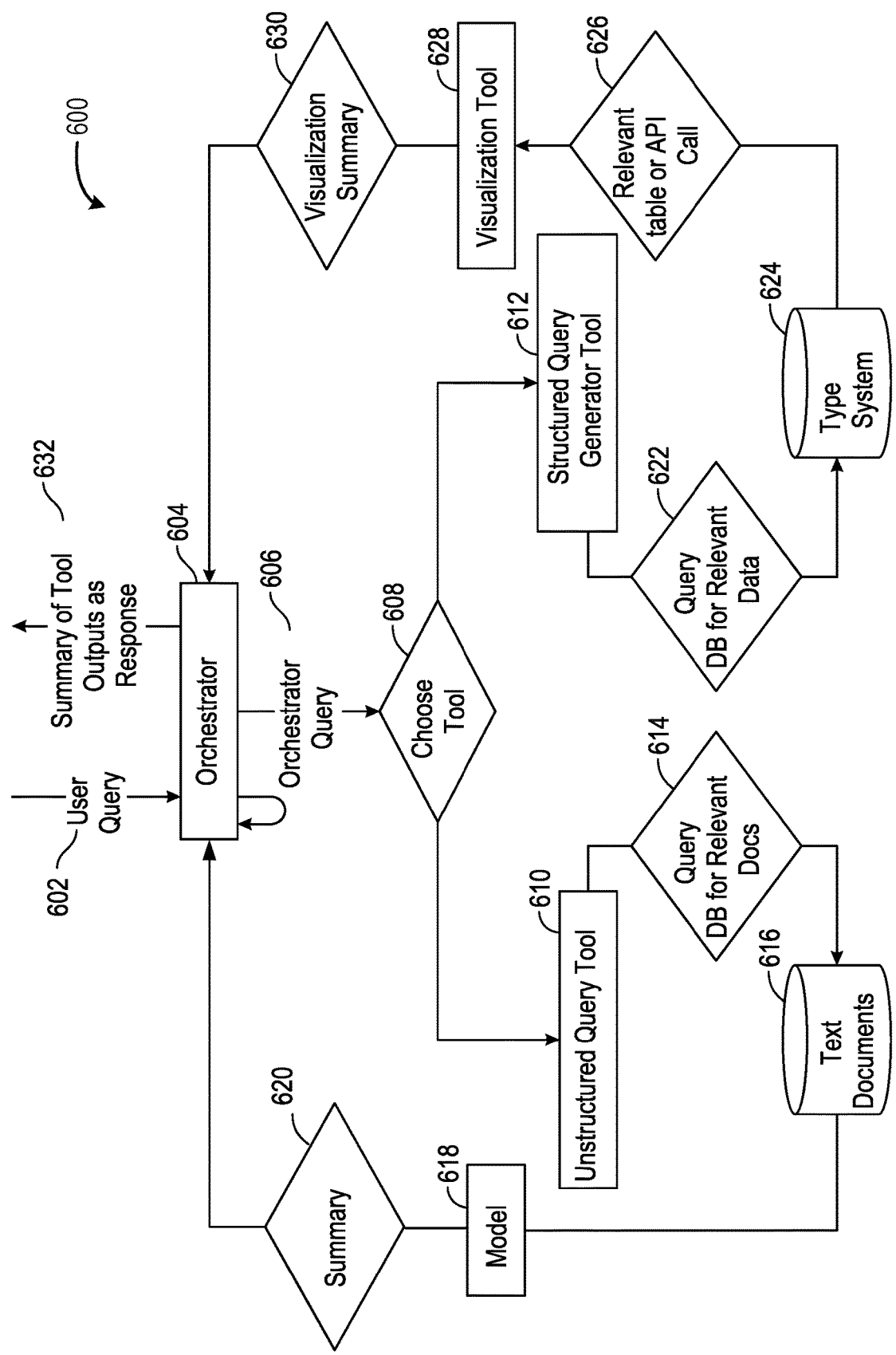
FIG. 6 depicts a flowchart of an example generative artificial intelligence unstructured data and structured data retrieval process.

FIG. 6 depicts a flowchart 600 of an example generative artificial intelligence unstructured data and structured data retrieval process. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 602, a user provides a query which is received by an orchestrator 604. Although a user query is shown here, it will be appreciated that other inputs may be used instead (e.g., machine readable inputs received from other systems). The orchestrator module may pre-process the user query. For example, the orchestrator 604 may translate a machine-readable input to a natural language format, a French language input into an English language input, and the like.

In step 606, the orchestrator generates a query 606 based on the user query and selects various tools to process the orchestrator query 606. In step 608 the orchestrator 604 selects the unstructured data retrieval tool 610 and the structured query generator tool 612. The unstructured query tool 610 can query a datastore 616 (e.g., vector store) for relevant unstructured data records (step 614). The unstructured data records can be provided to another model 618 (e.g., a large language model of the orchestrator 604) which can generate a summary 620 of retrieved unstructured data records. For example, the large language model of the orchestrator 604 may not be able to handle large data inputs, so the model 618 can generate a summary in a natural language format that can be efficiently and accurately handled by the orchestrator 604.

In step 622, the structured query generator tool 612 queries a type system 624 for relevant data. The query response 626 may identify one or more database tables and/or API calls in step 626, and the database tables and/or types can be retrieved, and the APIs calls (e.g., to an artificial intelligence application) can be executed. A visualization tool 628 may provide a visualization summary 630 of the retrieved database tables and API call execution results. For example, the visualization summary 630 may include graphical elements (e.g., graph, chart, dashboard) and/or a natural language summary of such graphical elements. In step 632 the orchestrator can generate a final result based on the summary 620 (i.e., summary based on unstructured data) and the summary 630 (i.e., summary based on structured data retrieval). The final result may include a natural language summary based on a viewpoint of the user. Visualization can be three dimensional (3D) and include interactive elements related to the deterministic output, for example, that enable executing instructions (e.g., transmissions, control system commands, etc.), drilling into traceability, activating application features, and the like.

In some embodiments, the orchestrator, tools, and/or datastores described in FIG. 6 include some or all of the functionality of the orchestrators, agents, tools, and/or datastores described elsewhere herein. Thus, for example, the orchestrator 604 may include some or all of the functionality of orchestrator 504, the unstructured query tool 610 may include some or all of the functionality of unstructured data retriever agent module 506-2 and/or unstructured data retriever tool module 506-1, and so forth.

Figure 7:
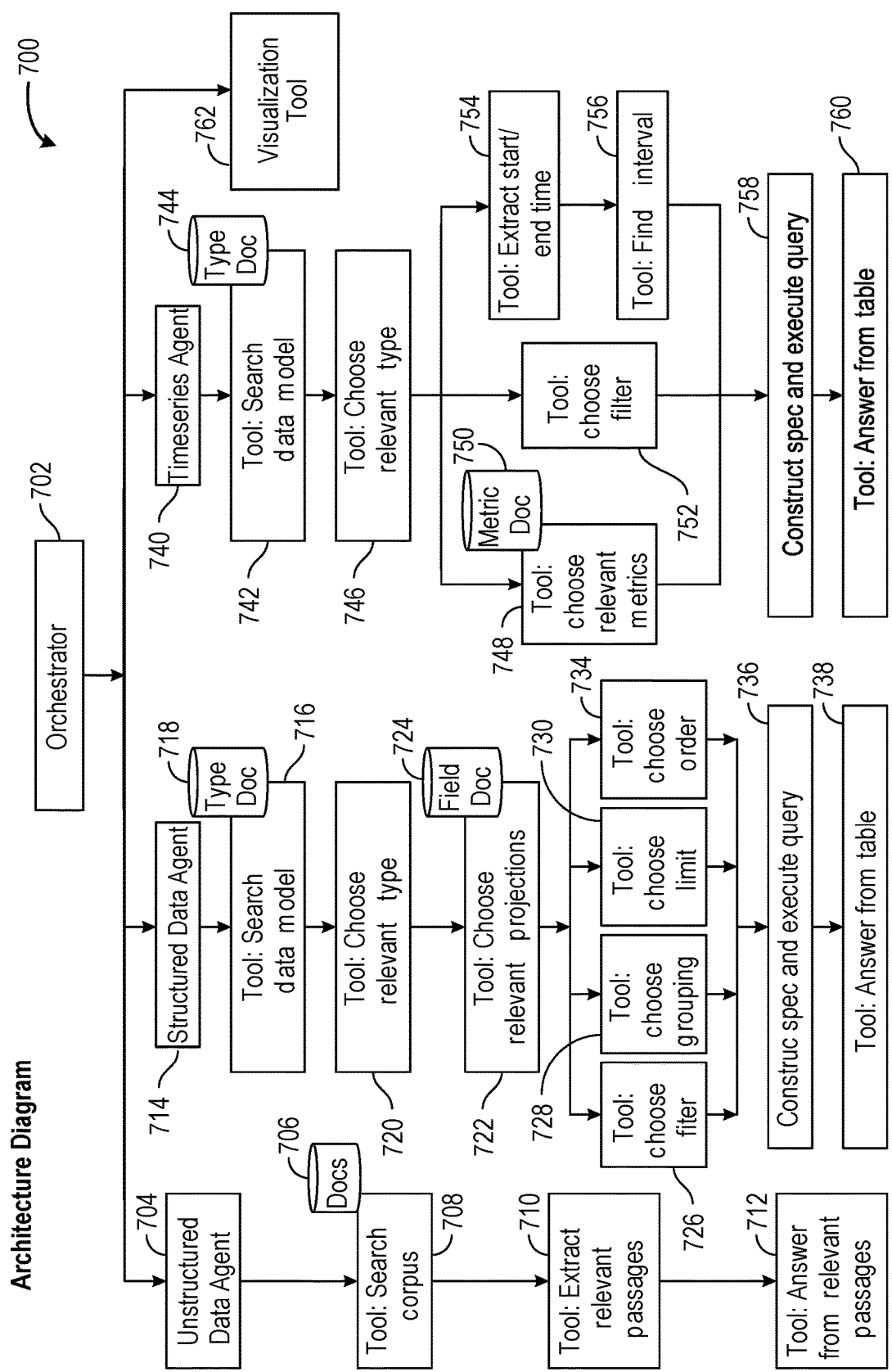
FIG. 7 depicts a diagram of an example logical flow of an enterprise generative artificial intelligence system according to some embodiments.

FIG. 7 depicts a diagram 700 of an example logical flow of an enterprise generative artificial intelligence system (e.g., enterprise generative artificial intelligence system 402) according to some embodiments. In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 702, an orchestrator module (e.g., orchestrator module 504) receives an input (e.g., a complex input) and generates a plan and a corresponding set of prescribed tasks. The orchestrator generates several sub-queries from the input, the plan, and/or the prescribed set of tasks. The orchestrator coordinates an unstructured data agent (e.g., unstructured data retriever agent module 506-2) to handle a first sub-query which may be based on a first portion of the prescribed set of tasks, a structured data agent (e.g., structured data retriever agent module 506-3) to handle a second sub-query which may be based on a second portion of the prescribed set of tasks, a timeseries processing agent module (e.g., timeseries processing agent module 506-6) to handle a third sub-query which may be based on a third portion of the prescribed set of tasks, and a visualization tool (e.g., visualization agent module 506-9 and/or visualization tool module 507-6) to generate a graphical representation of a final answer generated by the orchestrator. In some embodiments, the orchestrator may directly coordinate the other tools shown in FIG. 7 and/or indirectly coordinate the other tools. For example, the orchestrator may directly coordinate (e.g., instruct) the agents which can then directly coordinate their respective tools.

Steps 704-712 depict a generative artificial intelligence unstructured data retrieval and answer process (e.g., to answer the first sub-query). More specifically, in step 704, the unstructured data agent selects an unstructured data retrieval tool (e.g., unstructured data retrieval tool 508-1) to retrieve unstructured data records. In step 706, the unstructured data retrieval tool retrieves (e.g., using a similarity heuristic search, such as an ANN algorithm) unstructured data records from a vector data store 706. In step 710, a large language model (e.g., a large language model of the unstructured data agent) extracts relevant passages from the retrieved data records. In step 712, a large language model (e.g., a large language model of the unstructured data agent and/or the orchestrator) generates an answer to the first sub-query.

Steps 714-738 depict a generative artificial intelligence structured data retrieval and answer process (e.g., to answer second sub-query). More specifically, in step 714, the structured data agent selects a type system retriever agent (e.g., type system retriever agent module 506-4). In step 716, in some embodiments, the type system retriever agent searches one or more data models in vector store 718 for types of the data model, and in step 720 the type system retriever agent (e.g., a large language model of the type system agent) selects the types of the data model that are relevant to answer the initial query and/or second sub-query. The retrieved types may comprise a subset (or sub-model) or the data model that is relevant to the initial query and/or second sub-query.

In step 722, a projections tool (e.g., projections tool module 508-10) selects projections (e.g., specific fields of the relevant types) that are relevant to answering the initial query and/or second sub-query. The projections may be selected based on type field documentation from datastore 724 describing the type fields. Based on the selected projections, the structured data agent can select different tools to generate a structured data retrieval specification query. In the example of FIG. 7, the structed data agent selects a filter tool (e.g., filter 508-9) filter the selected types based on the selected projections (step 726), a grouping tool (e.g., group tool module 508-11) to group the types (e.g., the filtered types) and/or projections, a limit tool (e.g., limit tool module 508-13) to limit structured data results, and an order tool (e.g., order tool 508-12) to order the types and/or fields such that the structured data results are provided in a particular order. See steps 728, 730, and 734. In step 736, the structured data agent creates a structured data retrieval specification query based on the tool outputs of steps 726-734 and executes that query against a structured datastore. In step 738, a large language model (e.g., a large language model of the structured data agent and/or orchestrator) generates an answer (e.g., to the second sub-query) based on the results of the query.

Steps 740-760 depict a generative artificial intelligence timeseries data retrieval and answer process. The generative artificial intelligence timeseries data retrieval and answer process can function in the same or similar manner as the generative artificial intelligence structured data retrieval and answer process except that timeseries data is used instead of structured data. For example, a timeseries agent (e.g., timeseries agent 506-6) can be used instead of the structured data agent, and a timeseries processing tool (e.g., timeseries processing tool 508-5) can be used with the filter tool to construct a specification query which can be used to retrieve timeseries data records (e.g., artificial intelligence application outputs) to generate an answer (e.g., an answer to the third sub-query).

In step 762, the orchestrator may use a large language model that receives the answers 712, 738, and 760 as inputs and generates a result based on those inputs. The visualization tool may generate a graphical representation of that result (e.g., graph, chart, dashboard, and the like).

Figure 8A:
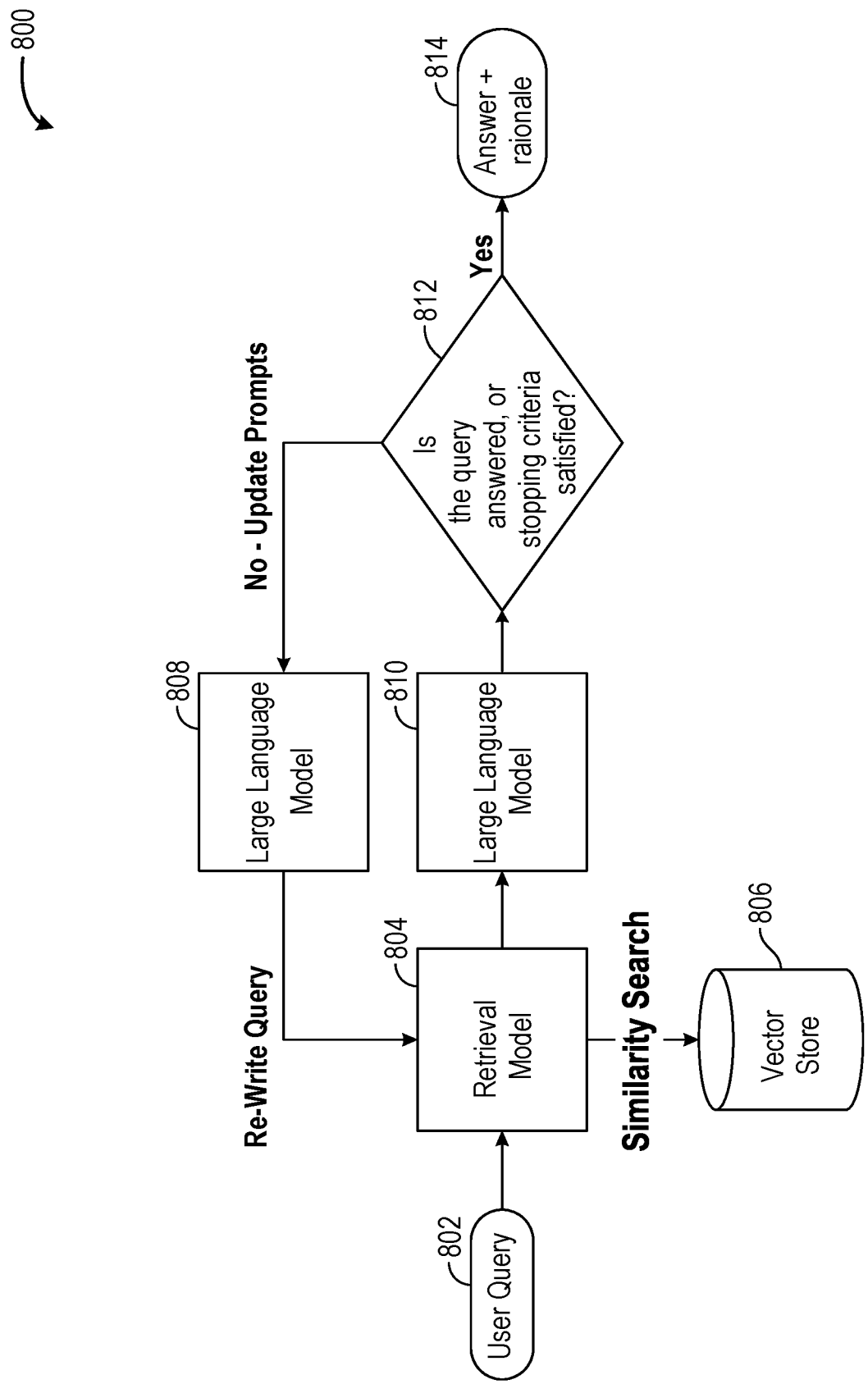
FIG. 8A depicts a flowchart of an example iterative generative artificial intelligence process using unstructured data according to some embodiments.

FIG. 8A depicts a flowchart 800 of an example iterative generative artificial intelligence process using unstructured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 802, a user query is provided to a retrieval model (e.g., a retriever module of a retrieval agent module). In step 804, the retrieval model receives the query and performs a similarly search (e.g., an ANN-based search) of the vector store 806. The retrieved information is returned to the retriever model and provided to a large language model in step 810. In step 812, a large language model (e.g., the large language model used in step 810 and/or a different large language model) determines whether additional information is needed to answer the user query. If more information is needed, steps 804-812 can be iteratively repeated with updated large language model prompts and/or queries (e.g., using a large language model in step 808) until the large language model has enough information to answer the query or a stopping condition is satisfied (e.g., a maximum number of iterations have neem performed). In step 814, the answer (e.g., the final result if there is enough information for a large language model to determine an answer or "I don't know" if the stopping condition was satisfied before it could receive enough information). The final result may also include the rationale used by the large language model to generate the answer. The large language models used in steps 808 and 810 may be the same large language model and/or different large language model.

Figure 8B:
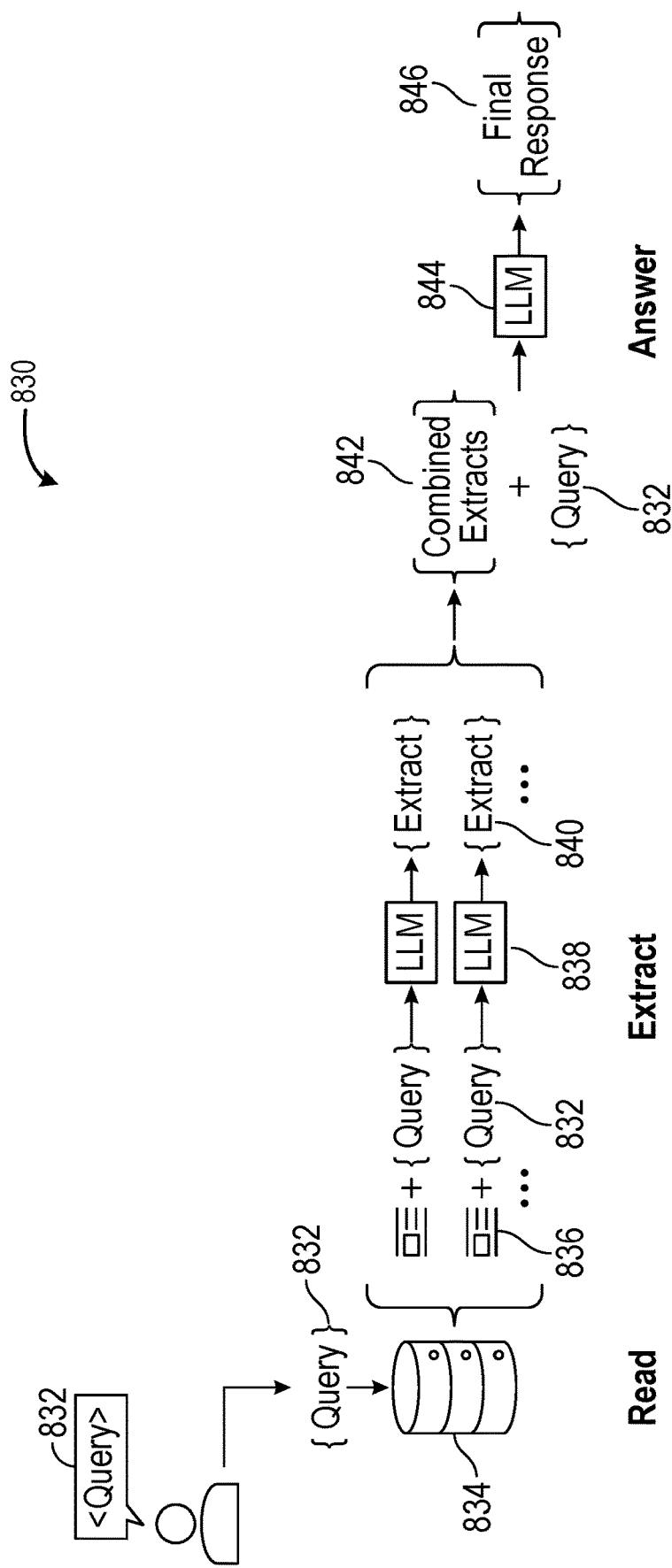
FIGS. 8B-C depict flowcharts of example non-iterative generative artificial intelligence process using unstructured data according to some embodiments.

FIG. 8B depicts a flowchart 830 of an example non-iterative generative artificial intelligence process using unstructured data according to some embodiments. This example process may be implemented by an enterprise generative artificial intelligence system (e.g., enterprise generative artificial intelligence system 402). In these and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 832, a query is received. The query 832 is executed against a vector store 832 and relevant passages 836 are retrieved. In some embodiments, the user query 832 is pre-processed (e.g., by an orchestrator) prior to being applied against the vector store 834 to retrieve passages 836. For example, the query 832 may be translated, transformed, and the like. Since complex inputs can be difficult for vector stores to handle, the system can generate a new query, or multiple shorter queries, from the user query 832 that the vector store 834 can efficiently and accurately handle. The query 832 and the passages 836 provided to a large language model 838 which can create an extract 840 (e.g., a summary of the passage) for each passages. The extracts are combined (e.g., concatenated) in step 842 and provided to a large language model 844 along with the query 832. In some embodiments, the extract steps are optional, and the passages may be concatenated and provided to the large language model 844 instead of the extracts. The large language model 844 can generate a final response based on the query 832 and the combined extracts 842. In some embodiments, the large language model 844 may post-process (e.g., by the orchestrator) the result prior to being provided to the user. For example, it can be translated, formatted based on viewpoints, include citations and attributions, and so forth.

Figure 8C:
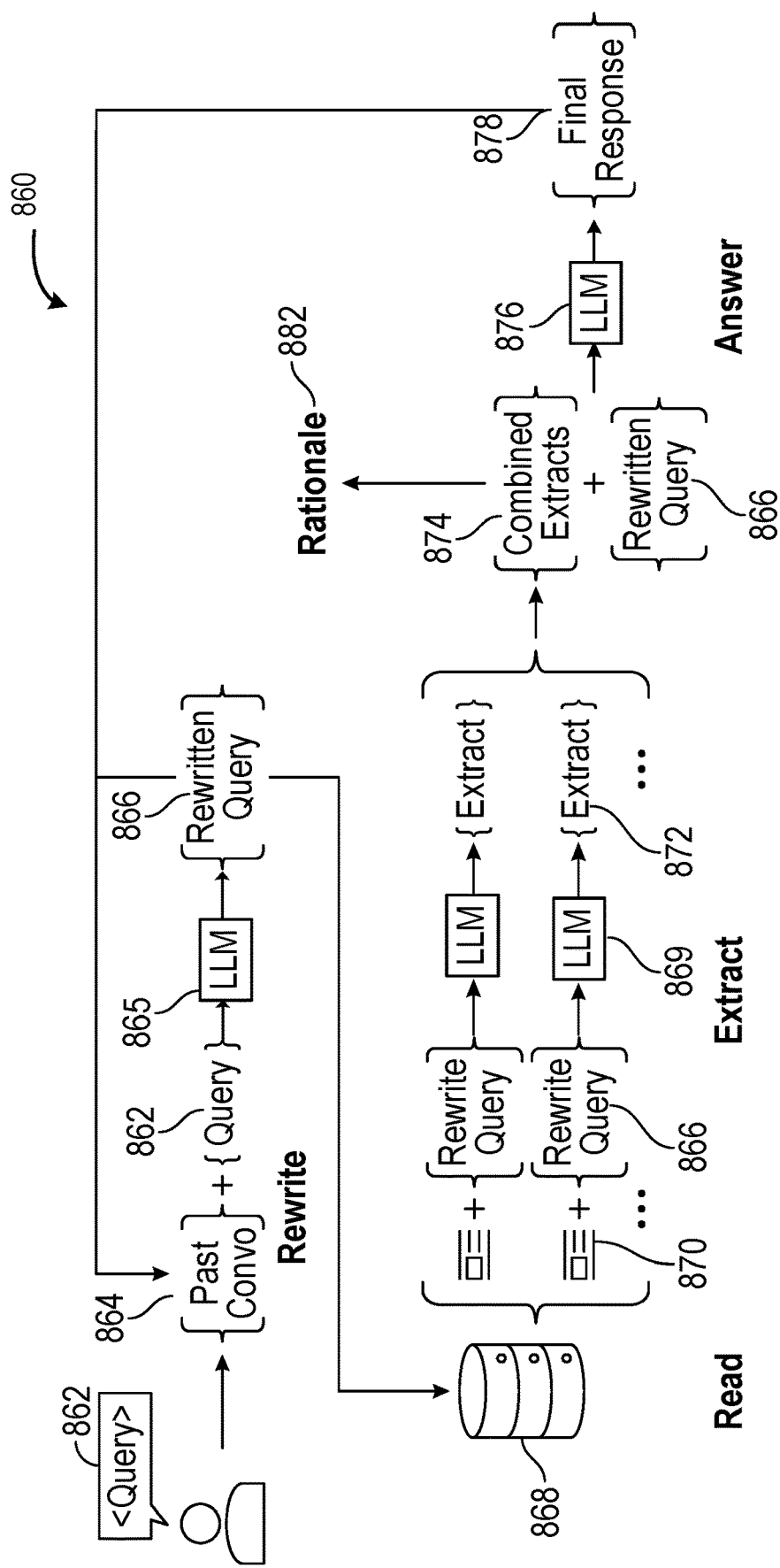

FIG. 8C depicts a flowchart 860 of an example non-iterative generative artificial intelligence process using unstructured data according to some embodiments. This example process may be implemented by an enterprise generative artificial intelligence system (e.g., enterprise generative artificial intelligence system 402). In these and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 862, a query is received. For example, the query may be "how much wine do they produce?" This query would be difficult for traditional large language models to process and would typically result in large language model hallucination because it is not clear how to process the "they" in the query 862. To address this issue, an enterprise generative artificial intelligence system may use context 864 to generate an improved query. For example, a previous conversation 864 (e.g., as part of a chat with a chat bot) may have included a conversation about France. The system can provide France as contextual information 864 to generate a new query 866, such as "How much wine does France produce?" which can prevent the large language model from hallucinating and allow the large language model to provide an accurate and reliable final result 878.

More specifically, the enterprise generative artificial intelligence system can generate a rewritten query 866 (e.g., using large language model 865) which can be executed against the vector store 868 to retrieve passages 870. In some embodiments, the rewritten query 866 can be pre-processed (e.g., by an orchestrator) prior to being applied against the vector store 868. For example, the rewritten query 866 may be translated, transformed, and the like. Since complex inputs are difficult for vector stores to handle, the system can generate a new query, or multiple shorter queries, from the rewritten query 866 that the vector store 868 can efficiently and accurately handle. In some embodiments, this pre-processing may be performed when the rewritten query is generated (e.g., rewriting the query includes the pre-processing steps).

The rewritten query 866 and the passages 870 are provided to a large language model 869 which can create an extract 872 (e.g., a summary of the passage) for each passage. The extracts 872 are combined (e.g., concatenated) in step 874 and provided to a large language model 876 along with the rewritten query 866. The enterprise generative artificial intelligence system can use the combined extracts 874 to generate a rationale 882 for determining the final response 878. For example, the large language model 876 may generate the final response 878 based on the rationale 882 and/or present the rationale 882 (or summary of the rationale) along with the final response 878 (e.g., for citations or attribution purposes).

In some embodiments, the extract steps are optional, and the passages may be concatenated and provided to the large language model 876 instead of the extracts or combined extracts. The large language model 844 can generate a final response 878 based on the rewritten query 866 and the combined extracts 874. In some embodiments, the large language model 876 may post-process (e.g., by the orchestrator) the result prior to the final result 878 being provided to the user. For example, it can be translated, formatted based on viewpoints, include citations and attributions, and so forth.

Figure 9:
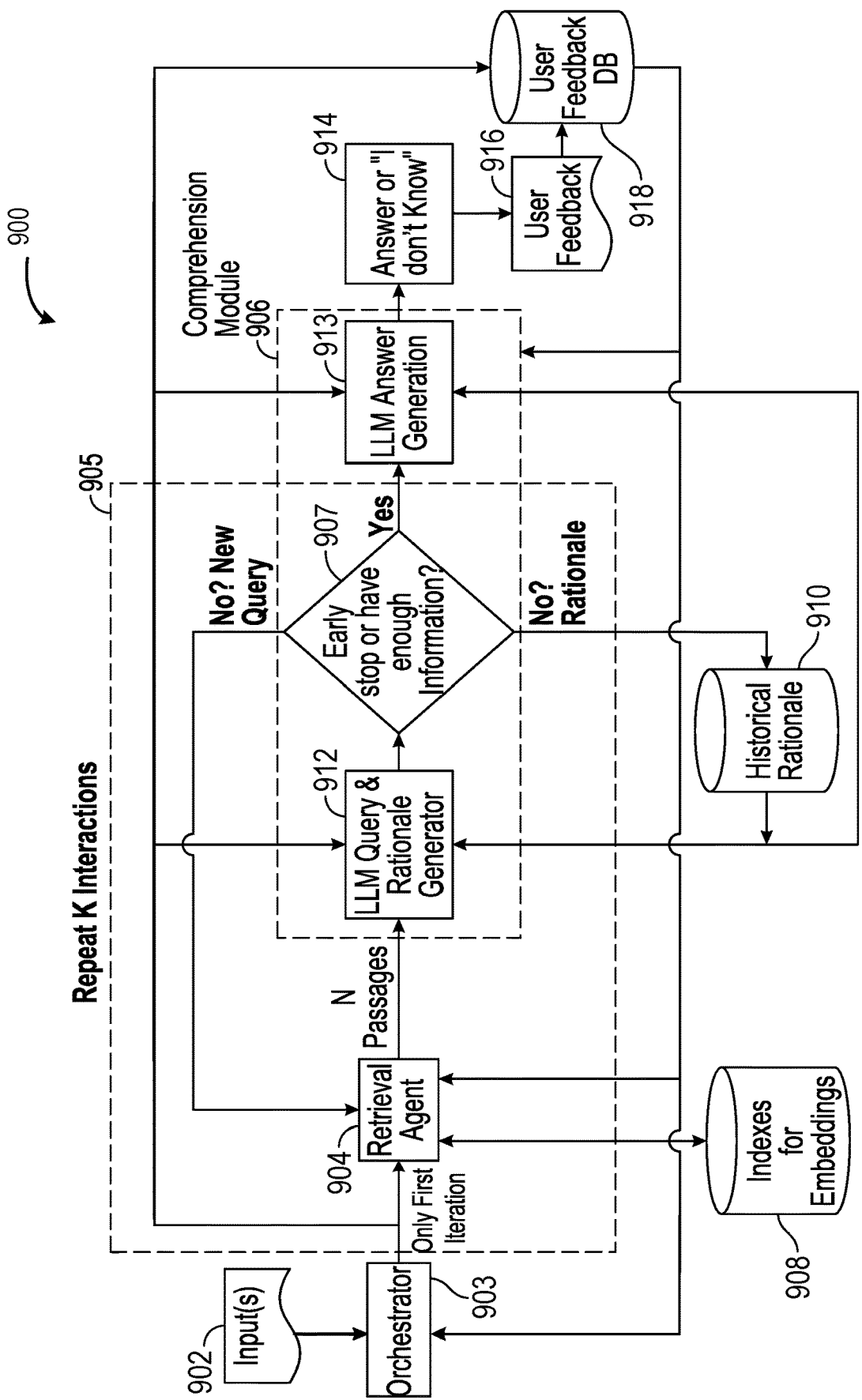
FIG. 9 depicts a flowchart of an example iterative generative artificial intelligence process using unstructured data according to some embodiments.

FIG. 9 depicts a flowchart 900 of an example iterative generative artificial intelligence process using unstructured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In the example of FIG. 9, an enterprise generative artificial intelligence system (e.g., enterprise generative artificial intelligence system 402) includes one or more retrieval modules 904 and one or more comprehension modules 906. For example, the retrieval module 904 can include one or more large language models, and the comprehension module can include one or more other large language models. These modules, and the iterative interactions (e.g., communication) between these modules, can allow enterprise generative artificial intelligence systems to achieve the technical features and technical benefits discussed herein.

In the example of FIG. 9, the enterprise generative artificial intelligence system can receive an initial input 902 from a user or another system. For example, an orchestrator module 903 may receive the input 902. The enterprise generative artificial intelligence system can provide that input to a retrieval module 904 (e.g., corresponding to one or more of the agents 506 and/or tools 508) which can then reach out and "retrieve" information from the embeddings store 908. For example, the retrieval module 904 may retrieve passages based on the input by using one or more similarity heuristics (e.g., ANN) algorithm) executed on the embeddings store 908 (e.g., one or more vector stores) to retrieve passages (or, data records) relevant to the input.

The enterprise generative artificial intelligence system can use that retrieved information to generate an initial prompt for the comprehension module 906. The comprehension module 906 can process that initial prompt and determine whether it has enough information to satisfy criteria based on the initial input (e.g., answer a question). See, e.g., step 907. If it has enough information to satisfy the initial input, the comprehension module can then provide the result to a recipient (e.g., see, e.g., step 913), such as the user or system that provided the initial input. However, if the comprehension module 906 determines that it does not have enough information to satisfy criteria based on the initial input, it can further synthesize information via the iterative process which provides the core benefit of the system.

There could be many reasons that the comprehension module 906 may need additional information. For example, traditional systems only use a single pass process which only addresses a portion of a complex input. The enterprise generative artificial intelligence system addresses this problem by triggering subsequent iterations to solve the remaining portions of the complex input, as well as including context to further refine the process.

More specifically, if the comprehension module 906 determines that it needs additional information to satisfy the initial input, it can generate context-specific data (or, simply, "context") that will inform future iterations of the process and help the system more efficiently and accurately satisfy the initial input. The context is based on the rationale used by the comprehension module 906 when it is processing queries (or other inputs). For example, the comprehension module 906 may receive segments of information retrieved by the retrieval module 904. The segments may be passages of data record(s), for example, and the segments may be associated with embeddings from an embeddings datastore 908 that facilitates processing by the comprehension module 906. A query and rational generator 912 of the comprehension module 906 can process the information and generate a rationale for why it produced the result that it did. That rationale can be stored by the enterprise generative artificial intelligence system in an historical rational datastore 910 and provide the foundation for the context subsequent iterations.

More specifically, subsequent iterations can include the comprehension module 906 generating a new query, request, or other output that is then passed back to the retrieval module. The retrieval module 904 can process that new query and retrieves additional information. The system then generates a new prompt based on the additional information and the context. The comprehension module 906 can process the new prompt and again determines if it needs additional information. If it needs additional information, the enterprise generative artificial intelligence system can repeat (e.g., iterate) this process until the comprehension module 906 can satisfy criteria based on the initial input, at which point the comprehension module 906 can generate the output result 914 (e.g., "answer" or "I don't know"). For example, generating the answer "I don't know" if no relevant passages have been generated or retrieved (e.g., by applying a rule of the comprehension module 906) and/or not enough relevant passages have been generated, retrieved, and/or extracted, the comprehension module 906 can prevent hallucination and increase the performance on the "I don't know" queries while saving a call to the models (e.g., large language models).

In some embodiments, whether there is enough information may be determined and/or correlated based on the number of passages that are retrieved but no relevant information was extracted (e.g., by the comprehension module 906). For example, a threshold number or percentage of the retrieved passage that had relevant information extracted may need to be satisfied (e.g., a particular number or percentage of the retrieved passages) for the enterprise comprehension module 906 to determine that it has enough information to answer the query. In another example, a threshold number or percentage of the retrieved passages that had no relevant information extracted (e.g., 4 passages or 80% of the retrieved passages) may cause the enterprise comprehension module 906 to determine that it does not have enough information to answer the query.

The enterprise generative artificial intelligence system may also implement supervisory functions, such as a stopping condition which prevents the system from hallucinating or otherwise providing an erroneous answer. The stopping condition can also prevent the system from executing an infinite iteration loop. In one example, the enterprise generative artificial intelligence system can limit the number of iterations that can be performed before the comprehension module 906 will either provide an output result or indicate that an output result cannot be found. The user may also from feedback 916 which can be stored in a feedback datastore 918. The enterprise generative artificial intelligence system can, in some embodiments, use the feedback to improve the accuracy and/or reliability of the system. As discussed elsewhere herein, it will be appreciated that, in some embodiments, the functionality of comprehension modules may be included within the orchestrator.

Figure 10:
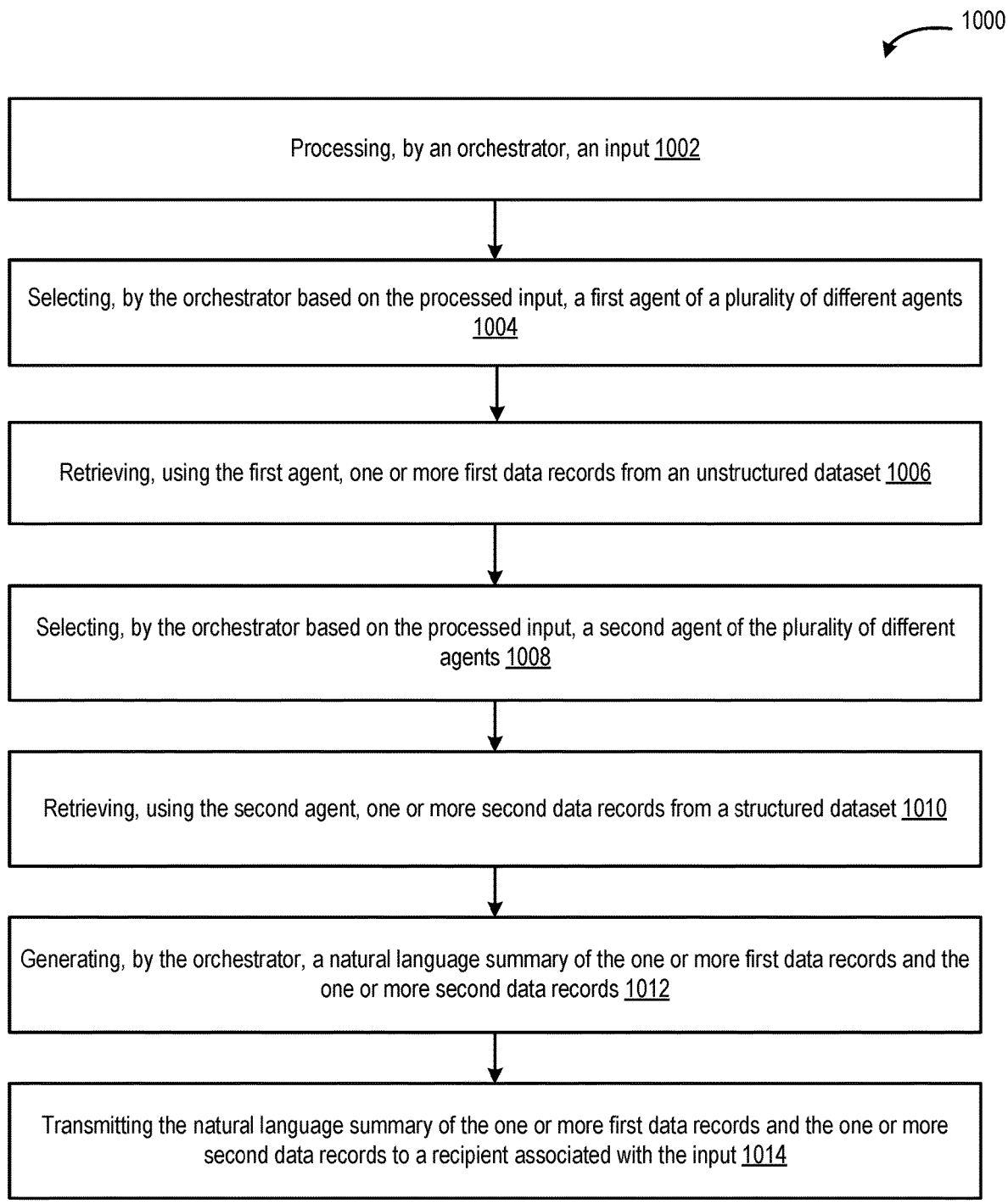
FIG. 10 depicts a flowchart of an example generative artificial intelligence process using unstructured data and structured data according to some embodiments.

FIG. 10 depicts a flowchart 1000 of an example generative artificial intelligence process using unstructured data and structured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 1002, an enterprise generative artificial intelligence system (e.g., enterprise generative artificial intelligence system 402) processes, by an orchestrator (e.g., orchestrator module 504), an input (e.g., complex input). The orchestrator may include one or more first large language models, first machine learning models, and/or first functions (e.g., supervisory functions).

In step 1004, the enterprise generative artificial intelligence system selects, by the orchestrator based on the processed input, a first agent of a plurality of different agents. In some embodiments, the first agent (e.g., unstructured data retrieval agent) is generated by a retrieval agent module (e.g., retrieval agent module 506-1) and/or unstructured data retriever agent module 506-2. In some embodiments, the first agent includes one or more second large language models (e.g., a large language model different from the first large language model).

In step 1006, the enterprise generative artificial intelligence system retrieves, using the first agent, one or more first data records from an unstructured dataset. The first data records may be unstructured data records retrieved from, and/or based on, one or more vector datastores. For example, the first agent may implement the process depicted in FIG. 9. In some embodiments, the first agent uses (e.g., executes, access, and/or controls) one or more tools (e.g., unstructured data retrieval tool module 508-1) to retrieve the unstructured data records. In some embodiments, the first agent implements an iterative generative artificial intelligence process (e.g., as shown in FIGS. 8A, and 9) and/or non-iterative generative artificial intelligence process (e.g., as shown in FIGS. 7 and 8B-C) using one or more unstructured data retrieval tools to retrieve the one or more first data records from an unstructured dataset. In one example, the first agent instructs the one or more unstructured data retrieval tools based upon embeddings in a vector store. For example, the first agent and/or tool may use an artificial intelligence-based similarity search (e.g., ANN algorithm) to identify and retrieve passages that have similar embedding values (e.g., closest in the vector space based on one or more threshold values).

In step 1008, the enterprise generative artificial intelligence system selects, by the orchestrator based on the processed input, a second agent of the plurality of different agents. In some embodiments, the second agent (e.g., unstructured data retrieval agent) is generated by the retrieval agent module (e.g., retrieval agent module 506-1) and/or a structured data retriever agent module 506-3. In some embodiments, the second agent includes one or more third large language models (e.g., a large language model different from the first large language model and/or second large language model).

In step 1010, the enterprise generative artificial intelligence system retrieves, using the second agent, one or more second data records from a structured dataset. In some embodiments, the second agent uses (e.g., executes, access, and/or controls) one or more other tools (e.g., structured data retrieval tool module 508-2) to retrieve the structured data records. In some embodiments, the second agent implements a non-iterative generative artificial intelligence process using one or more structured data retrieval tools to retrieve the one or more second data records from a structured dataset (e.g., as shown in FIG. 7). In some embodiments, the second agent instructs the one or more structured data retrieval tools based upon a data model describing relationships of one or more types of the data model.

In step 1012, the enterprise generative artificial intelligence system generates, by the orchestrator, a natural language summary of the one or more first data records and the one or more second data records. In some embodiments, a large language model of the orchestrator generates the natural language summary based on natural language summaries generated by the first and second agents. For example, the first agent may generate a natural language summary of the retrieved first data records, and the second agent may generate another natural language summary of the retrieved second data records.

In step 1014, the enterprise generative artificial intelligence system transmits the natural language summary of the one or more first data records and the one or more second data records to a recipient associated with the input. In some embodiments, a communication module (e.g., communication module 530) transmits the natural language summary to a user and/or system that provided or generated the input.

In some embodiments, the orchestrator parses the input into different portions (e.g., segments) and routes each portion to a respect agent. For example, the orchestrator may determine that the first segment requires an unstructured data retrieval operation and route the first segment to the first agent. Similarly, the orchestrator may determine that the second segment requires a structured data retrieval operation and route the second segment to the second agent. In some embodiments, the orchestrator may spin-up agents as needed to process the input and/or orchestrate the agents to execute in parallel.

Figure 11:
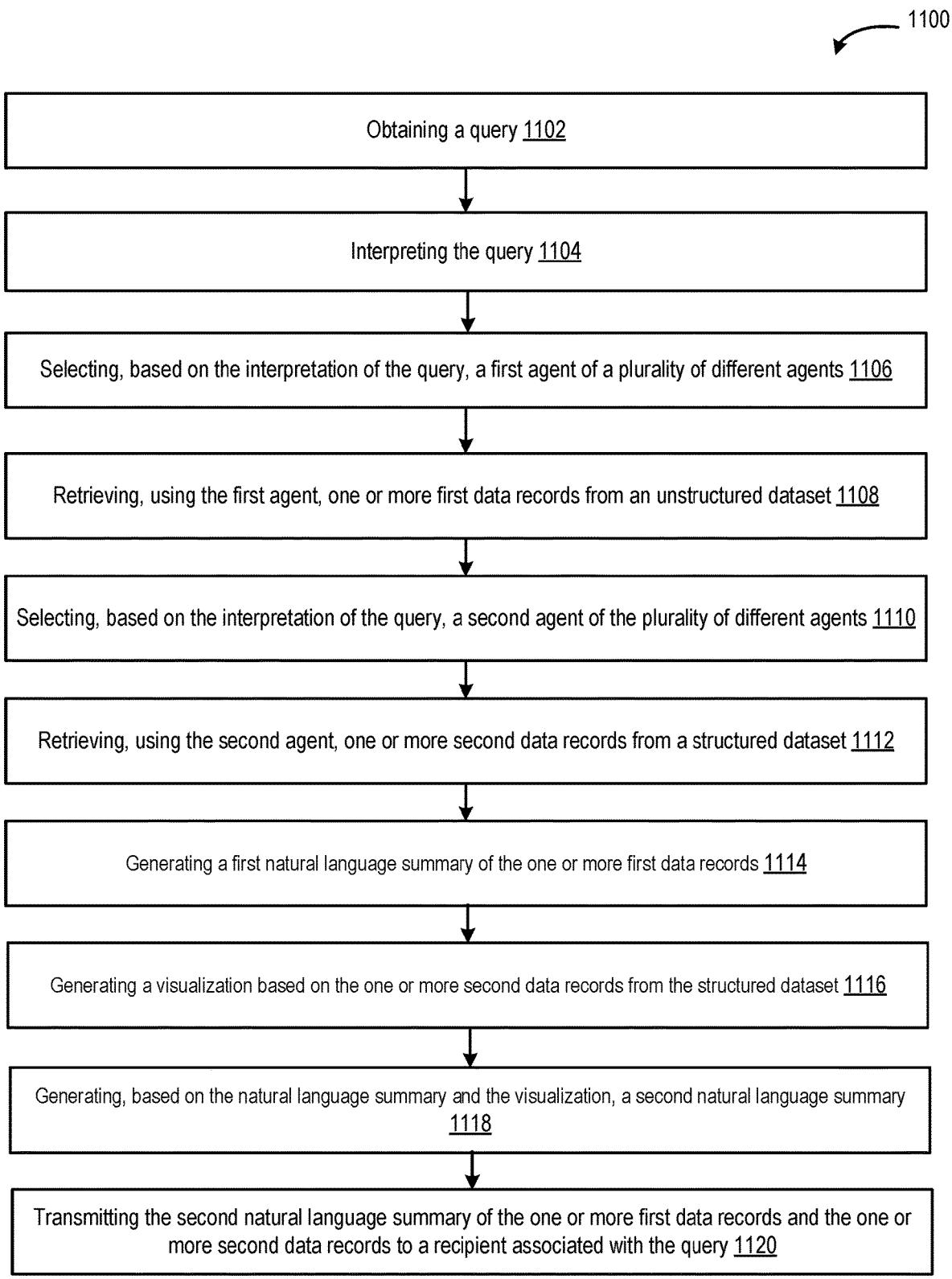
FIG. 11 depicts a flowchart of an example generative artificial intelligence process using unstructured data and structured data according to some embodiments.

FIG. 11 depicts a flowchart 1100 of an example generative artificial intelligence process using unstructured data and structured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 1102, an enterprise generative artificial intelligence system (e.g., enterprise generative artificial intelligence system 402) obtains a query. In some embodiments, an interface module (e.g., interface module 528) and/or orchestrator module (e.g., orchestrator module 504) obtain the query (e.g., from a user and/or system).

In step 1104, the enterprise generative artificial intelligence system interprets the query. Although a query is used in this example, it will be appreciated that other types of inputs may be used instead. In some embodiments, the orchestrator module interprets the query.

In step 1106, the enterprise generative artificial intelligence system selects, based on the interpretation of the query, a first agent of a plurality of different agents. In some embodiments, the orchestrator module and/or another agent (e.g., unstructured data retriever agent module 506-1) selects the first agent (e.g., unstructured data retriever agent module 506-2).

In step 1108, the enterprise generative artificial intelligence system retrieves, using the first agent, one or more first data records from an unstructured dataset. The first data records may be unstructured data records retrieved from, and/or based on, one or more vector datastores. In some embodiments, the first agent uses (e.g., executes, access, and/or controls) one or more tools (e.g., unstructured data retrieval tool module 508-1) to retrieve the unstructured data records. In some embodiments, the first agent implements an iterative generative artificial intelligence process (e.g., as shown in FIGS. 8A, and 9) and/or non-iterative generative artificial intelligence process (e.g., as shown in FIGS. 8B-C) using one or more unstructured data retrieval tools to retrieve the one or more first data records from an unstructured dataset. In one example, the first agent instructs the one or more unstructured data retrieval tools based upon embeddings in a vector store. For example, the first agent and/or tool may use an artificial intelligence-based similarity search to identify and retrieve passages that have similar embedding values.

In step 1110, the enterprise generative artificial intelligence system selects, based on the interpretation of the query, a second agent of the plurality of different agents. In some embodiments, the orchestrator module and/or another agent (e.g., unstructured data retriever agent module 506-1) selects the second agent (e.g., unstructured data retriever agent module 506-2).

In step 1112, the enterprise generative artificial intelligence system retrieves, using the second agent, one or more second data records from a structured dataset. In some embodiments, the second agent uses (e.g., executes, access, and/or controls) one or more other tools (e.g., structured data retrieval tool module 508-2) to retrieve the structured data records. In some embodiments, the second agent implements a non-iterative generative artificial intelligence process using one or more structured data retrieval tools to retrieve the one or more second data records from a structured dataset (e.g., as shown in FIG. 7). In some embodiments, the second agent instructs the one or more structured data retrieval tools based upon a data model describing relationships of one or more types of the data model.

In step 1114, the enterprise generative artificial intelligence system generates a first natural language summary of the one or more first data records. In some embodiments, the first agent generates the first natural language summary. In step 1116, the enterprise generative artificial intelligence system generates a visualization based on the one or more second data records from the structured dataset. In some embodiments, a visualization agent module (e.g., visualization agent module 506-9) generates the visualization. For example, the visualization agent module can execute a visualization tool (e.g., visualization tool module 508-7) to generate the visualization. In step 1118, the enterprise generative artificial intelligence system generates, based on the first natural language summary and the visualization, a second natural language summary. In some embodiments, the orchestrator module generates the second natural language summary. In step 1120, the enterprise generative artificial intelligence system transmits the second natural language summary of the one or more first data records and the one or more second data records to a recipient associated with the query. In some embodiments, a communication module (e.g., communication module 530) transmits the second natural language summary.

Figure 12:
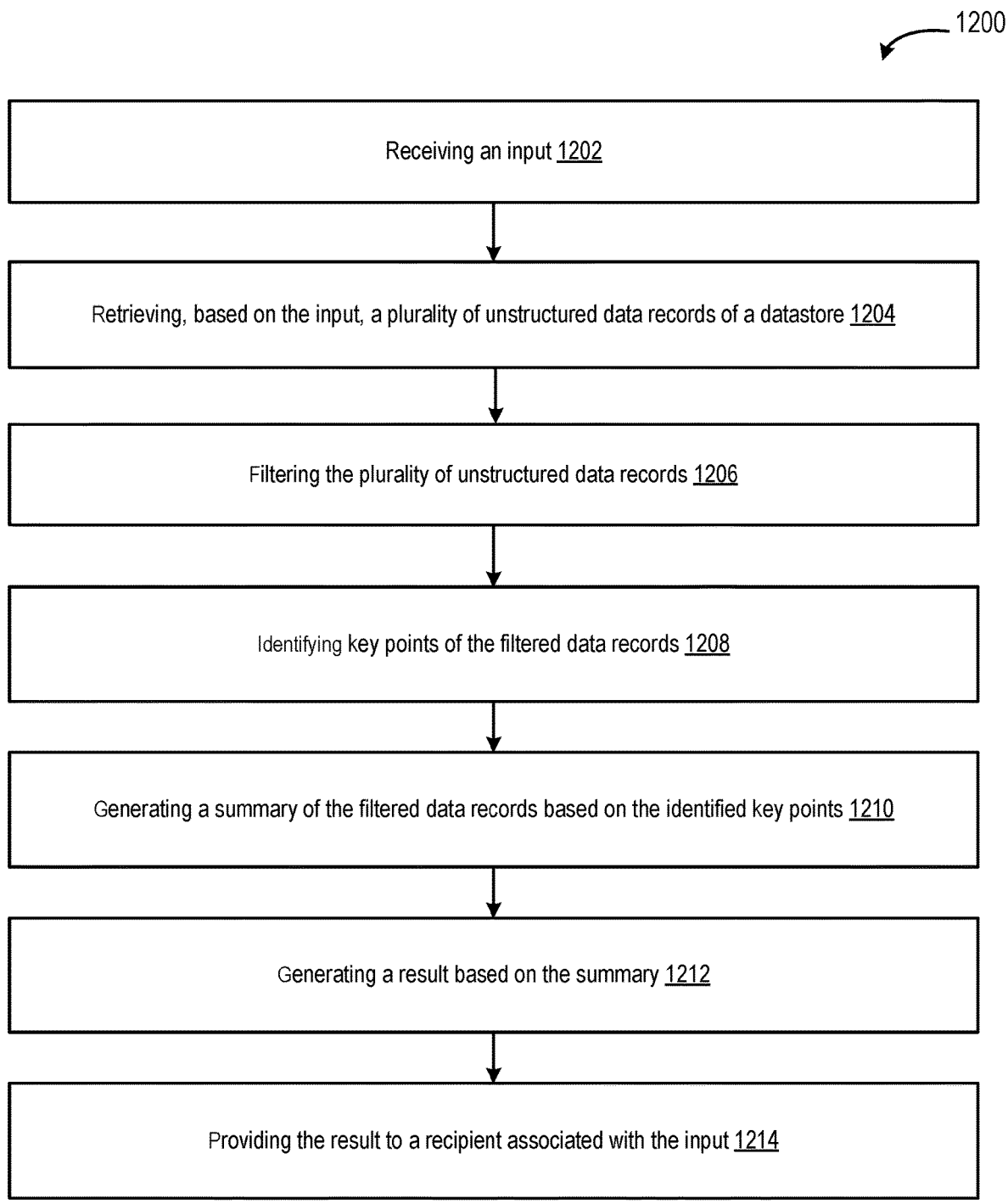
FIG. 12 depicts a flowchart of an example of a non-iterative generative artificial intelligence process using unstructured data according to some embodiments.

FIG. 12 depicts a flowchart 1200 of an example of a non-iterative generative artificial intelligence process using unstructured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 1202, an enterprise generative artificial intelligence system (e.g., enterprise generative artificial intelligence system 402) receives an input (e.g., complex input). In some embodiments, an orchestrator module (e.g., orchestrator module 504) receives the input. In step 1204, the enterprise generative artificial intelligence system retrieves, based on the input, a plurality of unstructured data records of a datastore. In some embodiments, the orchestrator instructs an unstructured data retriever agent module (e.g., unstructured data retriever agent module 506-2) to retrieve the unstructured data records, and the agent instructs an unstructured data retrieval tool (e.g., unstructured data retrieval tool 508-1) to perform the retrieval function. In step 1206, the enterprise generative artificial intelligence system filters the plurality of unstructured data records. In some embodiments, the unstructured data retriever agent module instructs a filtering tool (e.g., filter tool module 508-9) to filter the unstructured data records.

In step 1208, the enterprise generative artificial intelligence system identifies key points of the unstructured data records. In some embodiments, the unstructured data retriever agent module identifies the key points. In step 1210, the enterprise generative artificial intelligence system generates a summary of the filtered data records based on the identified key points. In some embodiments, a comprehension module (e.g., comprehension module 510) generates the summary. For example, the comprehension module may include a large language model that takes the key points as inputs and generates a natural language summary based on the key points. As described elsewhere herein, the comprehension module may be a component of the orchestrator.

In step 1212, the enterprise generative artificial intelligence system generates a result based on the summary. The result may be the summary itself or an output of another large language model. In some embodiments, the summary may be provided to another large language model (e.g., an "answer" large language model) to provide a contextualized final result. More specifically, the other large language model may generate the result based on a user that submitted the initial query (e.g., based on a user role). In step 1214, the enterprise generative artificial intelligence system provides the result to a recipient associated with the input (e.g., the user or system that initially provided the input). In some embodiments, a communication module (e.g., communication module 530) provides the result over a communication network (e.g., communication network 408).

Figure 13:
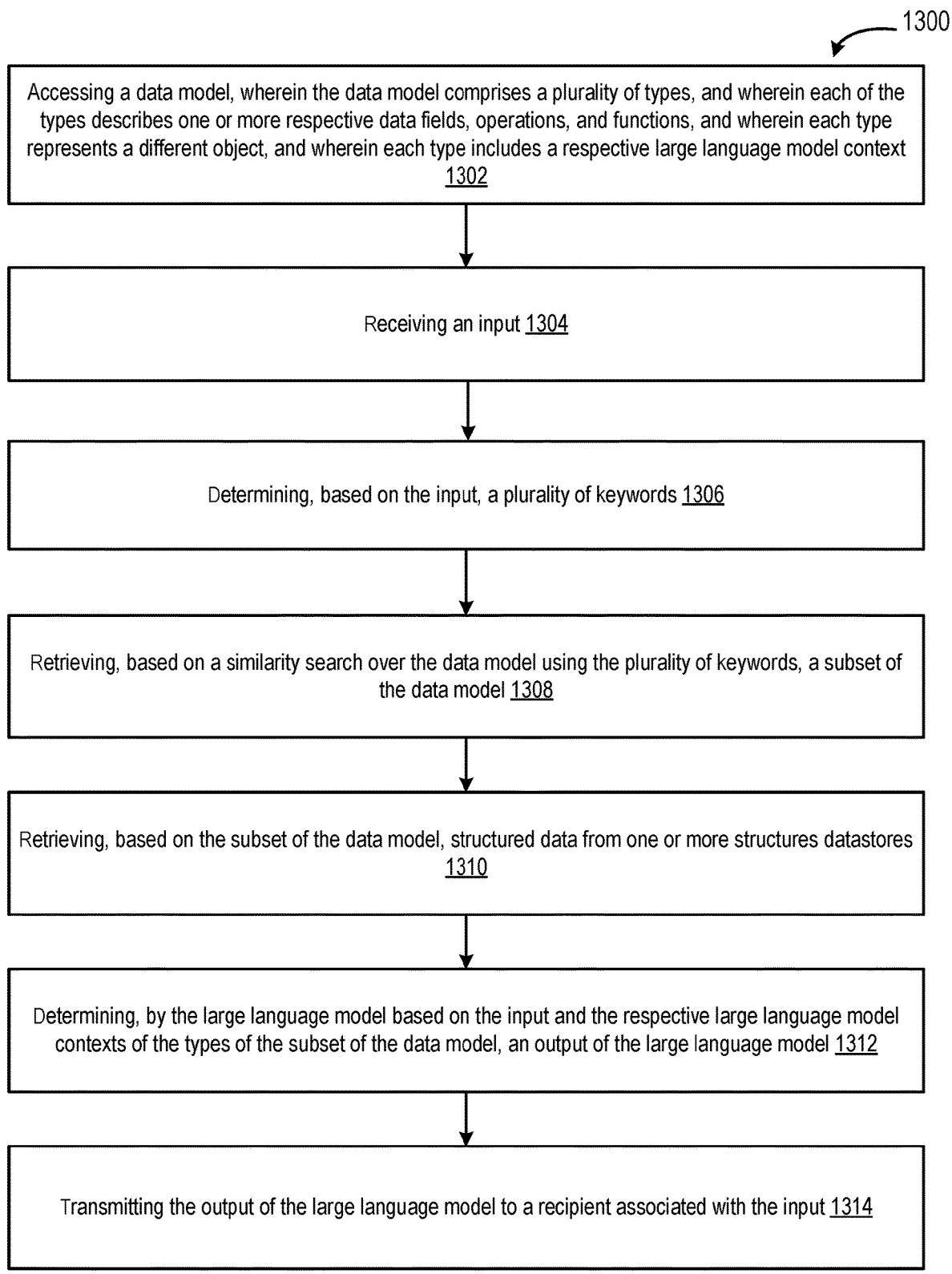
FIG. 13 depicts a flowchart of an example of a generative artificial intelligence process using structured data according to some embodiments.

FIG. 13 depicts a flowchart 1300 of an example of a generative artificial intelligence process using structured data according to some embodiments. This example process may be implemented by an enterprise generative artificial intelligence system (e.g., enterprise generative artificial intelligence system 402). In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 1302, an enterprise generative artificial intelligence system (e.g., enterprise generative artificial intelligence system 402) accesses a data model. The data model may include a variety of types, and each of the types may describe different data fields, operations, and functions. In some embodiments, each type represents a different object (e.g., a machine in a factory), and each type may include a context that enables another model (e.g., a large language model) to more accurately and/or efficiently process information and/or generate results. In some embodiments, an orchestrator (e.g., orchestrator module 504), agent (e.g., agents 506), and/or tool (e.g., tool modules 508) accesses the data model. In a specific implementation, a type system retriever agent (e.g., type system retriever agent module 506-4) accesses the data model.

In step 1304, the enterprise generative artificial intelligence system receives an input (e.g., a complex input). In some embodiments, the orchestrator module receives the input. In step 1306, the enterprise generative artificial intelligence system determines, based on the input, a plurality of keywords. In some embodiments, the orchestrator module determines the keywords.

In step 1308, the enterprise generative artificial intelligence system retrieves, based on a similarity search over the data model using the plurality of keywords, a subset of the data model. In some embodiments, a type system agent (e.g., type system retriever agent module 506-4) performs the similarity search and retrieves the subset of the data model. In step 1310, the enterprise generative artificial intelligence system retrieves, based on the subset of the data model, structured data from one or more structures datastores. In some embodiments, a structured data retriever agent (e.g., structured data retriever agent module 506-3) retrieves the structured data.

In step 1312, the enterprise generative artificial intelligence system determines, by the large language model based on the input and the respective large language model contexts of the types of the subset of the data model, an output of the large language model. In step 1314, the enterprise generative artificial intelligence system transmits the output of the large language model to a recipient associated with the input. In some embodiments, a communication module (e.g., communication module 530) transmits the output to a user and/or system that provided the initial input.

Figure 14:
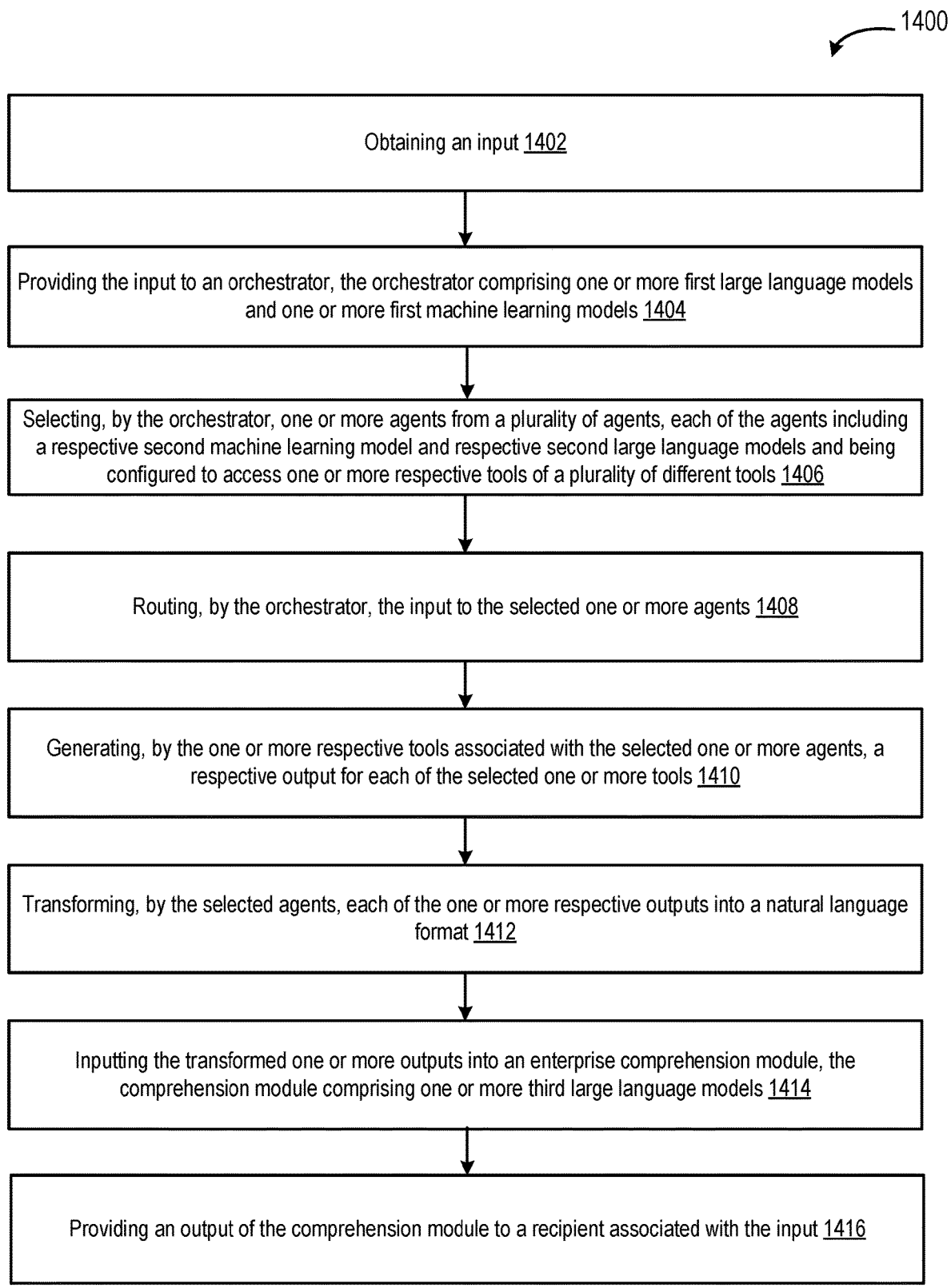
FIG. 14 depicts a flowchart of an example operation of an enterprise generative artificial intelligence system according to some embodiments.

FIG. 14 depicts a flowchart 1400 of an example operation of an enterprise generative artificial intelligence system (e.g., enterprise generative artificial intelligence system 402) according to some embodiments. In this and other flowcharts and/or sequence diagrams, the flowchart illustrates by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

In step 1402, an enterprise generative artificial intelligence system (e.g., enterprise generative artificial intelligence system 402) obtains an input (e.g., complex input). In some embodiments, an interface module (e.g., interface module 528) receives the input. In step 1404, the enterprise generative artificial intelligence system provides the input to an orchestrator (e.g., orchestrator module 504). The orchestrator may include one or more first large language models and/or one or more machine learning models. In some embodiments, the interface module provides the input to the orchestrator.

In step 1406, the enterprise generative artificial intelligence system selects, by the orchestrator, the input to the selected one or more agents (e.g., agents 506). In step 1408, the enterprise generative artificial intelligence system routes, by the orchestrator, the input to the selected one or more agents.

In step 1410, the enterprise generative artificial intelligence system generates, by the one or more respective tools associated with the selected one or more agents, a respective output for each of the one or more tools. In some embodiments, respective tool associated with a first agent comprises one or more retriever models, the respective tool associated with a second agent comprises a database query generator, a respective tool of a third agent comprises an API generator, and a respective retrieval tool associated with a fourth agent comprises an iterative context-based generative artificial intelligence tool. A first portion of the input is routed to the first agent, a second portion of the input is routed to the second agent, and a third portion of the input is routed to the third agent. The first agent can be configured to generate one or more document retrieval requests, the second agent is configured to generate one or more SQL queries, the third agent is configured to generate one or more API calls for one or more artificial intelligence applications, and the fourth agent is configured to trigger an enterprise generative artificial intelligence system. The first, second, and/or third agents can execute in parallel with each other based on control instructions provided by the orchestrator.

In step 1412, the enterprise generative artificial intelligence system transforms each of the one or more respective outputs into a natural language format. In some embodiments, the selected one or more agents transform the outputs. In step 1414, the enterprise generative artificial intelligence system inputs the transformed outputs into a comprehension module. The comprehension module may include one or more third language models. The third large language model may be the same or different from the first large language model. In step 1416, the enterprise generative artificial intelligence system provides an output of the comprehension module to a recipient associated with the input.

Figure 15:
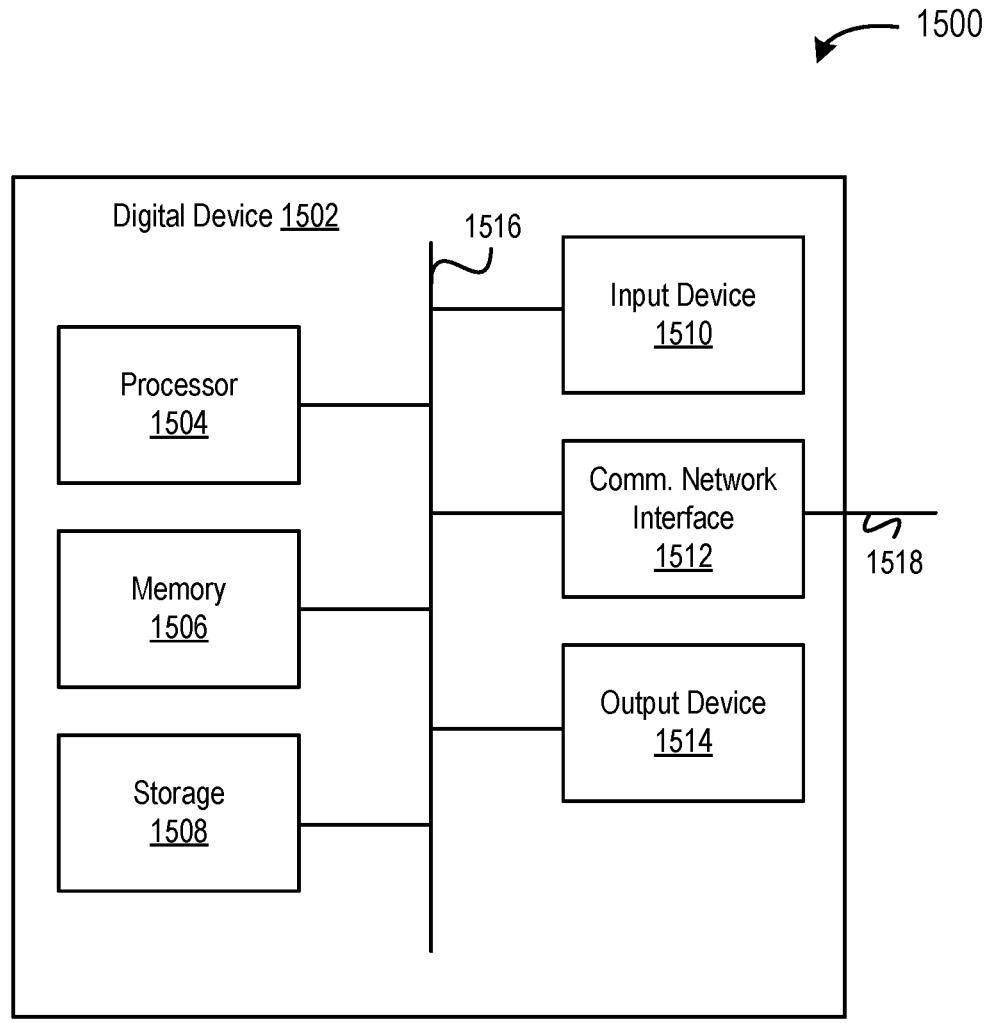
FIG. 15 is a diagram of an example computer system for implementing the features disclosed herein according to some embodiments.

FIG. 15 depicts a diagram 1500 of an example of a computing device 1502. Any of the systems, engines, datastores, and/or networks described herein may comprise an instance of one or more computing devices 1502. In some embodiments, functionality of the computing device 1502 is improved to the perform some or all of the functionality described herein. The computing device 1502 comprises a processor 1504, memory 1506, storage 1508, an input device 1510, a communication network interface 1512, and an output device 1514 communicatively coupled to a communication channel 1516. The processor 1504 is configured to execute executable instructions (e.g., programs). In some embodiments, the processor 1504 comprises circuitry or any processor capable of processing the executable instructions.

The memory 1506 stores data. Some examples of memory 1506 include storage devices, such as RAM, ROM, RAM cache, virtual memory, etc. In various embodiments, working data is stored within the memory 1506. The data within the memory 1506 may be cleared or ultimately transferred to the storage 1508.

The storage 1508 includes any storage configured to retrieve and store data. Some examples of the storage 1508 include flash drives, hard drives, optical drives, cloud storage, and/or magnetic tape. Each of the memory system 1506 and the storage system 1508 comprises a computer-readable medium, which stores instructions or programs executable by processor 1504.

The input device 1510 is any device that inputs data (e.g., mouse and keyboard). The output device 1514 outputs data (e.g., a speaker or display). It will be appreciated that the storage 1508, input device 1510, and output device 1514 may be optional. For example, the routers/switchers may comprise the processor 1504 and memory 1506 as well as a device to receive and output data (e.g., the communication network interface 1512 and/or the output device 1514).

The communication network interface 1512 may be coupled to a network (e.g., network 408) via the link 1518. The communication network interface 1512 may support communication over an Ethernet connection, a serial connection, a parallel connection, and/or an ATA connection. The communication network interface 1512 may also support wireless communication (e.g., 802.11 a/b/g/n, WiMax, LTE, Wi-Fi). It will be apparent that the communication network interface 1512 may support many wired and wireless standards.

It will be appreciated that the hardware elements of the computing device 1502 are not limited to those depicted in FIG. 15. A computing device 1502 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1504 and/or a co-processor located on a GPU (i.e., NVidia).

Example types of computing devices and/or processing devices include one or more microprocessors, microcontrollers, reduced instruction set computers (RISCs), complex instruction set computers (CISCs), graphics processing units (GPUs), data processing units (DPUs), virtual processing units, associative process units (APUs), tensor processing units (TPUs), vision processing units (VPUs), neuromorphic chips, AI chips, quantum processing units (QPUs), cerebras wafer-scale engines (WSEs), digital signal processors (DSPs), application specific integrated circuits (ASICs), field programmable gate arrays (FPGAs), or discrete circuitry.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise. The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

A claimed solution rooted in computer technology overcomes problems specifically arising in the realm of computer technology. Various embodiments of the present disclosure include systems, methods, and non-transitory computer-readable media configured to process, by an orchestrator, an input. Select, by the orchestrator based on the processed input, a first agent of a plurality of different agents. Retrieve, using the first agent, one or more first data records from an unstructured dataset. Select, by the orchestrator based on the processed input, a second agent of the plurality of different agents. Retrieve, using the second agent, one or more second data records from a structured dataset. Generates, by the orchestrator, a natural language summary of the one or more first data records and the one or more second data records and transmits the natural language summary of the one or more first data records and the one or more second data records to a recipient associated with the input.

In some embodiments, the orchestrator comprises one or more first large language models. In some embodiments, the first agent comprises one or more second large language models, and the second agent comprises one or more third large language models. The first agent implements an iterative generative artificial intelligence process using one or more unstructured data retrieval tools to retrieve the one or more first data records from an unstructured dataset. The second agent implements a non-iterative generative artificial intelligence process using one or more structured data retrieval tools to retrieve the one or more second data records from a structured dataset. The first agent instructs the one or more unstructured data retrieval tools based upon embeddings in a vector store. The selecting, by the orchestrator based on the processed input, the first agent of the plurality of different agents, further comprises generating a second input based on a first portion of the input and routing the second input to the first agent. The selecting, by the orchestrator based on the processed input, the second agent of the plurality of different agents, further comprises generating a third input based on a second portion of the input and routing the third input to the second agent. The first agent and the second agent execute in parallel and perform their respective retrievals in parallel.

Various embodiments of the present disclosure include systems, methods, and non-transitory computer-readable media configured to obtain a query; interpreting the query; selecting, based on the interpretation of the query, a first agent of a plurality of different agents; retrieving, using the first agent, one or more first data records from an unstructured dataset; selecting, based on the interpretation of the query, a second agent of the plurality of different agents; retrieving, using the second agent, one or more second data records from a structured dataset; generating a first natural language summary of the one or more first data records; generating a visualization based on the one or more second data records from the structured dataset; generating, based on the first natural language summary and the visualization, a second natural language summary; and transmitting the second natural language summary of the one or more first data records and the one or more second data records to a recipient associated with the query.

Various embodiments of the present disclosure include systems, methods, and non-transitory computer-readable media configured to perform receiving an input; retrieving, based on the input, a plurality of unstructured data records of a datastore; filtering the plurality of unstructured data records; identifying key points of the filtered data records; generating a summary of the filtered data records based on the identified key points; generating a result based on the summary; and providing the result to a recipient associated with the input.

In some embodiments, the systems, methods, and non-transitory computer readable media are configured to perform determining a quantity of identified plurality of data records; comparing the quantity with a threshold value; and skipping the key point identification, and generating the summary based on the filtered data records instead of the key points.

Various embodiments of the present disclosure include systems, methods, and non-transitory computer-readable media configured to perform accessing a data model, wherein the data model comprises a plurality of types, and wherein each of the types describes one or more respective data fields, operations, and functions, and wherein each type represents a different object, and wherein each type includes a respective large language model context; receiving an input; determining, based on the input, a plurality of keywords; retrieving, based on a similarity search over the data model using the plurality of keywords, a subset of the data model; retrieving, based on the subset of the data model, structured data from one or more structures datastores; determining, by the large language model based on the input and the respective large language model contexts of the types of the subset of the data model, an output of the large language model; and transmitting the output of the large language model to a recipient associated with the input.

Various embodiments of the present disclosure include systems, methods, and non-transitory computer-readable media configured to perform obtaining an input; providing the input to an orchestrator, the orchestrator comprising one or more first large language models and one or more machine learning models; selecting, by the orchestrator, one or more agents from a plurality of agents, each of the agents including a respective second large language models and being configured to access one or more respective tools of a plurality of different tools; routing, by the orchestrator, the input to the selected one or more agents; generating, by the one or more respective tools associated with the selected one or more agents, a respective output for each of the one or more tools; transforming each of the one or more respective outputs into a natural language format; inputting the transformed outputs into a comprehension module, the comprehension module comprising one or more third language models; and providing an output of the comprehension module to a recipient associated with the first input.

The orchestrator comprises one or more second large language models. In some embodiments, the respective tool associated with a first agent comprises one or more retriever models, the respective tool associated with a second agent comprises a database query generator, a respective tool of a third agent comprises an API generator, and a respective retrieval tool associated with a fourth agent comprises an iterative context-based generative artificial intelligence tool. A first portion of the input is routed to the first agent, a second portion of the input is routed to the second agent, and a third portion of the input is routed to the third agent. The first agent is configured to generate one or more document retrieval requests, the second agent is configured to generate one or more SQL queries, the third agent is configured to generate one or more API calls for one or more artificial intelligence applications, and the fourth agent is configured to trigger an enterprise generative artificial intelligence system. The first, second, and third agents execute in parallel with each other based on control instructions provided by the orchestrator. In some embodiments, the agents comprise one or more machine learning models. The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

According to examples disclosed herein there is provided a computer implemented method comprising: managing, by an orchestrator, a plurality of agents to generate a response to an input, wherein the orchestrator employs one or more large language models to process or deconstruct the prompt into a series of instructions for different agents, wherein each agent employs one or more machine-learning models to process disparate inputs or different portions of an input associated with the prompt; instructing, by the orchestrator, retrieval requests related to the input to the one or more agents of the plurality of agents; receiving, from the one or more agents of the plurality of agents, data from multiple data domains based on instructions from the orchestrator; analyzing, by the orchestrator, the retrieved data to formulate one or more responses to the prompt, wherein the orchestrator provides additional retrieval requests to the one or more agents to retrieve additional data to satisfy a context validation criteria associated with the input; outputting, by the orchestrator, at least one of a validated response of the one or more responses to the input that satisfies context validation criteria and a portion of data retrieved by the one or more agents related to the input.

The additional retrieval requests may comprise requests for additional data (which may be different to the retrieved data) which can be used to check, corroborate and/or validate the retrieved data and/or the one or more responses. For example, the additional retrieval requests may comprise requests configured to retrieve similar data to the retrieved data but from one or more different data sources. The additional data may comprise data from different data domains (and/or different portions of the same data domains) to the data domains (and/or respective portions of the data domains) from which the retrieved data was retrieved. The additional data may therefore provide alternative data to the retrieved data, based on which the retrieved data and/or the one or more responses can be checked, corroborated and/or validated.

The additional retrieval requests may be based on the one or more responses to the prompt. For example, the additional retrieval requests may be formulated to check or corroborate the one or more responses to the prompt. The additional retrieval requests may, for example, comprise one or more queries formulated based on the one or more responses to the prompt to query the content of the one or more responses to the prompt. The method may comprise indicating portions of data records used to generate the retrieved data (and/or additional data) and/or the one or more responses to the prompt and their respective data sources. The portions of data records and their respective data sources may be indicated as part of the retrieved data and/or as part of the additional data. The additional retrieval requests may comprise requests to check the data records (and/or their respective data sources) to check, corroborate or validate the one or more responses to the prompt.

The method may comprise validating the one or more responses to the prompt. The validating may comprise comparing the one or more responses to the prompt to the additional data. For example, the method may comprise determining a measure of similarity and/or consistency between the one or more responses to the prompt and the additional data. The measure of similarity and/or consistency may be a numerical measure suitable for comparison to a threshold. The validating may comprise validating a response to the prompt if a measure of similarity and/or consistency (between that response to the prompt and the additional data) is greater than a first threshold. The validating may comprise not validating a response to the prompt if a measure of similarity and/or consistency (between that response to the prompt and the additional data) is not greater than a second threshold (which may be the same as the first threshold).

The requesting and receiving of additional data and/or the validating of the one or more responses to the prompt provides a synergistic technical effect of improving the integrity and reliability of the output provided in response to a prompt. These features are based on a technical understanding of the internal functioning of models (e.g., large language models) and/or functions which are used to generate a response. For example, it has been realized that such models and/or functions may be based on probabilistic methods which may, for example, generate some inconsistent or inaccurate results. Requesting and receiving additional data and/or validating responses can avoid or mitigate the output of inconsistent or inaccurate results. Providing a portion of data retrieved by the one or more agents related to the input in addition to a validated response may allow for further corroboration of the results (e.g., by a user receiving the outputs) thereby further improving the integrity and accuracy of results.

The processing or deconstructing of the prompt into a series of instructions for different agents may comprise determining instructions for an agent which is dependent on properties of the agent. For example, the agents may comprise different agents for performing different functions (e.g., retrieving unstructured data, receiving structured data etc.). Different agents may be configured to receive instructions in different formats and/or languages (e.g., different programming languages). The instructions determined for different agents may be dependent on the function which the agent is configured to perform and/or a format and/or language which the agent is configured to receive. For example, first instructions may be determined for a first agent, where the first instructions are determined according to a format and/or language to be received and processed by the first agent (e.g., in dependence on a format of instructions and/or a language which the first agent is configured to receive). Second instructions may be determined for a second agent, where the second instructions are determined according to a format and/or language to be received and processed by the second agent (e.g., in dependence on a format of instructions and/or language which the second agent is configured to receive). The format and/or language of instructions determined for the first agent may be different to the format and/or language of instructions determined for the second agent. The one or more large language models employed by the orchestrator may be configured through training to determine instructions for an agent in dependence on a format and/or language of instructions which the agent is configured to receive. That is, the large language model may be configured through training to output instructions in different formats and/or languages for different agents. Model training can be implemented continuously, asynchronously, with feedback (e.g., re-enforcement learning, etc.), and the like. In some illustrative examples, the orchestrator may transform a first portion of an input into, for example, an SQL query and send that to an unstructured data retriever agent and/or transform a second portion of the input into an API call and send that to an API agent.

The at least one agent of the one or more agents may be configured to determine instructions for one or more tools to perform one or more operations (e.g., such as structured data retrieval and/or unstructured data retrieval). Different tools may be configured to receive instructions in different formats and/or languages (e.g., different programming languages). The instructions determined for different tools may be dependent on the function or operation which the tool is configured to perform and/or a format and/or language which the tool is configured to receive. For example, first instructions may be determined (e.g., by a first agent) for a first tool, where the first instructions are determined according to a format and/or language to be received and processed by the first tool (e.g., in dependence on a format of instructions and/or a language which the first tool is configured to receive). Second instructions may be determined (e.g., by the first agent or by a second agent) for a second tool, where the second instructions are determined according to a format and/or language to be received and processed by the second tool (e.g., in dependence on a format of instructions and/or language which the second tool is configured to receive). The format and/or language of instructions determined for the first tool may be different to the format and/or language of instructions determined for the second tool. The one or more machine learning models employed by the one or more agents may be configured through training to determine instructions for a tool in dependence on a format and/or language of instructions which the tool is configured to receive. That is, a machine learning model may be configured through training to output instructions in a given format and/or language for a given tool and/or may be configured through training to output instructions in different formats and/or language for different tools.

The method may comprise providing instructions and/or a query to a code generation agent and/or tool. A code generation agent and/or tool may be configured to generate source code, machine code, and/or other computer code. In some examples, a code generation agent may be configured to instruct a code generation tool to generate source code, machine code, and/or other computer code. The code generation agent may be configured to determine what code is needed and/or for what agent, tool and/or other entity or application code should be generated. The code generation agent may instruct a code generation tool to generate code in a language and/or format which is suitable for the function and/or receiving agent, tool and/or other entity or application which is to receive the code. A code generation agent and/or tool may output code in a format and/or language configured to be received by a particular agent, tool and/or other entity or application.

The method may comprise receiving data and converting the data into a natural language format for providing to a multimodal models (e.g., large language model). For example, one or more agents may receive data and may convert the data into a natural language format for providing to a multimodal model (e.g., large language model) employed by the orchestrator. In some examples, one or more agents may receive data and summarize the contents of the data in a natural language format for providing to a multimodal model (e.g., large language model).

In various examples contemplated herein, an orchestrator, an agent and/or a tool may be configured to receive an input and generate an output based on the input. The output may be provided to another orchestrator, agent and/or tool for further processing. An output for being provided to another orchestrator, agent and/or tool may be configured in a format and/or language which can be read and processed by the another orchestrator, agent and/or tool. An orchestrator, agent and/or tool (and/or a model employed by an orchestrator, agent and/or tool) may be configured through training to determine an output in format and/or language which can be read and processed by another orchestrator, agent and/or tool. By providing outputs in a language and/or format to be read by another orchestrator, agent and/or tool, orchestrators, agents and/or tools can cooperate and interoperate with each other to perform different functions to provide an overall output (e.g., in the form of at least one of a validated response of the one or more responses to the input that satisfies context validation criteria and a portion of data retrieved by the one or more agents related to the input). Using an orchestrator, one or more agents and/or one or more tools may allow different operations needed to produce an overall output to be performed by different orchestrators, agents and/or tools. This may allow different orchestrators, agents and/or tools to be configured (e.g., configured through training) to perform different operations or functions. Different orchestrators, agents and/or tools may perform different operations or functions in parallel. Such operation may serve to improve the computational efficiency of providing an output in response to an input.

Outputting the at least one of a validated response of the one or more responses to the input that satisfies context validation criteria and a portion of data retrieved by the one or more agents related to the input, may comprise displaying a representation of the at least one of a validated response of the one or more responses to the input that satisfies context validation criteria and a portion of data retrieved by the one or more agents related to the input on an electronic display. Outputting the at least one of a validated response of the one or more responses to the input that satisfies context validation criteria and a portion of data retrieved by the one or more agents related to the input, may comprise transmitting the at least one of a validated response of the one or more responses to the input that satisfies context validation criteria and a portion of data retrieved by the one or more agents related to the input to a computing device for display at the computing device.

The at least one of a validated response of the one or more responses to the input that satisfies context validation criteria and a portion of data retrieved by the one or more agents related to the input which is output is dependent on the technical functioning of one or more multimodal models (e.g., a large language model employed by the orchestrator) and/or one or more machine-learning models (e.g., a machine learning model employed by an agent). The one or more multimodal models and/or one of more machine-learning models may have been trained using machine learning. The operation of the one or more multimodal models and/or one of more machine-learning models may therefore be based on parameters which have been learnt through training (as opposed to parameters which have been set by a human programmer). The one or more multimodal models and/or one of more machine-learning models may be implemented in dedicated hardware. Additionally, or alternatively, the one or more multimodal models and/or one of more machine-learning models may comprise emulation of one or more multimodal models and/or one of more machine-learning models in software.

The orchestrator may generate intermediate instructions to the plurality of agents, wherein intermediate instructions comprise at least one of portions of the input, questions about the input generated by the one or more multimodal models, and follow-up questions about answers generated by the one or more multimodal models. Outputting the portion of data retrieved by the one or more agents related to the input may include a source citation for the at least a portion of the validated response. The context validation criteria may include a threshold for identifying source material from an enterprise data system that corroborate the response. Managing the plurality of agents may comprise iterative processing or multiple instructions from the orchestrator. The retrieving the data from multiple data domains may include time series data, structured data, and unstructured data. The at least one agent of the one or more agents may instantiate a tool to perform an operation on the instruction, the retrieved data, or the intermediate data. The operation may include at least one of calculation, translation, formatting, visualization. The one or more agents may be trained on different domain specific machine-learning models. The at least one agent may employ a type system to unify incompatible data from disparate data sources.

According to examples disclosed herein there is provided a computer implemented method comprising: selecting, by the orchestrator based on a processed input, one or more agent of a plurality of different agents; retrieving, by the selected one or more agent, data records from an unstructured dataset and additional data records from a structured dataset; generating, by the orchestrator, a natural language summary of the data records from the unstructured dataset and the additional data records from the structured dataset; and transmitting the natural language summary of the data records and the additional data records as a response to the input.

The selected agent of the plurality of different agents may comprise a first agent configured to retrieve data records from an unstructured dataset and a second agent configured to retrieve additional data records from a structured dataset. The data records may be retrieved from the unstructured dataset by the first agent. The additional data records may be retrieved from the structured dataset by the second agent. The first agent may instruct one or more unstructured data retrieval tools to retrieve the data records from the structured dataset. The first agent may be configured to generate instructions for the one or more unstructured data retrieval tools. The first agent may generate the instructions in a format and/or language which the one or more unstructured data retrieval tools is configured to receive. The second agent may instruct one or more structured data retrieval tools to retrieve the additional data records from the structured dataset. The second agent may be configured to generate instructions for the one or more structured data retrieval tools. The second agent may generate the instructions in a format and/or language which the one or more structured data retrieval tools is configured to receive. The first agent and/or the second agent may employ one or more machine learning models configured (e.g., through training) to generate instructions for one or more data retrieval tools. The one or more machine learning models employed by the one or more agents may be configured through training to determine instructions for a tool in dependence on a format and/or language of instructions which the tool is configured to receive. That is, a machine learning model may be configured through training to output instructions in a given format and/or language for a given tool and/or may be configured through training to output instructions in different formats and/or language for different tools. Machine learning models can include some or all of the different types or modalities of models described herein (e.g., multimodal machine learning models, large language models, data models, statistical models, audio models, visual models, audiovisual models, etc.).

The method may comprise providing instructions and/or a query to a code generation agent and/or tool. A code generation agent and/or tool may be configured to generate source code, machine code, and/or other computer code. In some examples, a code generation agent may be configured to instruct a code generation tool to generate source code, machine code, and/or other computer code. The code generation agent may be configured to determine what code is needed and/or for what agent, tool and/or other entity or application code should be generated. The code generation agent may instruct a code generation tool to generate code in a language and/or format which is suitable for the function and/or receiving agent, tool and/or other entity or application which is to receive the code. A code generation agent and/or tool may output code in a format and/or language configured to be received by a particular agent, tool and/or other entity or application.

The method may comprise receiving data and converting or encapsulating the data into a compatible format for providing to a multimodal model. For example, one or more agents may receive data and may convert the data into a natural language format for providing to a large language model employed by the orchestrator. Data formats can include some or all of the different types or modalities described herein (e.g., multimodal, text, coded, language, statistical, audio, visual, audiovisual, etc.). In some examples, one or more agents may receive data and summarize the contents of the data in a natural language format for providing to a large language model.

Transmitting the natural language summary of the data records and the additional data records as a response to the input may comprise transmitting the natural language summary of the data records and the additional data records to a computing device for display at the computing device. The natural language summary of the data records and the additional data records which is transmitted may be dependent on the technical functioning of one or more large language models (e.g., a large language model employed by the orchestrator) and/or one or more machine-learning models (e.g., a machine learning model employed by an agent). The one or more large language models and/or one of more machine-learning models may have been trained using machine learning. The operation of the one or more large language models and/or one of more machine-learning models may therefore be based on parameters which have been learnt through training (as opposed to parameters which have been set by a human programmer). The one or more large language models and/or one of more machine-learning models may be implemented in dedicated hardware. Additionally, or alternatively, the one or more large language models and/or one of more machine-learning models may comprise emulation of one or more large language models and/or one of more machine-learning models in software.

The orchestrator may comprise one or more large language models. The agent may comprise one or more large language models, and the additional agent comprises one or more additional large language models. A first agent (of the one or more agents) may implement an iterative generative artificial intelligence process using one or more unstructured data retrieval tools to retrieve the one or more data records from an unstructured dataset. A second agent (of the one or more agents) may implement a non-iterative generative artificial intelligence process using one or more structured data retrieval tools to retrieve the one or more additional data records from a structured dataset. The first agent may instruct the one or more unstructured data retrieval tools based upon embeddings in a vector store. The second agent may instruct the one or more structured data retrieval tools based upon a data model describing relationships of one or more types of the data model. The selecting, by the orchestrator based on the processed input, the first agent of the plurality of different agents, may further comprise generating intermediate input based on a first portion of the input and routing the second input to the agent. The selecting, by the orchestrator based on the processed input, the second agent of the plurality of different agents, may further comprise generating a third input based on a second portion of the input and routing the third input to the additional agent. The first agent and the second agent may execute in parallel and perform their respective retrievals in parallel.

According to examples disclosed herein there is provided a system comprising: one or more processors; and memory storing instructions that, when executed by the one or more processors, cause the system to perform: selecting, by an orchestrator based on received prompt, two or more agent of a plurality of different agents; retrieving, by the two or more agent, one or more data records from an unstructured dataset and additional data records from a structured dataset; generating, by the orchestrator, a natural language summary of the one or more data records from the unstructured dataset and additional data records from the structured dataset; and transmitting the natural language summary of the data records in response to the prompt. The selected two or more agents of the plurality of different agents may comprise a first agent configured to retrieve data records from an unstructured dataset and a second agent configured to retrieve additional data records from a structured dataset. The data records may be retrieved from the unstructured dataset by the first agent. The additional data records may be retrieved from the structured dataset by the second agent.

The first agent may instruct one or more unstructured data retrieval tools to retrieve the one or more data records from the structured dataset. The first agent may be configured to generate instructions for the one or more unstructured data retrieval tools. The first agent may generate the instructions in a format and/or language which the one or more unstructured data retrieval tools is configured to receive. The second agent may instruct one or more structured data retrieval tools to retrieve the one or more additional data records from the structured dataset. The second agent may be configured to generate instructions for the one or more structured data retrieval tools. The second agent may generate the instructions in a format and/or language which the one or more structured data retrieval tools is configured to receive. The first agent and/or the second agent may employ one or more machine learning models configured (e.g., through training) to generate instructions for one or more data retrieval tools. The one or more machine learning models employed by the one or more agents may be configured through training to determine instructions for a tool in dependence on a format and/or language of instructions which the tool is configured to receive. That is, a machine learning model may be configured through training to output instructions in a given format and/or language for a given tool and/or may be configured through training to output instructions in different formats and/or language for different tools.

The system may comprise a code generation agent and/or tool. A code generation agent and/or tool may be configured to generate source code, machine code, and/or other computer code. In some examples, a code generation agent may be configured to instruct a code generation tool to generate source code, machine code, and/or other computer code. The code generation agent may be configured to determine what code is needed and/or for what agent, tool and/or other entity or application code should be generated. The code generation agent may instruct a code generation tool to generate code in a language and/or format which is suitable for the function and/or receiving agent, tool and/or other entity or application which is to receive the code. A code generation agent and/or tool may output code in a format and/or language configured to be received by a particular agent, tool and/or other entity or application. The two or more agents may be configured to receive data and convert the data into a natural language format for providing to a large language model. For example, one or more agents may receive data and may convert the data into a natural language format for providing to a large language model employed by the orchestrator. In some examples, one or more agents may receive data and summarize the contents of the data in a natural language format for providing to a large language model.

Transmitting the natural language summary of the data records in response to the prompt may comprise transmitting the natural language summary of the data records to a computing device for display at the computing device. The natural language summary of the data records which is transmitted may be dependent on the technical functioning of one or more large language models (e.g., a large language model employed by the orchestrator) and/or one or more machine-learning models (e.g., a machine learning model employed by an agent). The one or more large language models and/or one of more machine-learning models may have been trained using machine learning. The operation of the one or more large language models and/or one of more machine-learning models may therefore be based on parameters which have been learnt through training (as opposed to parameters which have been set by a human programmer). The one or more large language models and/or one of more machine-learning models may be implemented in dedicated hardware. Additionally, or alternatively, the one or more large language models and/or one of more machine-learning models may comprise emulation of one or more large language models and/or one of more machine-learning models in software.

The orchestrator may comprise one or more large language models. The first agent may employ one or more large language models, and the additional agent employs different large language models. The first agent may implement an iterative generative artificial intelligence process using one or more unstructured data retrieval tools to retrieve the one or more first data records from an unstructured dataset. The second agent may implement a non-iterative generative artificial intelligence process using one or more structured data retrieval tools to retrieve the one or more second data records from a structured dataset. The first agent may instruct the one or more unstructured data retrieval tools based upon embeddings in a vector store. The second agent may instruct the one or more structured data retrieval tools based upon a data model describing relationships of one or more types of the data model.

The selecting, by the orchestrator based on the processed input, the first agent of the plurality of different agents, may further comprise generating a second input based on a first portion of the input and routing the second input to the first agent. The selecting, by the orchestrator based on the processed input, the second agent of the plurality of different agents, may further comprise generating a third input based on a second portion of the input and routing the third input to the second agent. The first agent and the second agent may execute in parallel and perform their respective retrievals in parallel.

According to examples disclosed herein there is provided a non-transitory computer readable medium comprising instructions that, when executed, cause one or more processors to perform: processing, by an orchestrator, an input; selecting, by the orchestrator based on the processed input, a first agent of a plurality of different agents; retrieving, using the first agent, one or more first data records from an unstructured dataset; selecting, by the orchestrator based on the processed input, a second agent of the plurality of different agents; retrieving, using the second agent, one or more second data records from a structured dataset; generating, by the orchestrator, a natural language summary of the one or more first data records and the one or more second data records; and transmitting the natural language summary of the one or more first data records and the one or more second data records to a recipient associated with the input.

The first agent may instruct one or more unstructured data retrieval tools to retrieve the one or more data records from the structured dataset. The first agent may be configured to generate instructions for the one or more unstructured data retrieval tools. The first agent may generate the instructions in a format and/or language which the one or more unstructured data retrieval tools is configured to receive. The second agent may instruct one or more structured data retrieval tools to retrieve the one or more additional data records from the structured dataset. The second agent may be configured to generate instructions for the one or more structured data retrieval tools. The second agent may generate the instructions in a format and/or language which the one or more structured data retrieval tools is configured to receive. The first agent and/or the second agent may employ one or more machine learning models configured (e.g., through training) to generate instructions for one or more data retrieval tools. The one or more machine learning models employed by the one or more agents may be configured through training to determine instructions for a tool in dependence on a format and/or language of instructions which the tool is configured to receive. That is, a machine learning model may be configured through training to output instructions in a given format and/or language for a given tool and/or may be configured through training to output instructions in different formats and/or language for different tools.

A code generation agent and/or tool may be used to generate source code, machine code, and/or other computer code. In some examples, a code generation agent may be configured to instruct a code generation tool to generate source code, machine code, and/or other computer code. The code generation agent may be configured to determine what code is needed and/or for what agent, tool and/or other entity or application code should be generated. The code generation agent may instruct a code generation tool to generate code in a language and/or format which is suitable for the function and/or receiving agent, tool and/or other entity or application which is to receive the code. A code generation agent and/or tool may output code in a format and/or language configured to be received by a particular agent, tool and/or other entity or application. For example, the two or more agents may be configured to receive data and convert the data into a natural language format for providing to a large language model. For example, one or more agents may receive data and may convert the data into a natural language format for providing to a large language model employed by the orchestrator. In some examples, one or more agents may receive data and summarize the contents of the data in a natural language format for providing to a large language model.

Transmitting the multimodal summary (e.g., natural language summary) of the data records in response to the prompt may comprise transmitting the natural language summary of the data records to a computing device for display at the computing device. The natural language summary of the data records which is transmitted may be dependent on the technical functioning of one or more multimodal models (e.g., a large language model employed by the orchestrator) and/or one or more machine-learning models (e.g., a machine learning model employed by an agent). The one or more large language models and/or one of more machine-learning models may have been trained using machine learning. The operation of the one or more large language models and/or one of more machine-learning models may therefore be based on parameters which have been learnt through training (as opposed to parameters which have been set by a human programmer). The one or more large language models and/or one of more machine-learning models may be implemented in dedicated hardware. Additionally, or alternatively, the one or more large language models and/or one of more machine-learning models may comprise emulation of one or more large language models and/or one of more machine-learning models in software.

What is claimed is:
1. A method comprising:
   managing, by an orchestrator, a plurality of agents to generate a response to an input, wherein the orchestrator employs one or more multimodal models to process or deconstruct a prompt into a series of instructions for different agents, wherein each agent employs one or more machine-learning models to process disparate inputs or different portions of an input associated with the prompt;

instructing, by the orchestrator, retrieval requests related to the input to the one or more agents of the plurality of agents;

receiving, from the one or more agents of the plurality of agents, data from multiple data domains based on instructions from the orchestrator;

analyzing, by the orchestrator, the received data to formulate one or more responses to the prompt, wherein the orchestrator provides additional retrieval requests to the one or more agents to retrieve additional data to satisfy a context validation criteria associated with the input;

wherein the orchestrator generates intermediate instructions associated with the additional retrieval requests to the plurality of agents, wherein the intermediate instructions comprise portions of the input, questions about the input generated by the one or more multimodal models, and follow-up questions about answers generated by the one or more multimodal models; and wherein at least one agent of the one or more agents instantiates a tool to perform one or more operations on the instruction, the retrieved data, and the intermediate instructions; and outputting, by the orchestrator based on the intermediate instructions and the one or more operations performed by the tool, a validated response of the one or more responses to the input that satisfies context validation criteria and a portion of data retrieved by the one or more agents related to the input.

2. The method of claim 1, wherein outputting the portion of data retrieved by the one or more agents related to the input includes a source citation for the at least a portion of the validated response.

3. The method of claim 1, wherein the context validation criteria includes a threshold for identifying source material from an enterprise data system that corroborate the response.

4. The method of claim 1, wherein managing the plurality of agents comprises iterative processing or multiple instructions from the orchestrator.

5. The method of claim 1, wherein the retrieving the data from multiple data domains includes time series data, structured data, and unstructured data.

6. The method of claim 1, wherein the operation includes at least one of calculation, translation, formatting, visualization.

7. The method of claim 1, wherein the one or more agents are trained on different domain specific machine-learning models.

8. The method of claim 1, wherein at least one agent employs a type system to unify incompatible data from disparate data sources.

9. A system comprising:
one or more processors; and
memory storing instructions that, when executed by the one or more processors, cause the system to perform:
managing, by an orchestrator, a plurality of agents to generate a response to an input, wherein the orchestrator employs one or more multimodal models to process or deconstruct a prompt into a series of instructions for different agents, wherein each agent employs one or more machine-learning models to process disparate inputs or different portions of an input associated with the prompt;
instructing, by the orchestrator, retrieval requests related to the input to the one or more agents of the plurality of agents;
receiving, from the one or more agents of the plurality of agents, data from multiple data domains based on instructions from the orchestrator;
analyzing, by the orchestrator, the received data to formulate one or more responses to the prompt, wherein the orchestrator provides additional retrieval requests to the one or more agents to retrieve additional data to satisfy a context validation criteria associated with the input;
wherein the orchestrator generates intermediate instructions associated with the additional retrieval requests to the plurality of agents, wherein the intermediate instructions comprise portions of the input, questions about the input generated by the one or more multimodal models, and follow-up questions about answers generated by the one or more multimodal models; and
wherein at least one agent of the one or more agents instantiates a tool to perform one or more operations on the instruction, the retrieved data, and the intermediate instructions; and
outputting, by the orchestrator based on the intermediate instructions and the one or more operations performed by the tool, a validated response of the one or more responses to the input that satisfies context validation criteria and a portion of data retrieved by the one or more agents related to the input.

10. The system of claim 9, wherein outputting the portion of data retrieved by the one or more agents related to the input includes a source citation for the at least a portion of the validated response.

11. The system of claim 9, wherein the context validation criteria includes a threshold for identifying source material from an enterprise data system that corroborate the response.

12. The system of claim 9, wherein managing the plurality of agents comprises iterative processing or multiple instructions from the orchestrator.

13. The system of claim 9, wherein the retrieving the data from multiple data domains includes time series data, structured data, and unstructured data.

14. The system of claim 9, wherein the operation includes at least one of calculation, translation, formatting, visualization.

15. The system of claim 9, wherein the one or more agents are trained on different domain specific machine-learning models.

16. The system of claim 9, wherein at least one agent employs a type system to unify incompatible data from disparate data sources.

17. A non-transitory computer readable medium comprising instructions that, when executed, cause one or more processors to perform:
managing, by an orchestrator, a plurality of agents to generate a response to an input, wherein the orchestrator employs one or more multimodal models to process or deconstruct a prompt into a series of instructions for different agents, wherein each agent employs one or more machine-learning models to process disparate inputs or different portions of an input associated with the prompt;
instructing, by the orchestrator, retrieval requests related to the input to the one or more agents of the plurality of agents;
receiving, from the one or more agents of the plurality of agents, data from multiple data domains based on instructions from the orchestrator;

analyzing, by the orchestrator, the received data to formulate one or more responses to the prompt, wherein the orchestrator provides additional retrieval requests to the one or more agents to retrieve additional data to satisfy a context validation criteria associated with the input;

wherein the orchestrator generates intermediate instructions associated with the additional retrieval requests to the plurality of agents, wherein the intermediate instructions comprise portions of the input, questions about the input generated by the one or more multimodal models, and follow-up questions about answers generated by the one or more multimodal models; and wherein at least one agent of the one or more agents instantiates a tool to perform one or more operations on the instruction, the retrieved data, and the intermediate instructions; and outputting, by the orchestrator based on the intermediate instructions and the one or more operations performed by the tool, a validated response of the one or more responses to the input that satisfies context validation criteria and a portion of data retrieved by the one or more agents related to the input.

18. The non-transitory computer readable medium of claim 17, wherein outputting the portion of data retrieved by the one or more agents related to the input includes a source citation for the at least a portion of the validated response.

19. The non-transitory computer readable medium of claim 17, wherein the context validation criteria includes a threshold for identifying source material from an enterprise data system that corroborate the response.

20. The non-transitory computer readable medium of claim 17, wherein managing the plurality of agents comprises iterative processing or multiple instructions from the orchestrator.

* * * * *

UNITED STATES PATENT AND TRADEMARK OFFICE
CERTIFICATE OF CORRECTION

PATENT NO. : 12,111,859 B2
APPLICATION NO. : 18/542536
DATED : October 8, 2024
INVENTOR(S) : Thomas M. Siebel et al.

It is certified that error appears in the above-identified patent and that said Letters Patent is hereby corrected as shown below:

On the Title Page

(57) Abstract section:
"Systems and methods managing, by an orchestrator, a plurality of agents to generate a response to an input." should read -- Systems and methods for managing, by an orchestrator, a plurality of agents to generate a response to an input. --

In the Specification

Column 1, Lines 34-36:
"Traditional approaches for storing and retrieving information typically involves databases and applications" should read -- Traditional approaches for storing and retrieving information typically involve databases and applications --

Column 1, Lines 65-66:
"example non-iterative generative artificial intelligence process" should read -- example non-iterative generative artificial intelligence processes --

Column 2, Lines 32-33:
"further complicated in circumstance that require subject matter expertise" should read -- further complicated in circumstances that require subject matter expertise --

Column 2, Lines 35-38:
"An architecture for enterprise generative AI is disclosed herein to transform interactions with enterprise information that fundamentally change the human-computer interaction (HCI) model" should read -- An architecture for enterprise generative AI is disclosed herein to transform interactions with enterprise information that fundamentally changes the human-computer interaction (HCI) model --

Signed and Sealed this
Eighteenth Day of March, 2025

Coke Morgan Stewart
*Acting Director of the United States Patent and Trademark Office*

CERTIFICATE OF CORRECTION (continued)
U.S. Pat. No. 12,111,859 B2

Column 2, Lines 38-42:
"Enterprises running sensitive workloads in both cloud-native, on premise, or air-gapped environments can implement enterprise generative AI architecture to generate enterprise-wide insights using tool to rapidly locate and retrieve with agents" should read -- Enterprises running sensitive workloads in cloud-native, on premise, and/or air-gapped environments, can implement an enterprise generative AI architecture to generate enterprise-wide insights using tools to rapidly locate and retrieve information with agents --

Column 2, Lines 46-47:
"context specific questions that are processed used generative AI" should read -- context specific questions that are processed using generative AI --

Column 2, Lines 50-52:
"human-computer-interactions with intuitive natural language interface" should read -- human-computer-interactions with intuitive natural language interfaces --

Column 5, Lines 50-51:
"an image outputted from artificial intelligence application" should read -- an image outputted from an artificial intelligence application --

Column 5, Lines 51-52:
"a timeseries tool 236 to obtain summarize timeseries data" should read -- a timeseries tool 236 to obtain and summarize timeseries data --

Column 6, Line 46:
"systems and datastore" should read -- systems and datastores --

In the Claims

Claim 1, Column 55, Lines 22-23:
"one or more operations on the instruction" should read -- one or more operations on an instruction --